United States Patent
Conner et al.

[11] Patent Number: 5,867,686
[45] Date of Patent: Feb. 2, 1999

[54] HIGH SPEED REAL-TIME INFORMATION STORAGE SYSTEM

[76] Inventors: Kenneth H. Conner, 1032 Walden Ct., Bolingbrook, Ill. 60440; James G. Hunter, 831 Windrow Dr., Little Canada, Minn. 55109; Gregory P. Spar, 23274 164th St., Big Lake, Minn. 55309; Bruce Anderson, 23 Deer Hills Dr., North Oaks, Minn. 55127

[21] Appl. No.: 555,259

[22] Filed: Nov. 8, 1995

Related U.S. Application Data

[63] Continuation of Ser. No. 151,063, Nov. 9, 1993, abandoned.

[51] Int. Cl.$^6$ .................................................. G06F 17/30
[52] U.S. Cl. .......................... 395/495; 395/608; 395/610; 395/726
[58] Field of Search ..................... 395/608, 800, 395/379, 726, 472, 480, 490, 200.03, 495, 610

[56] References Cited

U.S. PATENT DOCUMENTS

| | | | |
|---|---|---|---|
| Re. 31,153 | 2/1983 | Caddell | 365/236 |
| 4,084,231 | 4/1978 | Capozzi et al. | 395/425 |
| 4,295,205 | 10/1981 | Kunstadt | 395/410 |
| 4,456,971 | 6/1984 | Fukuda et al. | 395/500 |
| 4,564,903 | 1/1986 | Guyette et al. | 395/425 |
| 4,621,318 | 11/1986 | Maeda | 395/425 |
| 4,630,230 | 12/1986 | Sundet | 395/496 |
| 4,642,759 | 2/1987 | Foster | 395/500 |
| 4,896,262 | 1/1990 | Wayama et al. | 395/500 |
| 4,951,246 | 8/1990 | Fromm et al. | 395/496 |
| 4,958,315 | 9/1990 | Balch | 395/500 |
| 4,984,149 | 1/1991 | Iwashita et al. | 395/404 |
| 5,029,125 | 7/1991 | Sciupac | 395/621 |
| 5,033,027 | 7/1991 | Amin | 365/222 |
| 5,070,474 | 12/1991 | Tuma et al. | 395/500 |
| 5,077,658 | 12/1991 | Bendert et al. | 395/601 |
| 5,093,782 | 3/1992 | Muraski et al. | 395/615 |

(List continued on next page.)

OTHER PUBLICATIONS

McDaniel, George, ed., *IBM Dictionary of Computing*, 1993, 1994, p. 137.

Hwang & Briggs, *Computer Architecture and Parallel Processing*, 1984, pp. 52–53.

Rosenberg, Jerry, *Dictionary of Computers, Information Processing, and Telecommunications*, 2nd ed., 1987, p.275.

*Silicon Disk*, Computer Products Users Manual, by Atto Technology, Inc., Copyright 1989; pp. 1–19.

*Atto is SCSI*, Product Literature by Atto Technology Inc. (no date).

*SBus SCSI–2 Adapter Installation Guide* By Antares Micro Systems, dated Jul. 19, 1992, pp. 1–7.

*MM 6295 D High Speed Memory Module VME Bus/D64* by Micro memory Inc., Copyright 1992, pp.1–27.

*SiliconDisk Pro High Performance SCSI–2 Solid State Drive* by Atto Technology Inc.

(List continued on next page.)

Primary Examiner—Paul R. Lintz
Attorney, Agent, or Firm—Welsh & Katz, Ltd.

[57] ABSTRACT

An information storage system includes a controller for managing the resources of a common mass storage device in order to enable multiple hosts connected to a common bus to independently read and write to the mass storage device in a relatively high speed manner on a first come, real time basis. In particular, a system of commands is provided which enables each host to read and write to the mass storage device on an independent, first come, real time basis by locking the requested address space irrespective of the origination. Even though an address storage space may be locked, the data within such space is always readable by another host. Should a subsequent host issue a command to write to the locked address space, the command is aborted and a flag is set indicating to the subsequent requesting host that the area is locked. The information storage system also provides for dynamic memory mapping which enables the mass storage device to be mapped according to a specific application.

11 Claims, 49 Drawing Sheets

U.S. PATENT DOCUMENTS

| | | | |
|---|---|---|---|
| 5,136,707 | 8/1992 | Block et al. | 395/617 |
| 5,140,685 | 8/1992 | Sipple et al. | 395/425 |
| 5,202,961 | 4/1993 | Mills et al. | 395/328 |
| 5,202,966 | 4/1993 | Woodson | 395/500 |
| 5,202,979 | 4/1993 | Hillis et al. | 395/182.04 |
| 5,202,982 | 4/1993 | Gramlich et al. | 395/602 |
| 5,408,653 | 4/1995 | Josten et al. | 395/600 |

OTHER PUBLICATIONS

*SiliconDisk Plus SIMM–Based SCSI–2 Solid State Drive* by Atto Technology Inc.

*Fast SCSI, Lo–Cost SCSI, ConServer–ES*, by Antares Micro Systems (no date).

*SiliconDisk Plus Specifications* by Atto Technology Inc., Nov., 1992.

*Atto Technology Technical Note* by Atto Technology Inc. Nov., 1992.

*Silicon Advantage FAST SCSI–2 Host Adapter for ISA/EISA/MCA* by Atto Technology Inc. (no date).

*SiliconCache Advanced SCSI–2 Hardware Cache* by Atto Technology Inc. (no date).

*SCSI Expander SCSI Logical Unit Translator* by Atto Technology Inc. (no date).

Draft Proposed American National Standard X3 131–199, pp. 199–206, Mar., 1994.

Atto Technology Inc., Silicon Disk Plus Data Sheet, inclusive, Nov. 1992, published in U.S.A.

Atto Technology Inc., Silicon Disk Pro Data Sheet, inclusive, Nov. 1992, published in U.S.A.

Atto Technology Inc., Silicon Advantage Data Sheet, inclusive, Nov. 1992, published in U.S.A.

Atto Technology Inc., SCSI Expander Data Sheet, inclusive, Nov. 1992, published in U.S.A.

Atto Technology Inc., Silicon Cache Data Sheet, inclusive, Nov. 1992, published in U.S.A.

Magazine Article, "The Interface Counts, Too", Electronic Design, p. 78, May 3, 1993.

Magazine Article, "2.5–inc. Flash Drive Can Complete on Performance Level", Electronic Design, p. 80, May 3, 1993.

Fig. 7

READ MODIFY LOCK

|    | 7 | 6 | 5 | 4 | 3 | 2 | 1 | 0 |
|----|---|---|---|---|---|---|---|---|
| 0  | OP CODE |||||||||
| 1  | RES |||||||||
| 2  | A | A | A | A | A | A | A | A |
| 3  | A | A | A | A | A | A | A | A |
| 4  | A | A | A | A | A | A | A | A |
| 5  | A | A | A | A | A | A | A | A |
| 6  | A | A | A | A | A | A | A | A |
| 7  | S | S | S | S | S | S | S | S |
| 8  | S | S | S | S | S | S | S | S |
| 9  | S | S | S | S | H | H | H | H |
| 10 | H | H | H | H | H | H | H | H |
| 11 | 0 | 0 |   |   |   |   | 0 | 0 |

Fig. 8

READ PAD

|    | 7 | 6 | 5 | 4 | 3 | 2 | 1 | 0 |
|----|---|---|---|---|---|---|---|---|
| 0  | OP CODE |||||||||
| 1  | RES |||||||||
| 2  | A | A | A | A | A | A | A | A |
| 3  | A | A | A | A | A | A | A | A |
| 4  | A | A | A | A | A | A | A | A |
| 5  | A | A | A | A | A | A | A | A |
| 6  | A | A | A | A | A | A | A | A |
| 7  | S | S | S | S | S | S | S | S |
| 8  | S | S | S | S | S | S | S | S |
| 9  | S | S | S | S |   |   |   |   |
| 10 |   |   |   |   |   |   |   |   |
| 11 | 0 | 0 |   |   |   |   | 0 | 0 |

Fig. 9

WRITE AUDIT

|   | 7 | 6 | 5 | 4 | 3 | 2 | 1 | 0 |
|---|---|---|---|---|---|---|---|---|
| 0 | \multicolumn{8}{c}{OP CODE = WA E3} |
| 1 | RES | | | | | | | |
| 2 | | | | | | | | |
| 3 | | | | | | | | |
| 4 | | | | | | | | |
| 5 | | | | | | | | |
| 6 | | | | | | | | |
| 7 | S | S | S | S | S | S | S | S |
| 8 | S | S | S | S | S | S | S | S |
| 9 | S | S | S | S | H | H | H | H |
| 10 | H | H | H | H | H | H | H | H |
| 11 | 0 | 0 | | | | | 0 | 0 |

Fig. 10

WRITE PAD LOCK

|   | 7 | 6 | 5 | 4 | 3 | 2 | 1 | 0 |
|---|---|---|---|---|---|---|---|---|
| 0 | \multicolumn{8}{c}{OP CODE = WPL E7} |
| 1 | RES | | | | | | | |
| 2 | | | | | | C | C | C |
| 3 | A | A | A | A | A | A | A | A |
| 4 | A | A | A | A | A | A | A | A |
| 5 | A | A | A | A | A | A | A | A |
| 6 | A | A | A | A | A | A | A | A |
| 7 | S | S | S | S | S | S | S | S |
| 8 | S | S | S | S | S | S | S | S |
| 9 | S | S | S | S | | | | |
| 10 | | | | | | | | |
| 11 | 0 | 0 | | | | | 0 | 0 |

Fig. 11

WRITE NEW CHAIN

|   | 7 | 6 | 5 | 4 | 3 | 2 | 1 | 0 |
|---|---|---|---|---|---|---|---|---|
| 0 | OP CODE = WNC E8 ||||||||
| 1 | RES |||||||||
| 2 |   |   |   |   |   |   |   |   |
| 3 | D | D | D | D | D | D | D | D |
| 4 | D | D | D | D | D | D | D | D |
| 5 | D | D | D | D | D | D | D | D |
| 6 | D | D | D | D | D | D | D | D |
| 7 | K | K | K | K | K | K | K | K |
| 8 | K | K | K | K | K | K | K | K |
| 9 | K | K | K | K |   |   |   |   |
| 10 |   |   |   |   |   |   |   |   |
| 11 | 0 | 0 |   |   |   |   | 0 | 0 |

Fig. 12

WRITE NEW CHAIN
RETURN DATA AND
KEY ADDRESS

|   | 7 | 6 | 5 | 4 | 3 | 2 | 1 | 0 |   |
|---|---|---|---|---|---|---|---|---|---|
| 0 | D | D | D | D | D | D | D | D | MSB |
| 1 | D | D | D | D | D | D | D | D |   |
| 2 | D | D | D | D | D | D | D | D |   |
| 3 | D | D | D | D | D | D | D | D |   |
| 4 | D | D | D | D | D | D | D | D | LSB MSB |
| 5 | K | K | K | K | K | K | K | K |   |
| 6 | K | K | K | K | K | K | K | K |   |
| 7 | K | K | K | K | K | K | K | K |   |
| 8 | K | K | K | K | K | K | K | K |   |
| 9 | K | K | K | K | K | K | K | K | LSB |

Fig. 13

UNLOCK ADDRESS

|   | 7 | 6 | 5 | 4 | 3 | 2 | 1 | 0 |
|---|---|---|---|---|---|---|---|---|
| 0 | OP CODE | | | | | | | |
| 1 | RES | | | | | | | |
| 2 | A | A | A | A | A | A | A | A |
| 3 | A | A | A | A | A | A | A | A |
| 4 | A | A | A | A | A | A | A | A |
| 5 | A | A | A | A | A | A | A | A |
| 6 | A | A | A | A | A | A | A | A |
| 7 | | | | | | | | |
| 8 | | | | | | | | |
| 9 | | | | | | | | |
| 10 | | | | | | | | |
| 11 | 0 | 0 | | | | | 0 | 0 |

Fig. 14

SET MASTER

|   | 7 | 6 | 5 | 4 | 3 | 2 | 1 | 0 |
|---|---|---|---|---|---|---|---|---|
| 0 | OP CODE = SETM 01 | | | | | | | |
| 1 | RES | | | | | | | 1/0 |
| 2 | | | | | | | | |
| 3 | | | | | | | | |
| 4 | | | | | | | | |
| 5 | 0 | 0 | | | | | 0 | 0 |

Fig. 15

NEW DATA BASE

|   | 7 | 6 | 5 | 4 | 3 | 2 | 1 | 0 |
|---|---|---|---|---|---|---|---|---|
| 0 | OP CODE = NEWDB 02 | | | | | | | |
| 1 | RES | | | | | | | |
| 2 | | | | | | | | |
| 3 | | | | | | | | |
| 4 | | | 1 | | 1 | 1 | | 1 |
| 5 | 0 | 0 | | | | | 0 | 0 |

Fig. 16

| | | | |
|---|---|---|---|
| 00 | 00 | MSB | BANK ADDRESS |
| 01 | 01 | | ADDRESS |
| 02 | 02 | | ADDRESS |
| 03 | 03 | | ADDRESS |
| 04 | 04 | | ADDRESS LSB |
| 05 | 05 | MSB | BANK ADDRESS |
| 06 | 06 | | ADDRESS |
| 07 | 07 | | ADDRESS |
| 08 | 08 | | ADDRESS |
| 09 | 09 | | ADDRESS LSB |
| 0A | 10 | MSB | BANK ADDRESS |
| 0B | 11 | | ADDRESS |
| 0C | 12 | | ADDRESS |
| 0D | 13 | | ADDRESS |
| 0E | 14 | | ADDRESS LSB |
| 0F | 15 | MSB | BANK ADDRESS |
| 10 | 16 | | ADDRESS |
| 11 | 17 | | ADDRESS |
| 12 | 18 | | ADDRESS |
| 13 | 19 | | ADDRESS LSB |
| 14 | 20 | MSB | BANK ADDRESS |
| 15 | 21 | | ADDRESS |
| 16 | 22 | | ADDRESS |
| 17 | 23 | | ADDRESS |
| 18 | 24 | | ADDRESS LSB |
| 19 | 25 | MSB | BANK ADDRESS |
| 1A | 26 | | ADDRESS |
| 1B | 27 | | ADDRESS |
| 1C | 28 | | ADDRESS |
| 1D | 29 | | ADDRESS LSB |
| 1E | 30 | MSB | BANK ADDRESS |
| 1F | 31 | | ADDRESS |
| 20 | 32 | | ADDRESS |
| 21 | 33 | | ADDRESS |
| 22 | 34 | | ADDRESS LSB |
| 23 | 35 | MSB | BANK ADDRESS |
| 24 | 36 | | ADDRESS |
| 25 | 37 | | ADDRESS |
| 26 | 38 | | ADDRESS |
| 27 | 39 | | ADDRESS LSB |
| 28 | 40 | MSB | BANK ADDRESS |
| 29 | 41 | | ADDRESS |
| 2A | 42 | | ADDRESS |
| 2B | 43 | | ADDRESS |
| 2C | 44 | | ADDRESS LSB |

START SIZE OF MVDATA (MVDATA)

START SIZE OF MVKEYS (MVKEYS)

START SIZE OF MVADIT (MVADIT)

MOVING BOTTOM OF AUDITS (BTAUDIT)

STSWAP ADDRESS

STKEYS ADDRESS

STDATA ADDRESS

STAUDIT ADDRESS

ENDAUDIT

*Fig. 17*

LOCKS CHANNEL

| | 7 | 6 | 5 | 4 | 3 | 2 | 1 | 0 |
|---|---|---|---|---|---|---|---|---|
| 0 | OP CODE = LCKS 04 ||||||||
| 1 | RES ||| | M | C | C | C |
| 2 | | | | | | | | MSB |
| 3 | | | | | | | | |
| 4 | | | | | | | | LSB |
| 5 | 0 | 0 | | | | | 0 | 0 |

Fig. 18

RETURN DATA FOR LOCKS
AND PLOCKS COMMANDS

|    | 7 | 6 | 5 | 4 | 3 | 2 | 1 | 0 |     |
|----|---|---|---|---|---|---|---|---|-----|
|    | F |   |   |   |   |   |   |   |     |
|    | L | L | L | L | L | L | L | L | MSB |
|    | L | L | L | L | L | L | L | L |     |
|    | L | L | L | L | L | L | L | L |     |
|    | L | L | L | L | L | L | L | L | LSB |
| 0  | C | C | C | C | C | C | C | C |     |
| 1  | F | F | F | F | F | F | F | F |     |
| 2  | E | E | E | E | E | E | E | E | MSB |
| 3  | E | E | E | E | E | E | E | E |     |
| 4  | E | E | E | E | E | E | E | E |     |
| 5  | E | E | E | E | E | E | E | E |     |
| 6  | E | E | E | E | E | E | E | E | LSB |
| 7  | S | S | S | S | S | S | S | S | MSB |
| 8  | S | S | S | S | S | S | S | S |     |
| 9  | S | S | S | S | S | S | S | S |     |
| 10 | S | S | S | S | S | S | S | S |     |
| 11 | S | S | S | S | S | S | S | S | LSB |
| 0  | C | C | C | C | C | C | C | C |     |
| 1  | F | F | F | F | F | F | F | F |     |
| 2  | E | E | E | E | E | E | E | E |     |
| 3  | E | E | E | E | E | E | E | E |     |
| 4  | E | E | E | E | E | E | E | E |     |
| 5  | E | E | E | E | E | E | E | E |     |
| 6  | E | E | E | E | E | E | E | E |     |
| 7  | S | S | S | S | S | S | S | S |     |
| 8  | S | S | S | S | S | S | S | S |     |
| 9  | S | S | S | S | S | S | S | S |     |
| 10 | S | S | S | S | S | S | S | S |     |
| 11 | S | S | S | S | S | S | S | S |     |

Fig. 19

UNLOCK ALL

|   | 7 | 6 | 5 | 4 | 3 | 2 | 1 | 0 |
|---|---|---|---|---|---|---|---|---|
| 0 | OP CODE = UALL 05 | | | | | | | |
| 1 | RES | | | | | | | |
| 2 | | | | | | | | |
| 3 | | | | | | | | |
| 4 | | | | | | | | |
| 5 | 0 | 0 | | | | | 0 | 0 |

Fig. 20

UNLOCK CHANNEL

|   | 7 | 6 | 5 | 4 | 3 | 2 | 1 | 0 |
|---|---|---|---|---|---|---|---|---|
| 0 | OP CODE = ULC 06 | | | | | | | |
| 1 | RES | | | | | C | C | C |
| 2 | | | | | | | | |
| 3 | | | | | | | | |
| 4 | | | | | | | | |
| 5 | 0 | 0 | | | | | 0 | 0 |

Fig. 21

PLOCKS CHANNEL

|   | 7 | 6 | 5 | 4 | 3 | 2 | 1 | 0 |
|---|---|---|---|---|---|---|---|---|
| 0 | OP CODE = PLCKS 07 | | | | | | | |
| 1 | RES | | | | M | C | C | C |
| 2 | | | | | | | | MSB |
| 3 | | | | | | | | |
| 4 | | | | | | | | LSB |
| 5 | 0 | 0 | | | | | 0 | 0 |

*Fig. 22*

DUMP AUDITS

| | 7 | 6 | 5 | 4 | 3 | 2 | 1 | 0 |
|---|---|---|---|---|---|---|---|---|
| 0 | OP CODE = DADIT 08 | | | | | | | |
| 1 | RES | | | | | | | |
| 2 | S | S | S | S | S | S | S | S |
| 3 | S | S | S | S | S | S | S | S |
| 4 | S | S | S | S | S | S | S | S |
| 5 | 0 | 0 | | | | | 0 | 0 |

*Fig. 23*

PAD UNLOCK, CHANNEL

| | 7 | 6 | 5 | 4 | 3 | 2 | 1 | 0 |
|---|---|---|---|---|---|---|---|---|
| 0 | OP CODE = PULC 09 | | | | | | | |
| 1 | RES | | | | | C | C | C |
| 2 | | | | | | | | |
| 3 | | | | | | | | |
| 4 | | | | | | | | |
| 5 | 0 | 0 | | | | | 0 | 0 |

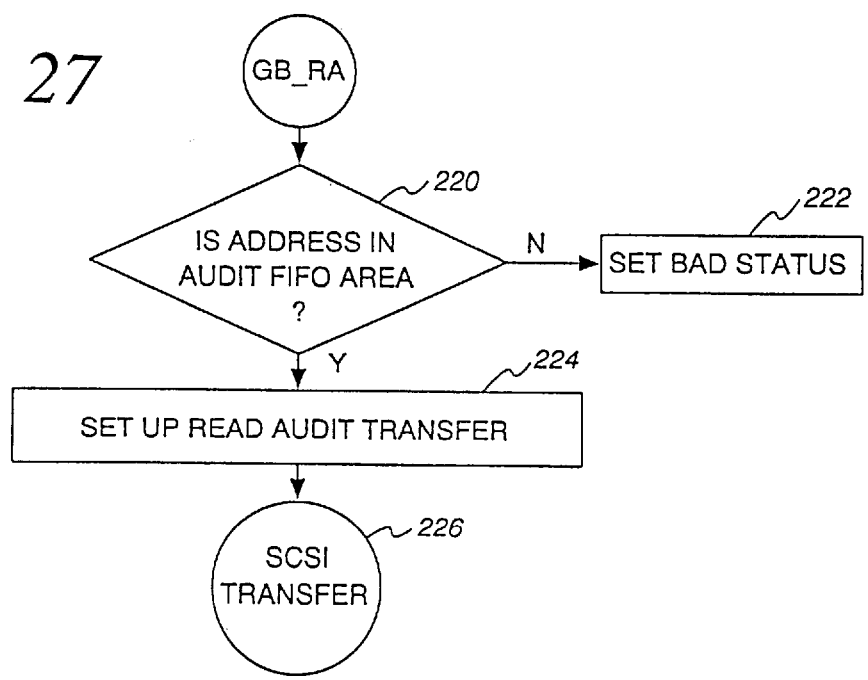
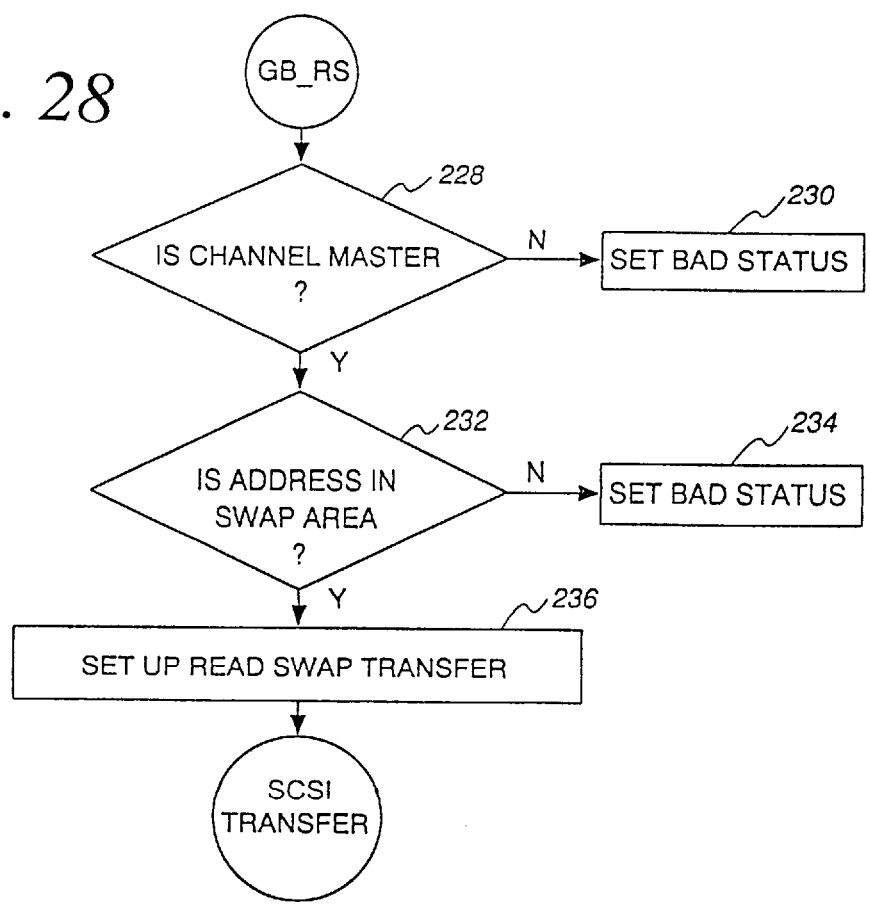

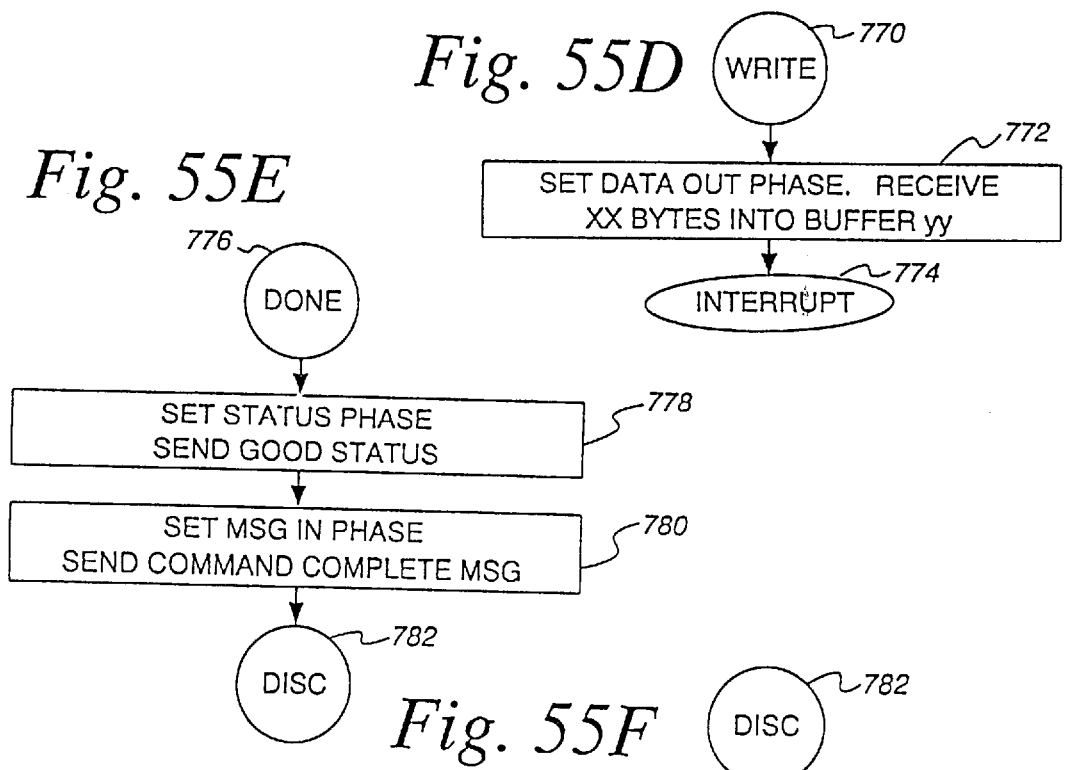
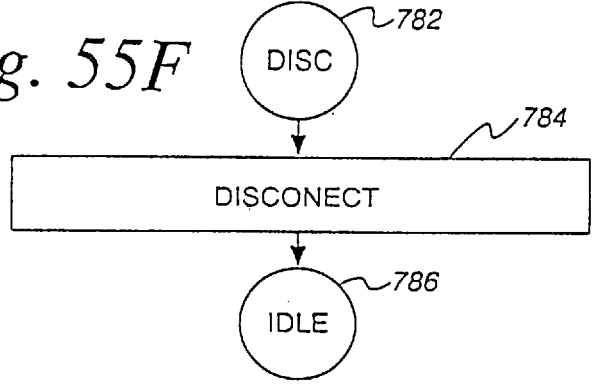
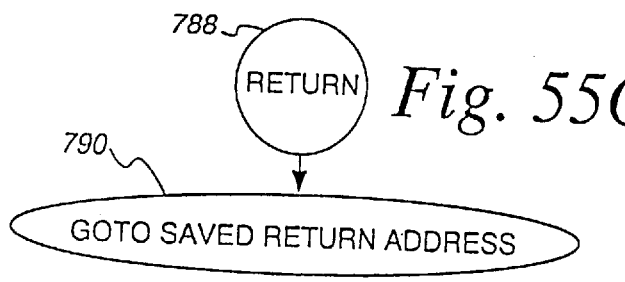
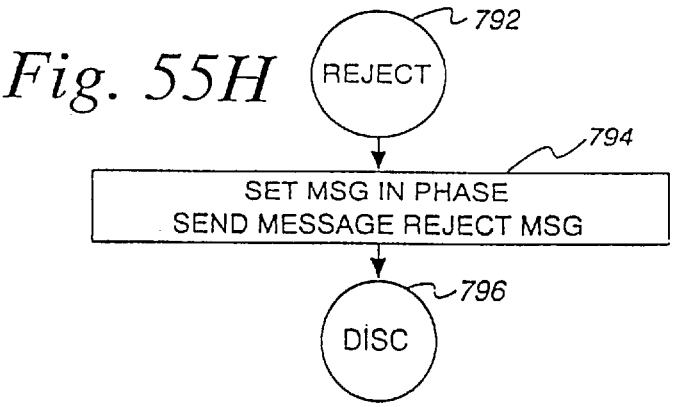

Fig. 57A

RETURN SENSE DATA

| | | 7 | 6 | 5 | 4 | 3 | 2 | 1 | 0 | |
|---|---|---|---|---|---|---|---|---|---|---|
| 00 | 00 | 1 | 1 | 1 | 1 | 0 | 0 | 0 | 0 | COMMAND F0 |
| 01 | 01 | 0 | 0 | 0 | 0 | 0 | 0 | 0 | 0 | |
| 02 | 02 | 0 | 0 | 0 | 0 | \multicolumn{4}{c\|}{SENSE KEY} | SENBLK(KEY) = 0X |
| 03 | 03 | \multicolumn{8}{c\|}{MSB ADDRESS RESERVED} | |
| 04 | 04 | \multicolumn{8}{c\|}{ADDRESS RESERVED} | |
| 05 | 05 | \multicolumn{8}{c\|}{ADDRESS RESERVED} | SENBLK(ADD) |
| 06 | 06 | \multicolumn{8}{c\|}{ADDRESS RESERVED  LSB} | |
| 07 | 07 | 0 | 0 | 0 | 0 | 0 | 0 | 0 | 0 | ADDITIONAL SENSE LENGTH (SENLENG) |
| 08 | 08 | \multicolumn{8}{c\|}{MSB ADDRESS RESERVED} | |
| 09 | 09 | V | K | P | | M | \multicolumn{3}{c\|}{MID} | STATUS BYTE |
| 0A | 10 | \multicolumn{8}{c\|}{N/A} | |
| 0B | 11 | \multicolumn{8}{c\|}{N/A} | |
| 0C | 12 | \multicolumn{8}{c\|}{ASC} | ADDITIONAL SENSE CODE |
| 0D | 13 | \multicolumn{8}{c\|}{ASCQ} | ADDITIONAL SENSE CODE QUALIFIER |
| 0E | 14 | \multicolumn{8}{c\|}{RESERVED} | |
| 0F | 15 | \multicolumn{8}{c\|}{RESERVED} | |
| 10 | 16 | \multicolumn{8}{c\|}{RESERVED} | |
| 11 | 17 | \multicolumn{8}{c\|}{RESERVED} | |
| 12 | 18 | \multicolumn{8}{c\|}{RESERVED} | |
| 13 | 19 | \multicolumn{8}{c\|}{RESERVED} | |
| 14 | 20 | \multicolumn{8}{c\|}{RESERVED} | |
| 15 | 21 | \multicolumn{8}{c\|}{RESERVED} | |
| 16 | 22 | \multicolumn{8}{c\|}{RESERVED} | |
| 17 | 23 | \multicolumn{8}{c\|}{MSB   BANK ADDRESS} | |
| 18 | 24 | \multicolumn{8}{c\|}{ADDRESS} | |
| 19 | 25 | \multicolumn{8}{c\|}{ADDRESS} | START SIZE OF MVDATA (MVDATA) |
| 1A | 26 | \multicolumn{8}{c\|}{ADDRESS} | |
| 1B | 27 | \multicolumn{8}{c\|}{ADDRESS   LSB} | |
| 1C | 28 | \multicolumn{8}{c\|}{MSB   BANK ADDRESS} | |
| 1D | 29 | \multicolumn{8}{c\|}{ADDRESS} | |
| 1E | 30 | \multicolumn{8}{c\|}{ADDRESS} | START SIZE OF MVKEYS (MVKEYS) |
| 1F | 31 | \multicolumn{8}{c\|}{ADDRESS} | |
| 20 | 32 | \multicolumn{8}{c\|}{ADDRESS   LSB} | |

Fig. 57B

| | | | |
|---|---|---|---|
| 21 | 33 | MSB BANK ADDRESS | |
| 22 | 34 | ADDRESS | |
| 23 | 35 | ADDRESS | |
| 24 | 36 | ADDRESS | |
| 25 | 37 | ADDRESS | LSB |
| 26 | 38 | MSB BANK ADDRESS | |
| 27 | 39 | ADDRESS | |
| 28 | 40 | ADDRESS | |
| 29 | 41 | ADDRESS | |
| 2A | 42 | ADDRESS | LSB |
| 2B | 43 | MSB BANK ADDRESS | |
| 2C | 44 | ADDRESS | |
| 2D | 45 | ADDRESS | |
| 2E | 46 | ADDRESS | |
| 2F | 47 | ADDRESS | LSB |
| 30 | 48 | MSB BANK ADDRESS | |
| 31 | 49 | ADDRESS | |
| 32 | 50 | ADDRESS | |
| 33 | 51 | ADDRESS | |
| 34 | 52 | ADDRESS | LSB |
| 35 | 53 | MSB BANK ADDRESS | |
| 36 | 54 | ADDRESS | |
| 37 | 55 | ADDRESS | |
| 38 | 56 | ADDRESS | |
| 39 | 57 | ADDRESS | LSB |
| 3A | 58 | MSB BANK ADDRESS | |
| 3B | 59 | ADDRESS | |
| 3C | 60 | ADDRESS | |
| 3D | 61 | ADDRESS | |
| 3E | 62 | ADDRESS | LSB |
| 3F | 63 | MSB BANK ADDRESS | |
| 40 | 64 | ADDRESS | |
| 41 | 65 | ADDRESS | |
| 42 | 66 | ADDRESS | |
| 43 | 67 | ADDRESS | LSB |

START SIZE OF MVADIT (MVADIT)

MOVING BOTTOM OF AUDITS (BTAUDIT)

STSWAP ADDRESS

STKEYS ADDRESS

STDATA ADDRESS

STAUDIT ADDRESS

ENDAUDIT

HIGH SPEED REAL-TIME INFORMATION STORAGE SYSTEM

This application is a continuation of application Ser. No. 08/151,063 filed 9 Nov. 1993 and now abandoned.

BACKGROUND OF THE INVENTION

1. Field of the Invention

The present invention relates to an information storage system, which includes a mass storage device, preferably non-mechanical, and more particularly to an information storage system which enables relatively high speed data transfer to and from a mass storage device without the software overhead and resulting increased transfer time of known disk emulator systems and which enables multiple hosts, connected to a common bus, to read and write to the mass storage device independently in real time on a first come basis.

2. Description of the Prior Art

Mass storage devices are known to be used for storing data in various information storage system applications. Such mass storage devices are typically mechanical devices, such as hard disks and floppy disks. In a typical system, predetermined blocks or sectors of data are transferred between the mass storage device and the main memory under the control of a central processing unit (CPU) or a direct memory access (DMA) controller.

There are several problems with such known mechanical storage devices. First, data is transferred to and from the disks in a serial fashion and stored sequentially making such devices sequential access devices. As such, transfer of data to and from such devices is relatively slower than random access devices, such as electronic memory. In particular, the transfer of data between such mechanical mass storage devices is under the control a read/write head. Since data on the disk is stored sequentially, the seek time of the read/write head to get to the desired storage locations adds to the overall time for reading and writing data to the disk. The transfer time is further increased as the files on the disk become fragmented (e.g., when data in a common file is stored in non-sequential storage locations). In particular, as the files become fragmented, the read/write head must often await an entire revolution of the disk to read the fragmented portion of the file. Since each revolution of the disk is about 0.0167 msec, fragmented files on a disk take a significantly longer time to be read from a disk. As the amount of data stored on the mass storage device increases, the seek time also increases. Secondly, since data is transferred in predetermined blocks or sectors, the transfer time is increased further because significantly more data than required is transferred at a time. Moreover, transfer in such blocks or sectors irrespective of the amount of data requested increases the size of the main memory since such memory must be able to accommodate the blocks or sectors of data transferred to and from the mechanical storage device.

In certain applications, such as database applications, the seek time and overall data transfer time for such mechanical mass storage devices can result in significant degradation of the performance of the system. In particular, in such an application, the performance of the system is based upon various factors including: the disk speed; the size of the main memory; the size of the database; and the length of time that the database has been operational. In order to compensate for relatively long seek times which increase as the size of the database increases, additional main memory or cache memory is added to the system, for example, to hold data keys (keys); a parameter by which the database is sorted or searched, which adds to the overall cost and to the overall software overhead and, thus, the complexity and storage requirements for the system. However, the addition of memory improves the system performance only in certain situations. In particular, if the keys are in the main or cache memory at the time of the query, the data corresponding to the keys is serially transferred from the disk. If the keys are not in the main or cache memory, the keys are retrieved from the disk. After the keys are found, the data is serially read from the disk. Since the data is stored sequentially on the disk, such data corresponding to particular keys may be fragmented and stored on different sectors on the disk which increases the overall seek time of the read/write head and, thus, degrades the performance of the database system even with the addition of cache memory. In time, as more and more data becomes fragmented, the seek time increases. Eventually, the performance of the system degrades to a point where the database administrator has to dump the entire database in order to optimize the storage of the data on the disk.

Another known problem relating to databases relates to what is known as optimizer software; used to optimize the data transfer to and from the mass storage device. Such optimizer software is normally run by the host CPU. In some applications, the optimizer software is known to take up a significant amount of CPU time, for example, 80% of the CPU time. Although such software is able to optimize data transfer to and from the mass storage devices, the CPU time required for such software significantly limits the performance of the system.

In an effort to improve the performance of such systems, so-called solid state disk emulators have been developed. Such solid state disk emulators are disclosed in U.S. Pat. Nos. 4,896,262; 5,070,474 and 5,131,089. In order for such solid state disk emulators to be transparent to the user, the disk emulators are adapted to emulate a disk by translating various disk instructions at the hardware level into instructions compatible with electronic memory. In particular, when disk access is required, software control of the system is normally passed from the application program to the operating system, for example, UNIX or the Microsoft Disk Operating System (MS-DOS). The operating system, in turn, transfers control to the basic input/output system (BIOS) which interfaces with the disk drive at the hardware level. In order to maintain the transparency of the solid state disk drive, such systems include software for translating the hardware level instructions from the BIOS into instructions compatible with an electronic memory. Although such systems are able to increase the rate of transfer between such mass storage devices by eliminating seek times inherent in disk drives, additional software overhead is required for translating the disk instructions into instructions compatible with electronic memory. Such software overhead decreases an average rate of data transfer from such solid state memory devices. As such, although the electronic memory virtually eliminates the seek times normally associated with disk drives, the memory access time will be relatively longer than known electronic access memory because of the need to translate the disk instructions into instructions compatible with electronic memory in order to maintain the transparency of the solid state disk emulator relative to the user.

SUMMARY OF THE INVENTION

It is an object of the present invention to solve various problems in the prior art.

It is yet another object of the present invention to provide an information storage system which enables relatively high speed data transfer to and from a mass storage device.

It is yet a further object of the present invention to provide an information storage system which enables relatively high speed data transfer to and from a mass storage device without the software overhead of known disk emulator systems.

It is yet a further object of the present invention to provide an information storage system which enables multiple hosts, connected to a common bus, to independently read and write to a mass storage device in real time on a first come basis.

It is another object of the present invention to reduce the CPU time for managing data transfer to and from a mass storage device.

Briefly, the present invention relates to an information storage system which includes a controller for managing the resources of a common mass storage device in order to enable multiple hosts connected to a common bus to independently read and write to the mass storage device in a relatively high speed manner on a first come, real time basis. In particular, a system of commands is provided which enables each host to read and write to the mass storage device on an independent, first come, real time basis by locking the requested address space irrespective of the origination. Even though an address storage space may be locked, the data within such space is always readable by another host. Should a subsequent host issue a command to write to the locked address space, the command is aborted and a flag is set indicating to the subsequent requesting host that the area is locked. The information storage system also provides for dynamic memory mapping which enables the mass storage device to be mapped according to a specific application. For example, in a database application, the mass storage device may be dynamically mapped into three primary areas; keys, data and audits. These areas are mapped with a starting address, an ending address and a dynamic partition which represents the last address written in that area. As new data is written to the storage area, the dynamic partition is automatically updated for the next command. A pads area may also be provided for passing and locking messages between the multiple hosts. The pads area is also operated on a reservation system and locks the requested address storage space during writes and unlocks the area during reads. A swap area may also be provided to enable any host designated as a master to swap data to a scratch pad memory. By providing a command system for reserving storage space, the information storage system, in accordance with the present invention, enables the resources of a mass storage device to be utilized by multiple hosts connected to a common bus without conflict in a high speed manner without the software overhead associated with known disk emulator systems.

DESCRIPTION OF THE DRAWINGS

These and other objects of the present invention will be readily apparent from the following description and attached drawings wherein:

FIG. 7 is a block diagram illustrating the format for a READ MODIFY LOCK command in accordance with the present invention;

FIG. 8 is a block diagram illustrating the format for a READ PAD command in accordance with the present invention;

FIG. 9 is a block diagram illustrating the structure for a WRITE AUDIT command in accordance with the present invention;

FIG. 10 is a block diagram illustrating the structure for a WRITE PAD LOCK command in accordance with the present invention;

FIG. 11 is a block diagram illustrating the structure for a WRITE NEW CHAIN command in accordance with the present invention;

FIG. 12 is a block diagram illustrating the format of the WRITE NEW CHAIN return data in accordance with the present invention;

FIG. 13 is a block diagram illustrating the format for an UNLOCK ADDRESS command in accordance with the present invention;

FIG. 14 is a block diagram illustrating the format for a SET MASTER command in accordance with the present invention;

FIG. 15 is a block diagram illustrating the format for a NEW DATABASE command in accordance with the present invention;

FIG. 16 illustrates the format for the address pointers used in conjunction with the NEW DATABASE command in order to create the memory map illustrated in FIG. 4;

FIG. 17 is a block diagram illustrating the format for a LOCKS CHANNEL command in accordance with the present invention;

FIG. 18 illustrates the format of the return data for the LOCKS and PLOCKS commands in accordance with the present invention;

FIG. 19 is a block diagram illustrating the format for a UNLOCK ALL command in accordance with the present invention;

FIG. 20 is a block diagram illustrating the format for an UNLOCK CHANNEL command in accordance with the present invention;

FIG. 21 is a block diagram illustrating the format for a PLOCKS CHANNEL command in accordance with the present invention;

FIG. 22 is a block diagram illustrating the format for a DUMP AUDITS command in accordance with the present invention;

FIG. 23 is a block diagram illustrating the format for a PAD UNLOCKS CHANNEL command in accordance with the present invention;

FIG. 27 is a flowchart for the READ AUDITS command in accordance with the present invention;

FIG. 28 is a flowchart for the READ SWAP command in accordance with the present invention;

FIGS. 55A–55K illustrate flowcharts for a target script for controlling data transfers across a SCSI bus which forms a part of the present invention;

FIGS. 57A and 57B illustrate the format of the SENSE DATA return data.

DETAILED DESCRIPTION OF THE INVENTION

Figure 1:
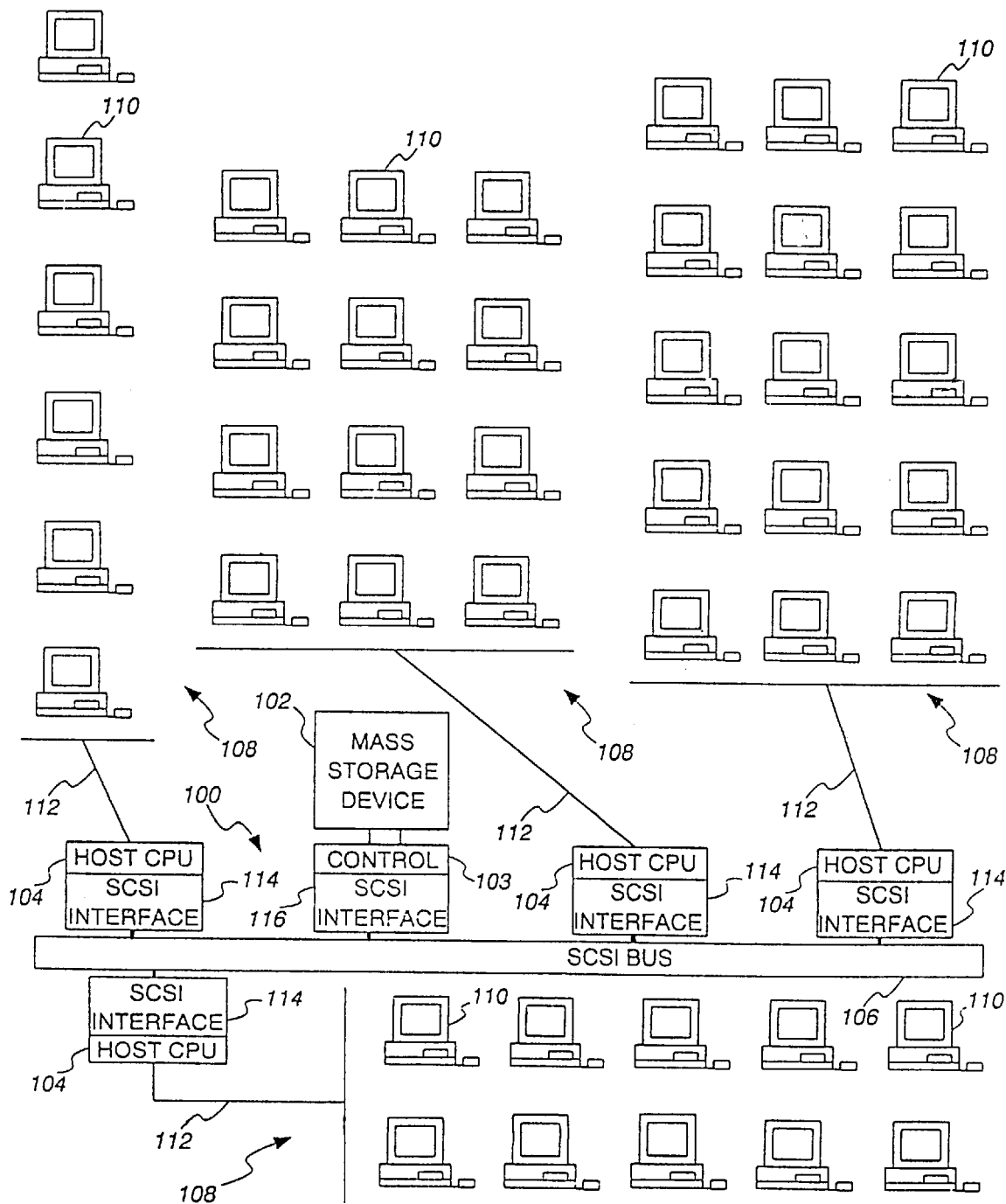
FIG. 1 is a simplified block diagram of an application of the information storage system in accordance with the present invention.

The information storage system in accordance with the present invention, generally identified with the reference numeral 100, includes a mass storage device 102 and a controller 103. The resources of the mass storage device 102 are managed by the controller 103 in response to a unique set of commands which enable multiple hosts 104 to reserve address space within the mass storage device 102 for input/output (I/O) operations. In particular, as will be described in more detail below, various I/O operations, initiated by the respective hosts 104, result in locking of an address space on a first come, real time basis. As such, each host 104 is allowed to independently write to the mass storage device 102 on an independent basis. Thus, if a subsequent host 104 seeks to access the locked address space, the command is aborted and the subsequent requesting host 104 is signalled that the address space is locked.

Figure 2:
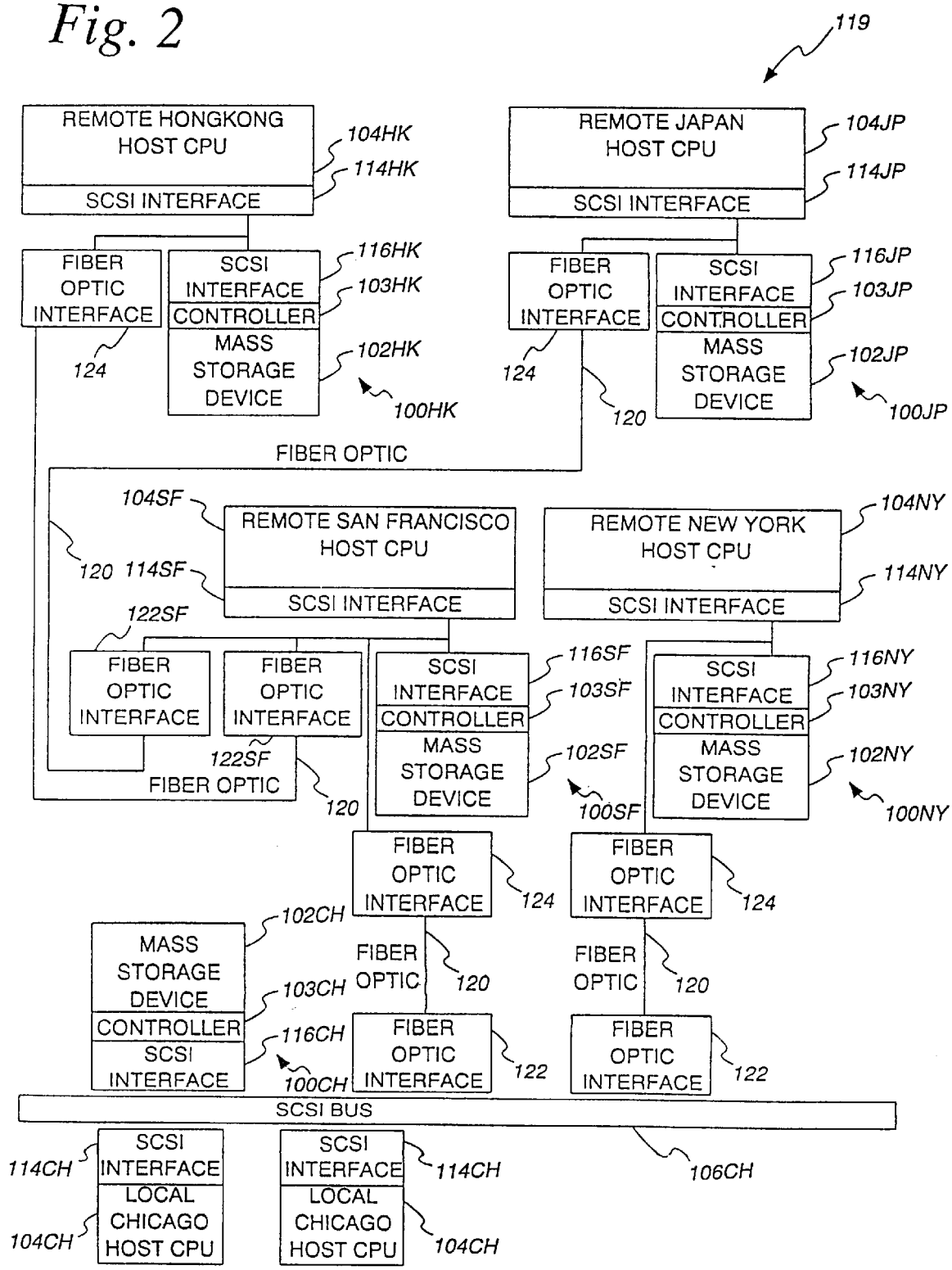
FIG. 2 is a simplified block diagram of an alternate application of the information storage system in accordance with the present invention.

The principles of the present invention enable the resources of the mass storage device 102 to be shared by multiple systems in a manner heretofore unknown. For example, FIGS. 1 and 2 illustrate two exemplary applications of the information storage system 100 in accordance with the present invention. FIG. 1 illustrates an application of a single information storage system 100 connected to a common small computer system interface (SCSI) bus 106 along with a plurality of hosts 104 which, as illustrated, each serve as file servers for a plurality of local area networks (LAN) 108. As shown, each LAN 108 includes a plurality of personal computers (PC) 110 and is connected to its respective host 104 by way of a bus 112. It is to be understood that the particular architecture of the LAN 108 is irrelevant to the practice of the present invention. It is only necessary that the respective host 104 acting as the file server be capable of driving a SCSI bus 106. Thus, each host 104 includes a SCSI interface 114 which enables it to communicate with the information storage system 100 over the SCSI bus 106. The controller 103 also includes a SCSI interface 116 which enables relatively high speed data communication between the mass storage device 102 and the respective hosts 104 connected to the system.

An alternate application of the information storage system 100 is illustrated in FIG. 2. In this application, a plurality of information storage systems 100HK, 100JP, 100SF, 100CH are shared by a plurality of hosts 104HK, 104JP, 104SF, 104CH; or file servers located in remote locations around the world, connected in a wide area network (WAN) 119 by way of fiber optic data links 120. In this implementation, each remote host 104 is connected locally to an information storage system 100 and is also connected to the remote information storage system 100 that are local to the balance of the information storage systems 100 in the WAN 119. In particular, two local hosts (i.e., LOCAL CHICAGO HOSTS) 104CH are connected to a local information storage system 100CH by way of a SCSI bus 106CH. Each of the local hosts 104CH is connected to the SCSI bus 106CH by way of a SCSI interface 114. The information storage system 100CH, which includes the controller 103CH, and the mass storage device 102CH is, in turn, connected to the SCSI bus 106CH by way of its SCSI interface 116CH. The SCSI bus 106, in turn, is connected to remote hosts, for example, in other cities such as New York and San Francisco, by way of the fiber optic data links 120. Each of these systems includes an interface 122 for interfacing the fiber optic link 120 to the SCSI bus 106, and an interface 124 for interfacing the fiber optic data link 122 to the remote host 104 and the information storage system 100. In addition, the remote San Francisco host 104SF is illustrated as being connected to remote hosts 104HK, 104JP in Hong Kong and Japan by way of the fiber optic data links 120 and the fiber optic interfaces 122HK, 122JP, 122SF and 124HK, 124JP, 124SF. Since each of the hosts 104 includes its own information storage system 100 in accordance with the present invention, the fiber optic data link 120 enables the resources of multiple information storage systems 100 to be shared by a plurality of hosts.

HARDWARE

Figure 3:
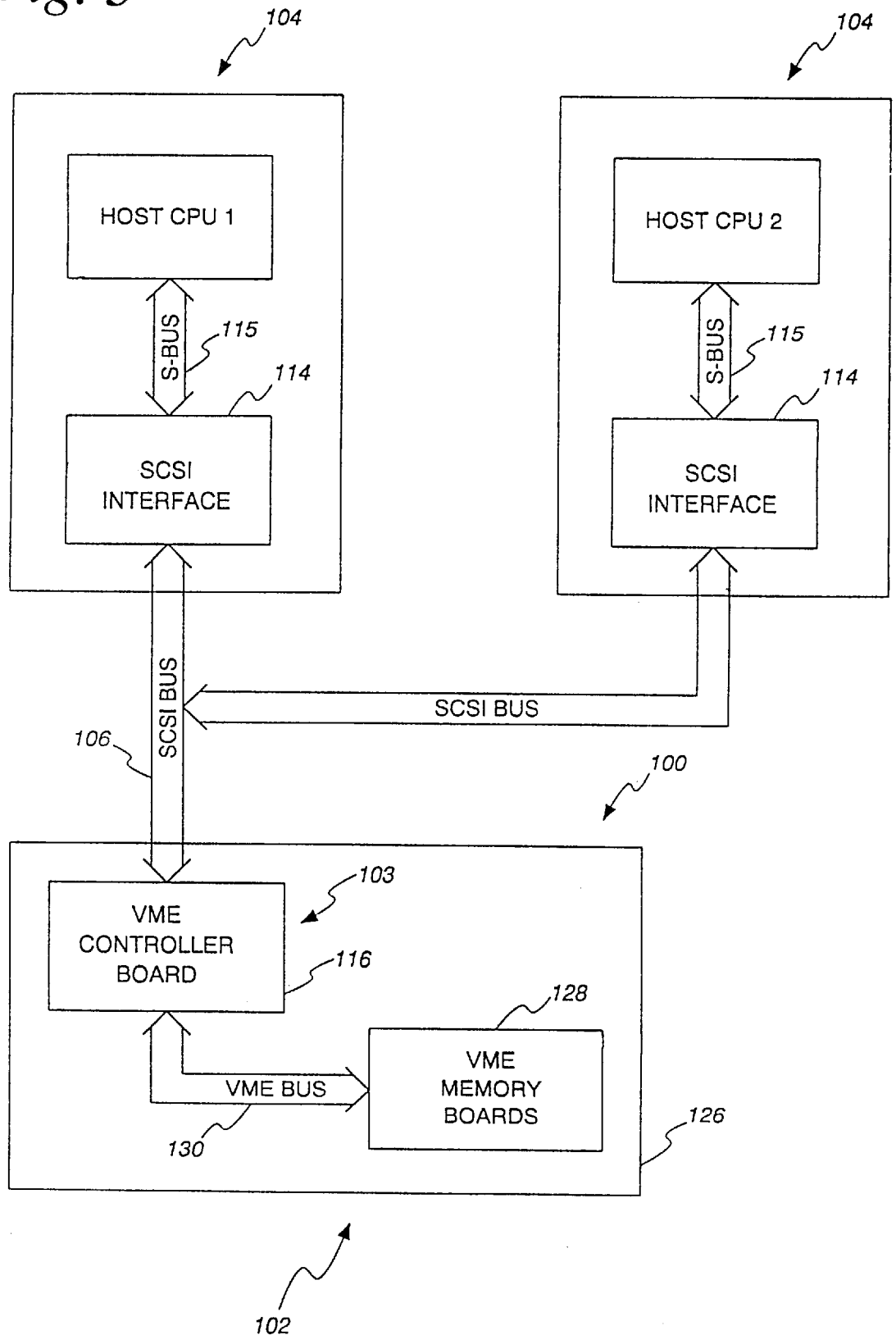
FIG. 3 is a block diagram illustrating the hardware that forms a part of the present invention.

Referring to FIG. 3, the information storage system 100 includes a mass storage device 102 and a controller 103 which may be housed in a separate enclosure 126. The controller 103 may be, for example, a Motorola type MVME 167 single board computer which includes a Motorola type MC 68040 complex instruction set chip (CISC) central processing unit (CPU) with a SCSI port to enable communication over the SCSI bus 106. The specification for the SCSI bus 106 is defined in "SCSI Small Computer Systems Interface; Draft X3T9.2/82-2, Revision 14," available from the Computer and Business Equipment Manufacturer's Association in Washington, D.C., hereby incorporated by reference. The following publications, all herein incorporated by reference, are all available from Motorola, Inc. in Tempe, Ariz.: Publication No. MVME 167, entitled "MVME 167 Single Board Computer Users Manual;" Publication No. MVME 187 FW, entitled, "MVME 167/MVME 187 Single Board Computers SCSI Software Users Manual;" Publication No. MVME 187 PG, entitled, "MVME 167/MVME 187 Single Board Computers Programmers Reference Guide;" Publication No. MVME 167 BUG/D1, entitled, "MVME 167 Bug 167 Bug Debugging Package Users Manual;" Publication No. MC 68040 UM, entitled, "MC 68040 Microprocessor Users Manual;" Publication No. MVME 320B, entitled, "MVME 320B VMEbus Disk Controller Module User's Manual;" Publication No. MVME 323, entitled, "MVME 323 ESDI Disk Controller User's Manual;" Publication No. MVME 327AFW, entitled, "MVME 327A Firmware User's Manual;" Publication No. MVME 328, entitled, "MVME 328 VMEbus Dual SCSI Host Adapter User's Manual;" Publication No. MVME 335, entitled, "MVME 335 Serial and Parallel I/O Module User's Manual;" Publication No. MVME 350, entitled, "MVME 350 Streaming Tape Controller VMEmodule User's Manual;" Publication No. MVME 350FW, entitled, "MVME 350 IPC Firmware User's Guide."

The controller 103 is connected to a plurality of memory boards 128 by way of a versatile back-plane, VME bus 130, described in detail in "ANSI/IEEE Standard 1014-1987," available from the Institute of Electrical and Electronic Engineers in New York, N.Y., hereby incorporated by reference. A Motorola type 712 transition module provides an interface 116 between the SCSI bus 106 and the VME bus 130. The transition module is described in detail in Motorola Publication No. MVME 712A, entitled, "MVME 712A/MVME 712AM/MVME 712B Transition Module and MVME 147P2 Adapter Board User's Manual" and Motorola Publication No. MVME 327A, entitled, "MVME 327A VMEbus to SCSI Bus Adapter and MVME 717 Transition Module User's Manual," hereby incorporated by reference.

The memory boards 128 are 32 bit addressable memory boards, for example, 256 megabyte memory cards available from Micromemory Inc. in Chatsworth, Calif. It should be understood, however, that the 256 megabytes memory cards are merely exemplary. As will be described in more detail below, the controller software, in accordance with the present invention, that forms a part of the information storage system 100 utilizes 40 bit actual addressing which would enable up to 4 terabytes or 4,000 gigabytes to be addressed. Actual addressing of the memory boards 128 further reduces the software overhead and, thus, the transfer time of data to and from the mass storage device 102.

As mentioned above, information storage system 100 is adapted to be connected to a plurality of hosts 104 which must be capable of supporting the SCSI bus 106. For example, the hosts may be Solaris 10/30 Workstations by Sun Microsystems which include a SUPER SPARC reduced instruction set chip (RISC) central processing unit (CPU). The SUPER SPARC chip is manufactured by Texas Instruments for Sun Microsystems. The Solaris Workstation 10/30 is described in detail in a document entitled, "Sun OS 5.1 Reference Manual Set," available from Sun Microsystems, San Jose, Calif., hereby incorporated by reference. It should be clear to those of ordinary skill in the art that the principles of the invention are not limited to the Solaris Workstations 10/30. The only requirement is that the hosts 104 be capable of supporting a SCSI bus 106.

As shown in FIG. 3, each host 104 is connected to a SCSI interface 114 by way of a S-bus 115. The S-bus 115 is described in detail in a document entitled, "S-Bus Specification, Revision A," copyright September 1989, available from Sun Microsystems in San Jose, Calif., hereby incorporated by reference.

The SCSI interface 114 may be, for example, as provided by Antares Microsystems Inc. in Los Gatos, Calif.; Part No. 20-050-0017. In particular, the SCSI interface 114 is available with a Sun common SCSI architecture (SCSA) compatible device driver and is described in detail in "S-Bus SCSI-2 Adaptor Installation Guide," Revision 1.2, dated Jul. 16, 1992, available from Antares Microsystems Inc. in Los Gatos, Calif., hereby incorporated by reference. The SCSI interface 114 provides an S-bus to SCSI bus interface for the host 104 and provides a maximum data transfer of 10 megabytes per second and allows up to 7 additional SCSI devices to be connected thereto.

Connections between the SCSI interface 114 and the controller 103 are made with SCSI connectors (not shown), preferably 50-pin connectors, available from Amphenol Incorporated.

DYNAMIC MEMORY MAP

An important aspect of the invention is the dynamic memory map which provides for dynamic partitioning of the memory in the mass storage device 102 which automatically adjusts various partitions. In addition, the memory map is user configured which enables the user to easily and conveniently partition the memory within the mass storage device 102 for a particular application with a single instruction. Once the memory map is configured, it is stored in a protected area of the mass storage device 102 which may be, for example, shadow or battery backed up RAM.

Figure 4:
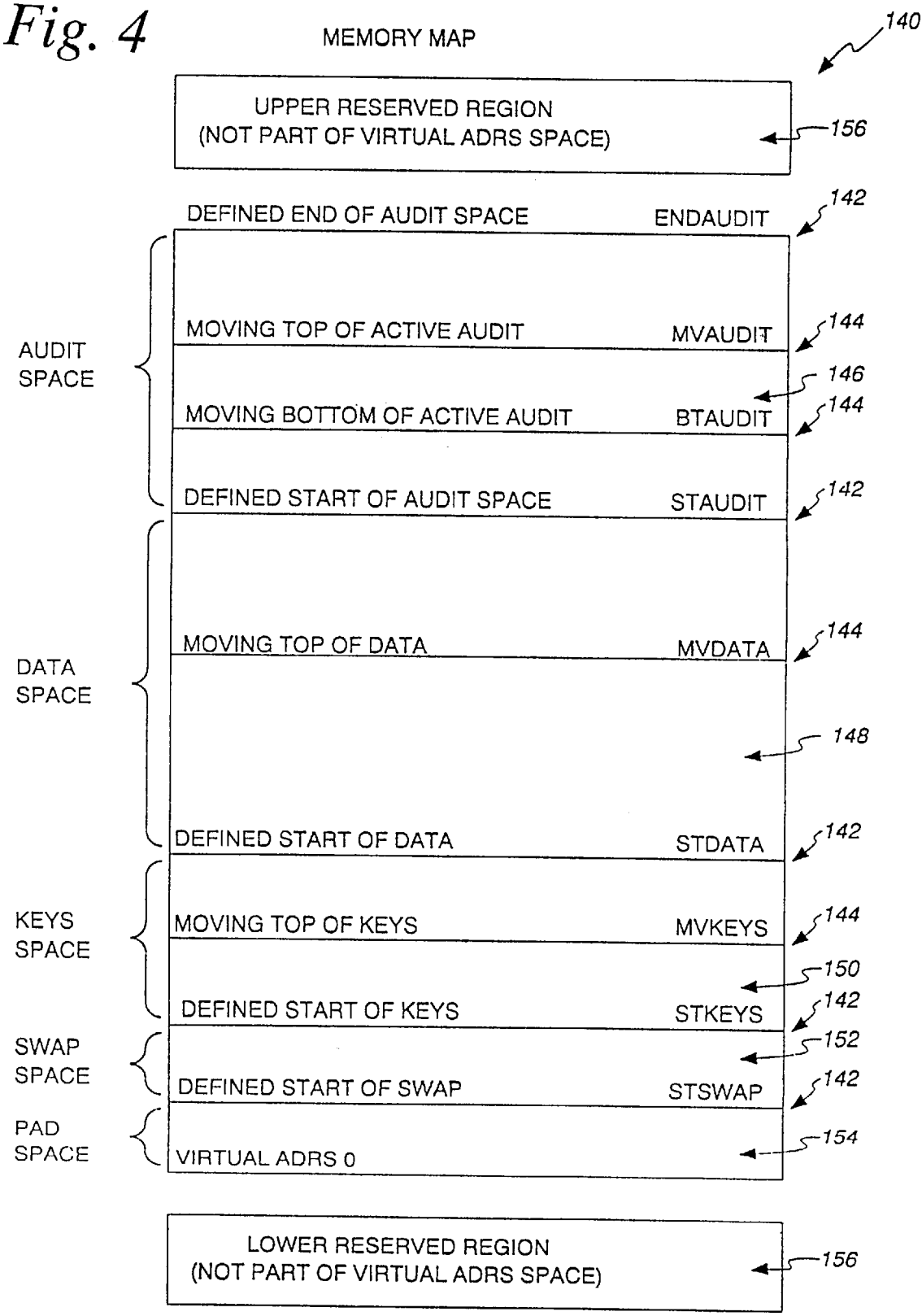
FIG. 4 is a memory map of a mass storage device that forms a part of the information storage system in accordance with the present invention.

An exemplary memory map is illustrated in FIG. 4 for a database application. The memory map 140 may be configured with a plurality of fixed partitions 142 and one or more dynamic partitions 144. In a typical database application, it is necessary that the memory at least be partitioned for audits, data and keys. Thus, the mass storage device 102 is user configured with fixed partitions 142 defining space for audits 146, data 148 and keys 150. The keys 150 are normally used to sort the data within the database according to a particular parameter. The keys 150 are thus address pointers which point to the address for the particular data in the data space 148. The audits area 146 is used to store audits, writes or updates of either the data area 148 or the keys space 150 in order to enable reconstruction of the data in the event of a catastrophic failure of the mass storage device 102.

The overall address space allocation for the audits 146, the data 148 and the keys 150 is determined by the database manager based upon the specific application of the database programmed by way of a NEW DATABASE instruction, discussed below. In the event that little writing to the database is anticipated, the space for the audits 146 can be decreased to allow additional space for the data 148 and the keys 150.

Additional storage space may be allocated to facilitate the operation and use of the information storage system 100 for the specific application. For example, as shown, additional fixed partitions 142 are illustrated in the memory map 140. These additional storage spaces are user configurable and may be used for a variety of purposes. For example, the memory map 140 may be configured, as illustrated in FIG. 4, as a fixed storage space 152 for swaps as well as a fixed storage space 154 for pads. Since the resources of the mass storage device 102 are adapted to be shared by multiple hosts 104, these additional storage spaces 152 and 154 can be used as scratch pad memory for a variety of purposes. For example, the swap space 152 can be used for swapping data by the host 104 designated as the channel master. The pads area 154 can be used for passing messages between hosts 104. In addition, as shown, non-user configurable fixed partitions 142 may be included to provide space for various purposes including diagnostics and for storing the memory map. As such, as shown in FIG. 4, two additional fixed partitions 142 may be provided for diagnostics and mapping. As mentioned above, the memory map is stored in a protected memory space. Thus, the memory space 156 may be a protected area such as battery backed-up or shadow RAM.

SOFTWARE ARCHITECTURE

Figure 5:
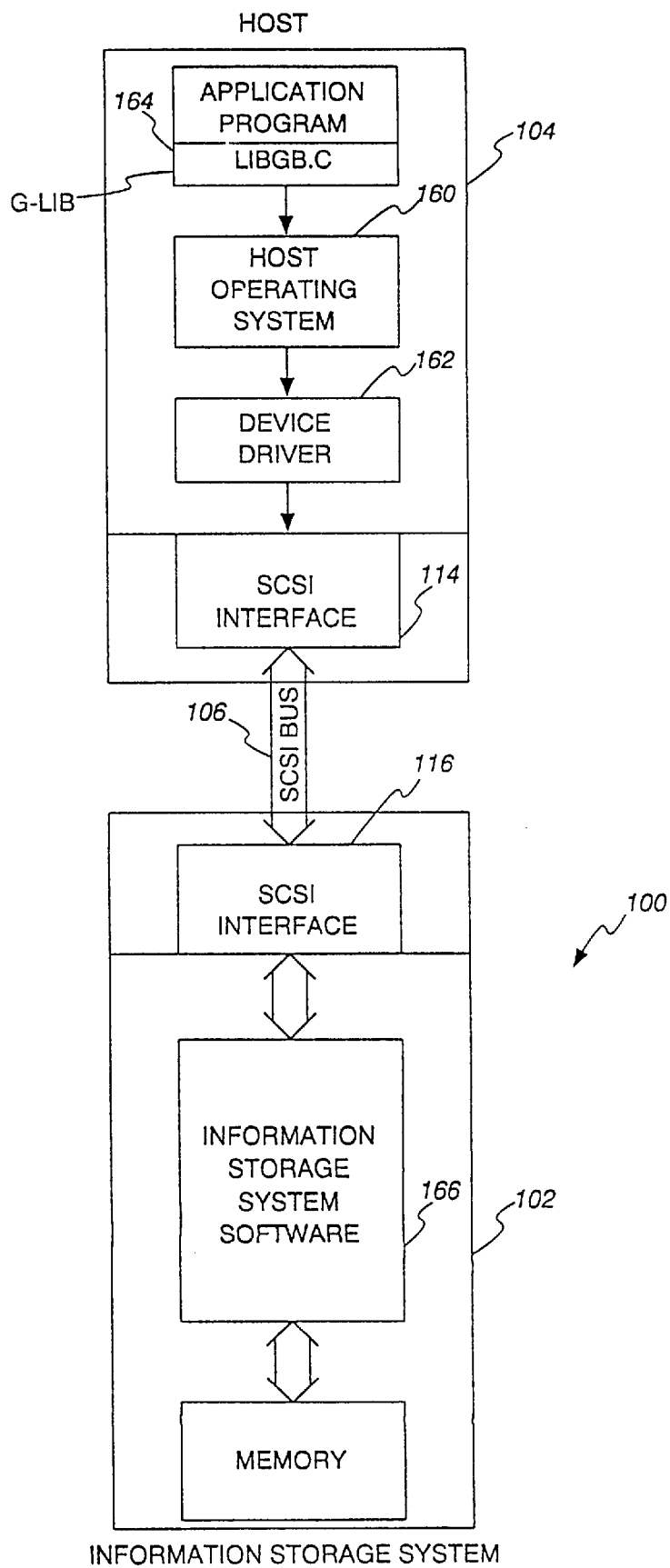
FIG. 5 is a flow diagram illustrating the software architecture for the information storage system in accordance with the present invention.

The software architecture for the information storage system 100, in accordance with the present invention, is illustrated in FIG. 5. For simplicity, a single host is illustrated communicating with the mass storage device 102 by way of the SCSI bus 106. The software architecture for multiple hosts 104 is basically the same as for the single host 104.

An important aspect of the invention is a unique set of commands which enable multiple hosts 104 to communicate with the mass storage device 102 on an independent and equal access basis. Except for the commands, the information storage system is 100 transparent to the user and is adapted to be used with modified versions of various database programs, such as standard query language (SQL); modified to include the new command set that forms a part of the present invention.

The system 100 is adapted to be utilized on any host 104 that is capable of supporting a SCSI bus 106. The operating system 160 for the host 104 may be a UNIX operating system. However, it would be understood by those of ordinary skill in the art that the principles of the present invention are adapted to be utilized with other operating systems, such as Microsoft Disk Operating System (MS-DOS). In the event that the information storage system 100 is used with an operating system other than UNIX, a device driver 162, which forms a part of the present invention, would have to be converted for operation with the other type of operating system. Conversion of the device driver 162 is well within the ordinary skill in the art.

As mentioned above, the information storage system 100 is adapted to accept a modified application program which includes a unique set of commands which form a part of the present invention. The application program 164 is compiled by a library file, LIBGB.C, which, among other things, is adapted to recognize the new command set illustrated in FIGS. 7–30, 32, 34–36, 27 and 38, and convert the commands to a form that's recognizable by the device driver 162 for communication over the SCSI bus 106. The device driver 162 is preferably a loadable device driver which enables the application program 164 to communicate with the mass storage device 102. The device driver 162 is illustrated in FIGS. 68 and 69A–69C.

The information storage system 100 includes its own information storage system software 166 which enables the mass storage device 102 to interpret and execute the compiled commands from the device driver 162. In particular, the software 166 includes command software illustrated in FIGS. 39–67 which cover the commands in the new command set illustrated in FIGS. 7–30, 32, 34–36, 37 and 38. In addition, the information storage system software 166 includes the TARGET SCRIPT software illustrated in FIGS. 70A–70K and the TARGET MAIN LOOP software illustrated in FIGS. 71A and 71B.

Figure 6:
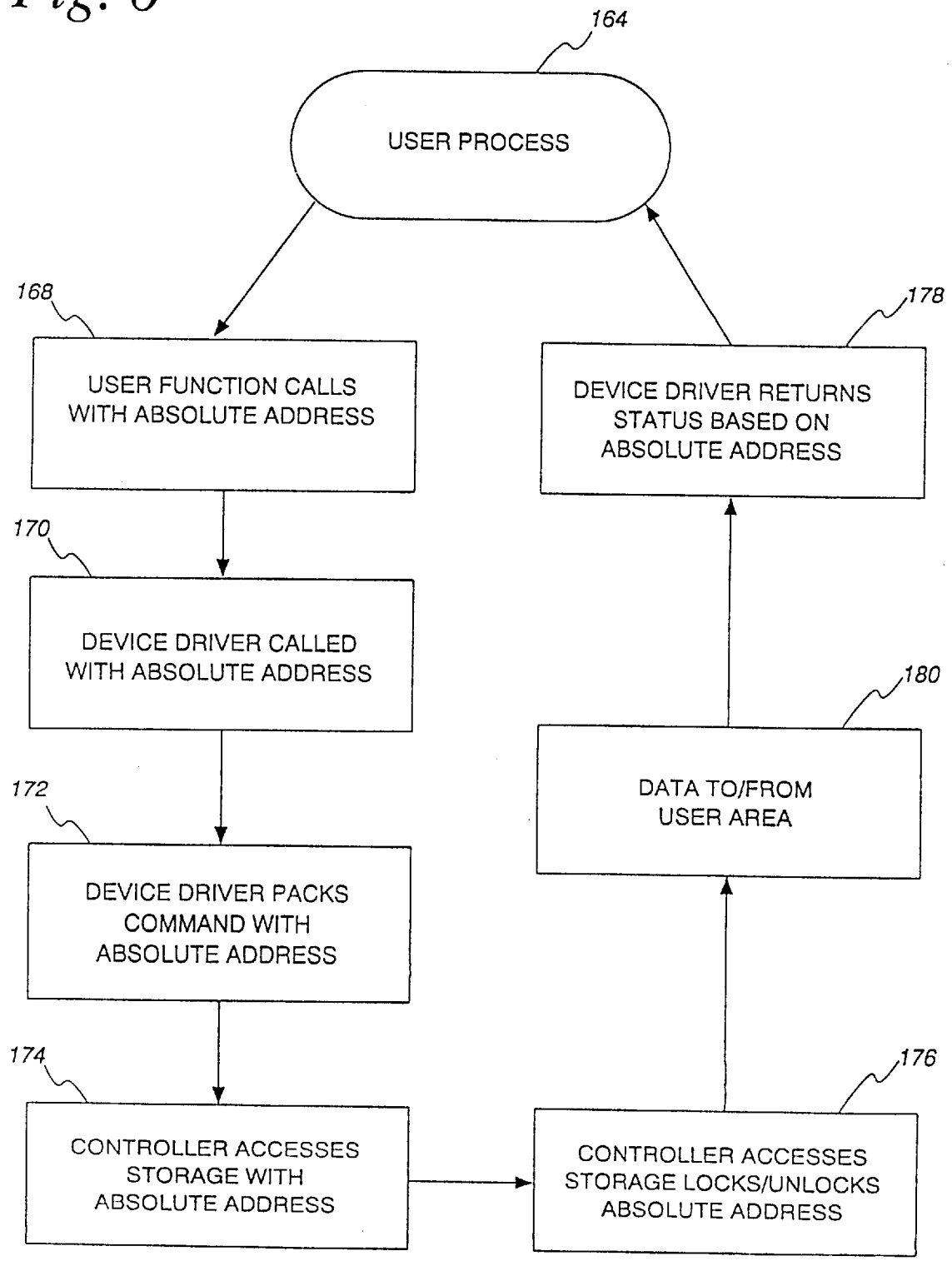
FIG. 6 is a simplified flow diagram of the software in accordance with the present invention.

A simplified flowchart for the overall system is illustrated in FIG. 6. Initially, the application program 164 makes a function call to the device driver 162 in step 168 with an absolute address. As mentioned above, the application program 164 is compiled by the library file LBGB.C and calls the device driver 162 with an absolute address in step 170. Subsequently, in step 172, the device driver 162 packs the compiled command with an absolute address and passes it to the information storage system software 166 in step 174. The information storage system software 166 converts the absolute address into its corresponding physical (VME) address, which is then used to access the memory boards 128 in step 176. The data is passed to or from the user area in step 180 over the SCSI bus 106 and status is then returned in step 178.

NEW COMMANDS FORMAT

The formats for the new commands which form a part of the present invention are illustrated in FIGS. 7–30, 32, 34–36, 37 and 38. Flowcharts for each of the commands are illustrated in FIGS. 39–67. As mentioned above, the commands and the system are described and illustrated for a database application. However, the principles of the invention are applicable to virtually any information storage system.

The commands can be broken up into various categories: read, write and special purpose commands. The read and write commands enable the audit area 146, data area 148, keys area 150, swap area 152 and the pad area 154 to be read and written to by any host 104 connected to the information storage system 100. The special purpose commands include commands only available to the database administrator which provide a plurality of functions including the configuration of the initial memory map and designating the host 104 in the system that will act as the master.

An important aspect of the invention relates to a read modify lock (RML) and a write modify unlock (WMU) commands which allow each host 104 on the system to access the mass storage device 102 to enable the resources of the mass storage device 102 to be monitored and managed across several systems. In particular, these instructions enable each host to read data from the mass storage device 102 and lock or reserve address space for the particular data on a first come real time basis independent of where the request originates. Once the data storage space is locked, that space can only be written to by the requesting host 104. However, during such time that the space is locked, it is readable by any other host 104 connected to the system. The address space is unlocked by the write modify unlock (WMU) command.

All of the commands utilize actual addressing which reduces the software overhead as well as access time associated with known block addressing schemes. Most of the commands are configured as 12 byte commands divided into three fields; a STARTING ADDRESS field, a SIZE field and a HOW MANY field. Bytes 2–6 form the STARTING ADDRESS field for specifying a starting address of the mass storage device 102. Since these addresses are 5 byte word addresses, these bytes 2–6 provide 40 bit actual word addressing to enable 4,000 gigabytes or 4 terabytes of storage space to be addressed. Rather than specifying an ending address for the requested address space, the command format includes a 20 bit SIZE field for specifying the size in words of the address space being accessed. These 20 bits enable over four megabytes of address space to be accessed as a single record. The SIZE field is added to the starting address specified in the STARTING ADDRESS field to define the ending address of the address space being accessed by the particular instruction. The 20 bits is more than large enough to accommodate compressed color video and graphics. The next field in the command format is the HOW MANY field. This field specifies the number of sequential blocks of data of the size defined by the SIZE field. 12 bits are allocated for the HOW MANY field which enables over 4,000 blocks of data to be accessed in a single command. Since up to four megabytes worth of data can be specified for the SIZE field, the commands enable up to 17 gigabytes to be accessed in a single instruction.

The function of each of the instructions which form a part of the present invention are described below.

READ COMMANDS

READ MODIFY LOCK COMMAND

The READ MODIFY LOCK command enables any of the hosts 104 connected to the system to read a record or series of records from the mass storage device 102. This command is available to all of the channels or hosts 104 connected to the information storage system 100. When this instruction is used, the address range of the record or records to be read is locked so that no other host 104 on the system can access that storage space. Should a subsequent host 104 request the same storage space, a flag is set and returned to the subsequent requestor indicating that the space is locked. The lock is removed by a WRITE MODIFY UNLOCK instruction or one of the other unlock instructions described below, available to the database administrator.

The format for the READ MODIFY LOCK command is illustrated in FIG. 7. The command includes an op code RML D0 and an 11 byte address. The address is broken down into three fields: a STARTING ADDRESS field (A); a SIZE field (S) and a HOW MANY field (H). The address field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

Figure 24:
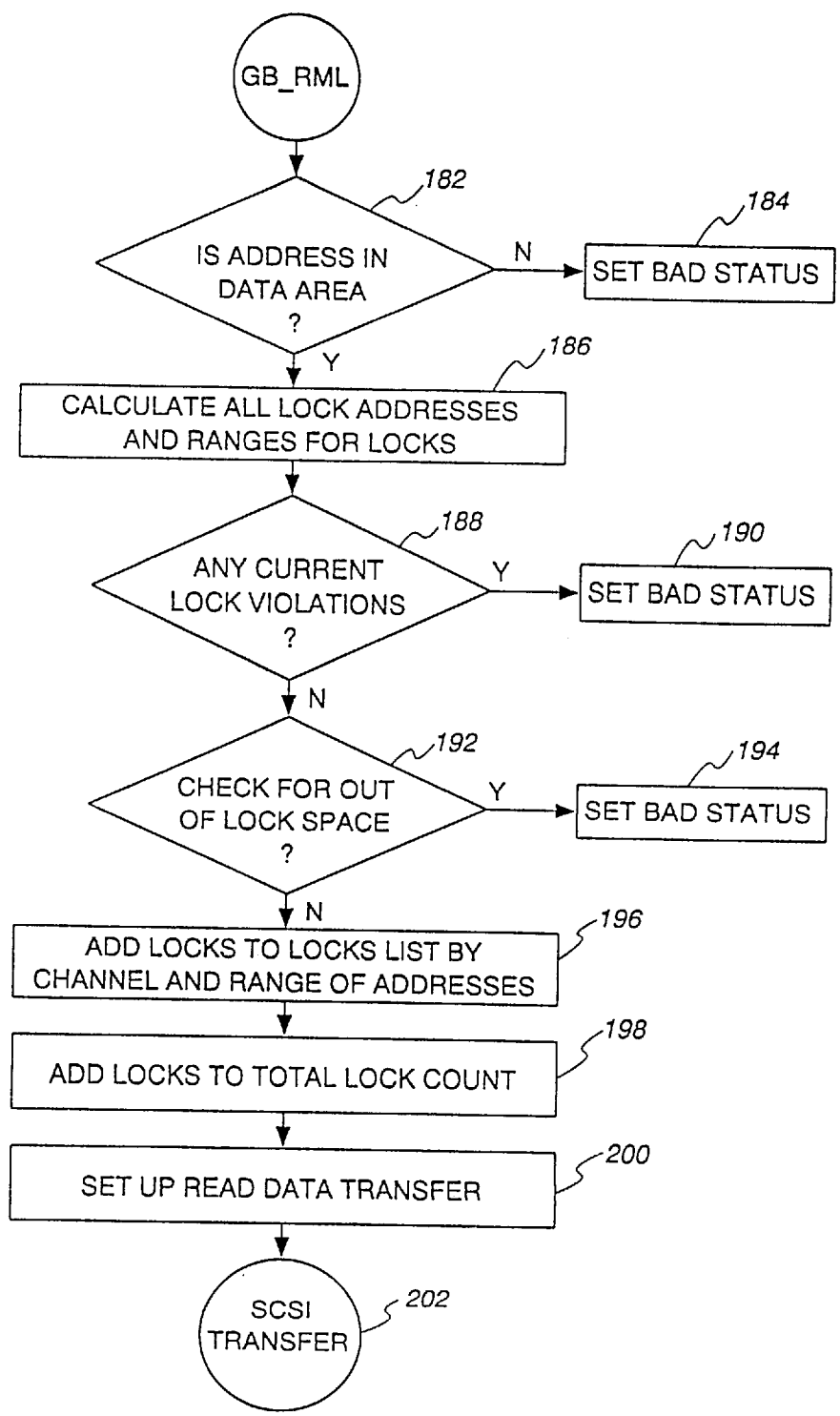
FIG. 24 is a flowchart for the READ MODIFY LOCK command in accordance with the present invention.

The flowchart for the READ MODIFY LOCK command is illustrated in FIG. 24. As mentioned above, the software for all of the commands reside in the controller 103. Initially, upon receipt of the command, the controller 103 determines in step 182 whether the address specified by the STARTING ADDRESS, SIZE and HOW MANY fields is within the data space 148 (FIG. 4). If not, a BAD STATUS/CHECK CONDITION flag is returned in step 184 to the host or channel 104 that initiated the command. If the address specified by the command is within the space 148 allocated for data, the system then calculates in step 186 the starting and ending addresses of the locks. In particular, as mentioned above, the address field of the command specifies the starting address of the requested storage space. The SIZE field is then added onto the STARTING ADDRESS field to calculate the ending address of the locked storage space. If, however, multiple records are specified, as indicated by the HOW MANY field, the ending address of the locked storage space will be calculated to include all of the records specified. Once the starting and ending addresses of the locks storage space are calculated, the system then checks in step 188 whether that space was locked previously. If so, a BAD STATUS/CHECK CONDITION flag is returned in step 190 to the host 104 and the command is aborted. However, the subsequent requestor or host 104 can still read the data within the locked storage area by issuing a READ DATA command, as will be discussed below. If there are no lock violations, the system next checks in step 192 to determine the availability of lock space. In particular, in order to prevent the system from hanging up, a predetermined number of locks is set. This predetermined number of locks is based on the available amount of storage space. For example, the predetermined number may be implemented as 64,000 five (5) word locks. Thus, in step 192, the system determines whether there is any more available lock space. If there is no available lock space, perhaps indicating that the system has run out of locks (i.e., that the system has hung up), a BAD STATUS/CHECK CONDITION is returned in step 194 to inform the database administrator so that the locks can be cleared by way of an UNLOCK ADDRESS command, discussed below. If there is available lock space, the locks are added to a lock list which includes the channel or number of the host 104 requesting the lock and the range of addresses being locked by the current instruction in step 196. Once the locks are added to the lock list, the lock count is incremented in step 198 in order to enable the system to keep track of the available lock space, as in step 192. After the lock count is incremented in step 198, the system is setup for a READ DATA transfer in step 200 over the SCSI bus 106. The data is subsequently transferred over the SCSI bus 106 in step 202.

READ DATA COMMAND

The READ DATA (FIG. 7) command is utilized by the various hosts 104 connected to the system to read data from the space 148 allocated for data in the memory map 140. This command is available to all of the channels connected to the information storage system 100. As mentioned above, this command may also be used to read data that has been locked by a prior requester.

This command consists of the op RD D1 and an 11 byte address. The address is broken down into three fields: a STARTING ADDRESS field (A); a SIZE field (S) and a HOW MANY field (H). The ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

Figure 40:
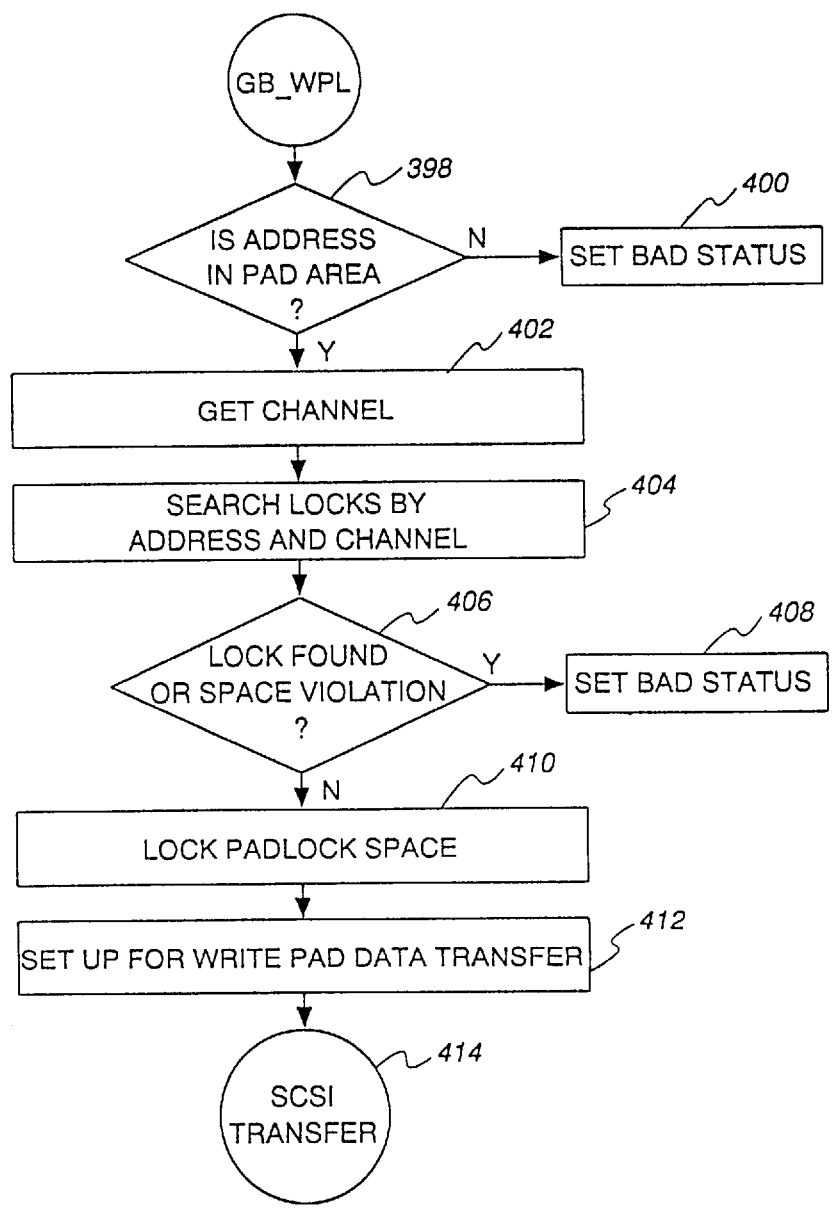
FIG. 40 is a flowchart for the WRITE PAD LOCK command in accordance with the present invention.

The flow chart for the READ DATA command is illustrated in FIG. 40. Initially, in step 204, the system determines whether the address specified by the STARTING ADDRESS; SIZE and HOW MANY fields is within the space 148 allocated for data in the memory map 140. If not, the command is aborted and a BAD STATUS/CHECK CONDITION flag is returned in step 206. If the address of the data to be read is within the data space 148 allocated in the memory map 140, the system is set up for a READ DATA transfer in step 208. Subsequently, in step 210, the data is transferred across the SCSI bus 106.

READ KEYS COMMAND

The READ KEYS command is used to read the keys stored with the space 150 allocated for keys in the memory map 140. This command is available to all of the channels connected to the information storage system 100.

The format for this command is illustrated in FIG. 7. The READ KEYS command consists of an op code RK D2 and an 11 byte address. The address is broken down into three fields: a STARTING ADDRESS field (A); a SIZE field (S) and a HOW MANY field (H). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

The flow chart for the READ KEYS command is illustrated in FIG. 41. Upon receipt of the READ KEYS command, the system first checks in step 212 whether the address specified by the STARTING ADDRESS field, the SIZE field and the HOW MANY field is within the address space 150 allocated for keys in the memory map 140. If not, the command is aborted and a BAD STATUS/CHECK CONDITION is returned in step 214. If the address is within the keys address space 150, the system is set up in step 216 for a READ KEYS transfer. Subsequently, in step 218, the keys records are transferred over the SCSI bus 106.

READ AUDIT COMMAND

The READ AUDIT command is used to read audit records, or a series of audit records stored in the audit space 146. This command is available to all of the channels connected to the information storage system 100.

The format of the command is illustrated in FIG. 7. The command includes an op code RA D3 and an 11 byte address. The address is broken down into three fields: a STARTING ADDRESS field (A); a SIZE field (S) and a HOW MANY field (H). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

Figure 42:
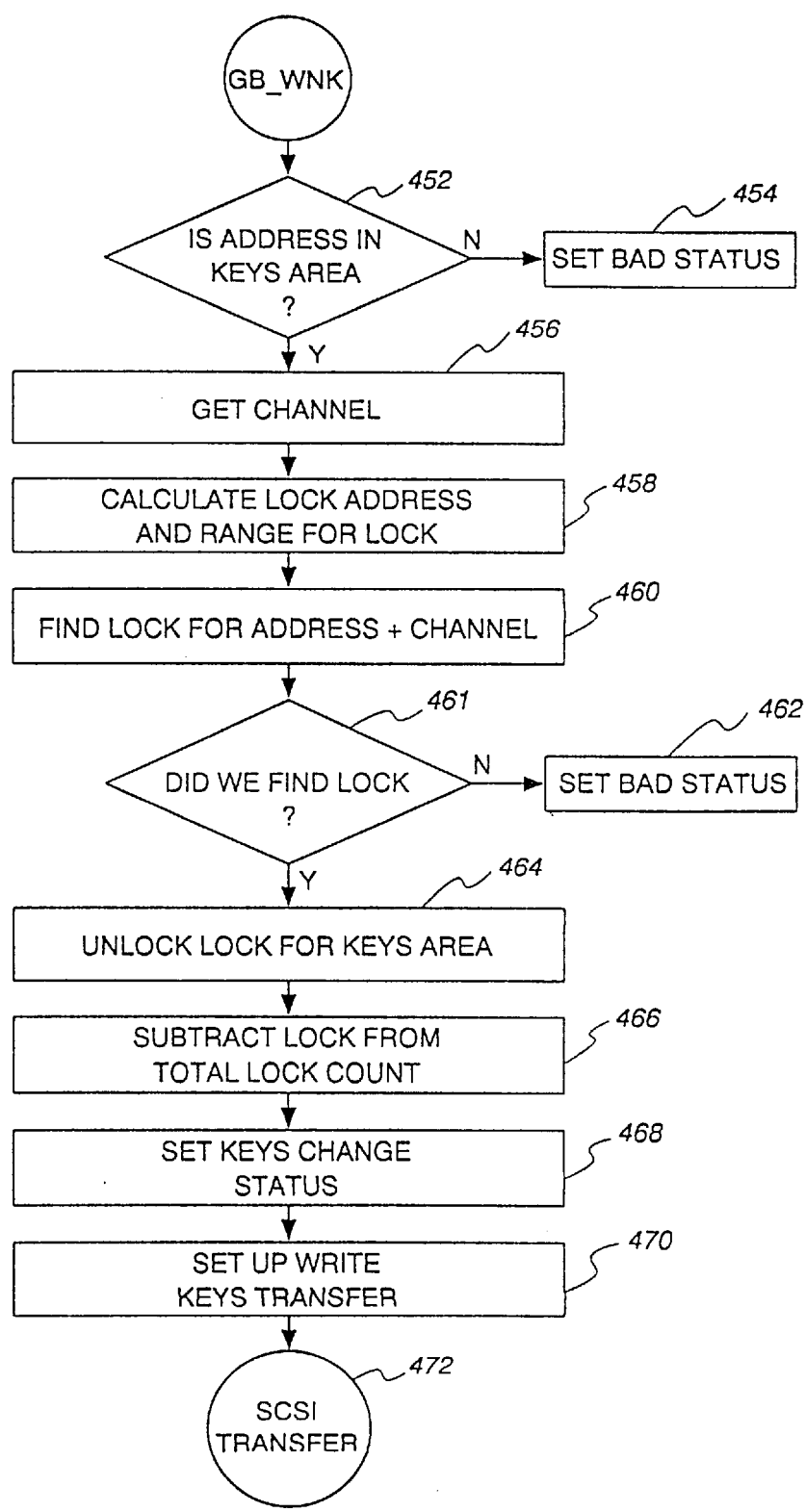
FIG. 42 is a flowchart for the WRITE NEW KEYS command in accordance with the present invention.

The flow chart for the READ AUDIT command is illustrated in FIG. 42. Upon receipt of the command, the system determines in step 220 whether the address specified by the STARTING ADDRESS field; SIZE field and HOW MANY field is within the range of addresses allocated in the memory map 140 for audit space 146. If not, the command is aborted and a BAD STATUS/CHECK CONDITION is returned in step 222. If the requested address is within the audit space 146, the system is set up in step 224 for a READ AUDIT data transfer. Subsequently, in step 226, the audit data is transferred over the SCSI bus 106.

READ SWAP COMMAND

The READ SWAP command is used to read swap records stored in the swap space 152 in the memory map 140. This command is a privileged command and only available for use by the channel master.

The command format for this command is illustrated in FIG. 7. The READ SWAP command includes an op code GB_RS D4 and an 11 byte address. The address is broken down into three fields: a STARTING ADDRESS field (A); a SIZE field (S) and a HOW MANY field (H). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

The flowchart for the READ SWAP command is illustrated in FIG. 28. As mentioned above, this command is only available for use by the channel master. Thus, upon receipt of the command, the system determines in step 228 whether the channel initiating the command is the channel master. If not, the command is aborted and a BAD STATUS/CHECK CONDITION is returned in step 230. If the channel initiating the command is the channel master, the system next determines in step 232 whether the address range specified by the command is within the space 152 allocated for swap in the memory map 140. If the address range specified is outside of the swap space 152, the command is aborted and a BAD STATUS/CHECK CONDITION is returned in step 234. If the specified address range is within the swap space 152, the system is set up for a READ SWAP transfer in step 236. Subsequently, in step 238, the swap data is transferred over the SCSI bus 106.

READ PAD COMMAND

This command is used for reading pad records of a specified size. As mentioned above, the pad space 154 is a scratch pad memory which enables the multiple hosts 104, connected to the information storage system 100, to pass messages to each other. This command is available to all of the channels connected to the information storage system 100.

The format of this command is illustrated in FIG. 8. The command consists of an op code GB_RP D5 and an 11 byte address. The address is broken down into two fields: a STARTING ADDRESS field (A) and a SIZE field (S). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field is eliminated because the system assumes only one record is requested because the pad space 154 is primarily used for transmitting messages between the hosts 104 connected to the information storage system 100.

Figure 29:
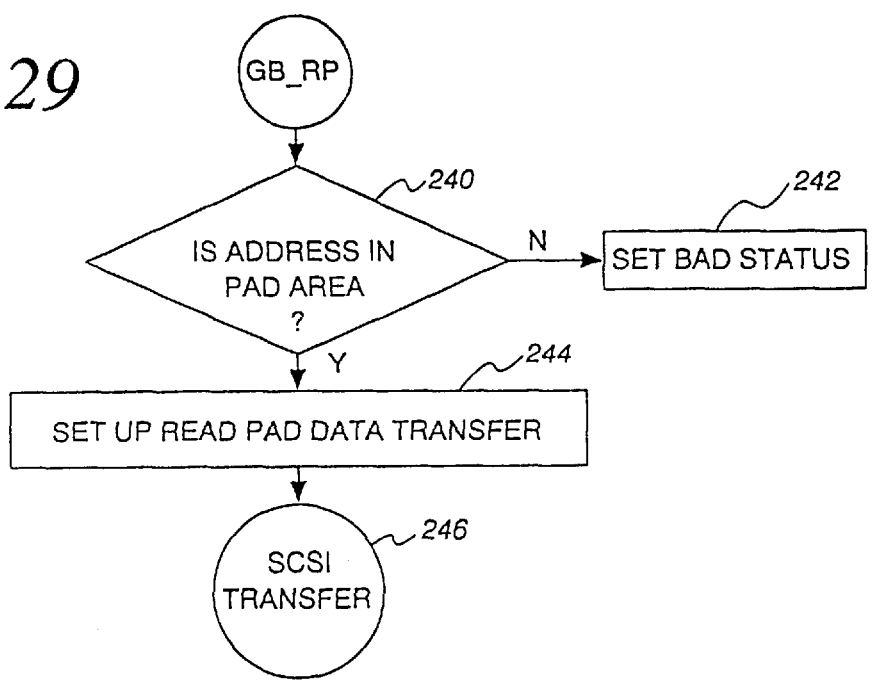
FIG. 29 is a flowchart for the READ PAD command in accordance with the present invention.

The flowchart for the READ PAD command is illustrated in FIG. 29. Upon receipt of the READ PAD command, the system determines in step 240 whether the address range specified by the STARTING ADDRESS field and the SIZE field is within the space 154 allocated for pads in the memory map 140. If not, the command is aborted and a BAD STATUS/CHECK CONDITION is returned in step 242. If the address specified by the command is within the pad space 154, the system is set up in step 244 for a READ PAD data transfer. Subsequently, step 246, the pad requested pad data is transferred over the SCSI bus 106.

READ ANY COMMAND

The READ ANY command is another special command for the channel designated as the master. This command enables the channel master to read any address space in the memory map 140.

The format for the READ ANY command is illustrated in FIG. 7. The command consists of an op code GB_RX D6 and an 11 byte address. The address is broken down into three fields: a STARTING ADDRESS field (A); a SIZE field (S) and a HOW MANY field (H). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

Figure 30:
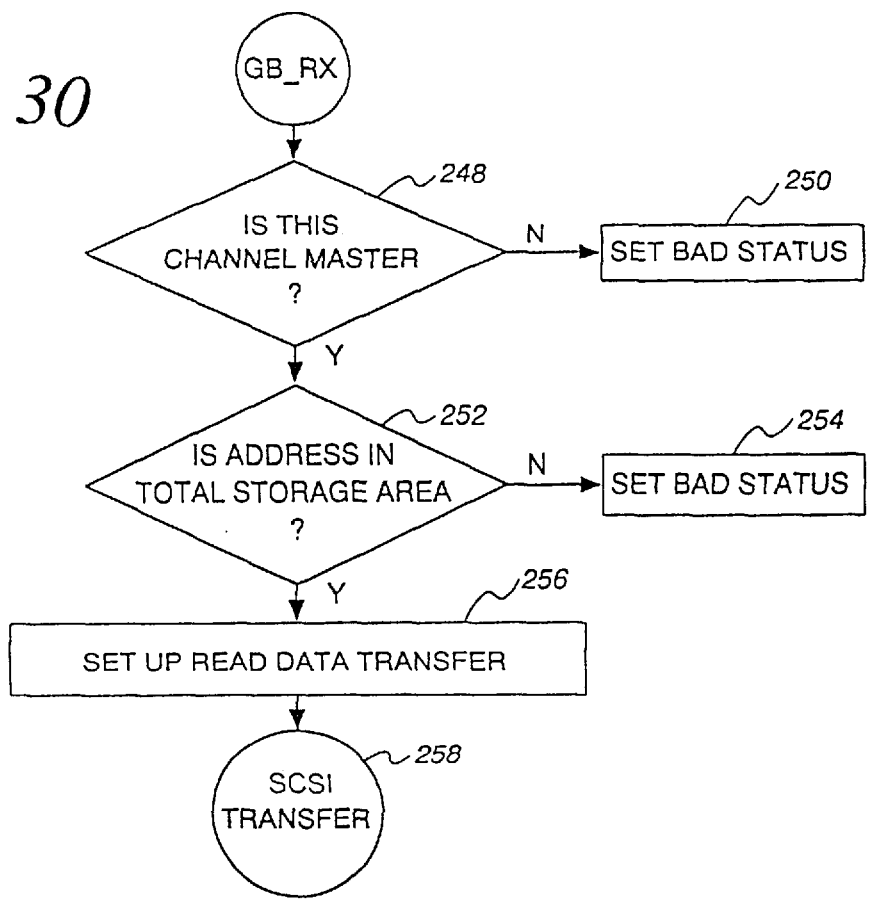
FIG. 30 is a flowchart for the READ ANY command in accordance with the present invention.

The flowchart for the READ ANY command is illustrated in FIG. 30. Upon receipt of the command, the system in step 248 determines whether the channel issuing the command is the channel master. If not, the command is aborted and a BAD STATUS/CHECK CONDITION is returned in step 250. If it is determined that the channel issuing the command is the channel master, the system next determines in step 252 whether the address specified by the command is within the total range of the memory map 140. If not, the command is aborted and a BAD STATUS/CHECK CONDITION is returned in step 254. If the address specified by the command is within the total range of addresses of the memory map 140, the system sets up for a READ DATA transfer in step 256. Subsequently, in step 258, the requested data is transferred over the SCSI bus 106.

READ PAD UNLOCK COMMAND

As mentioned above, the pads area 154 of the memory map 140 is used as a scratch pad memory to enable messages to be passed between the various hosts 104 connected to the information storage system 100. As will be discussed in more detail below, messages are written to the pad space 154 by way of a WRITE PAD LOCK command. The READ PAD UNLOCK command enables the updated pad data to be read and the lock released. This command is available to all of the channels connected to the information storage system 100.

The format for the READ PAD UNLOCK command is illustrated in FIG. 12. The command includes an op code GB_RPU D7 and an 11 byte address. The address is broken down into two fields: a STARTING ADDRESS field (A) and a SIZE field (S). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. Since the pad space 154 is used as a scratch pad for passing messages between hosts 104 connected to the information storage system 100, the HOW MANY field is assumed to be one, thus the HOW MANY field is not used for this command.

Figure 31:
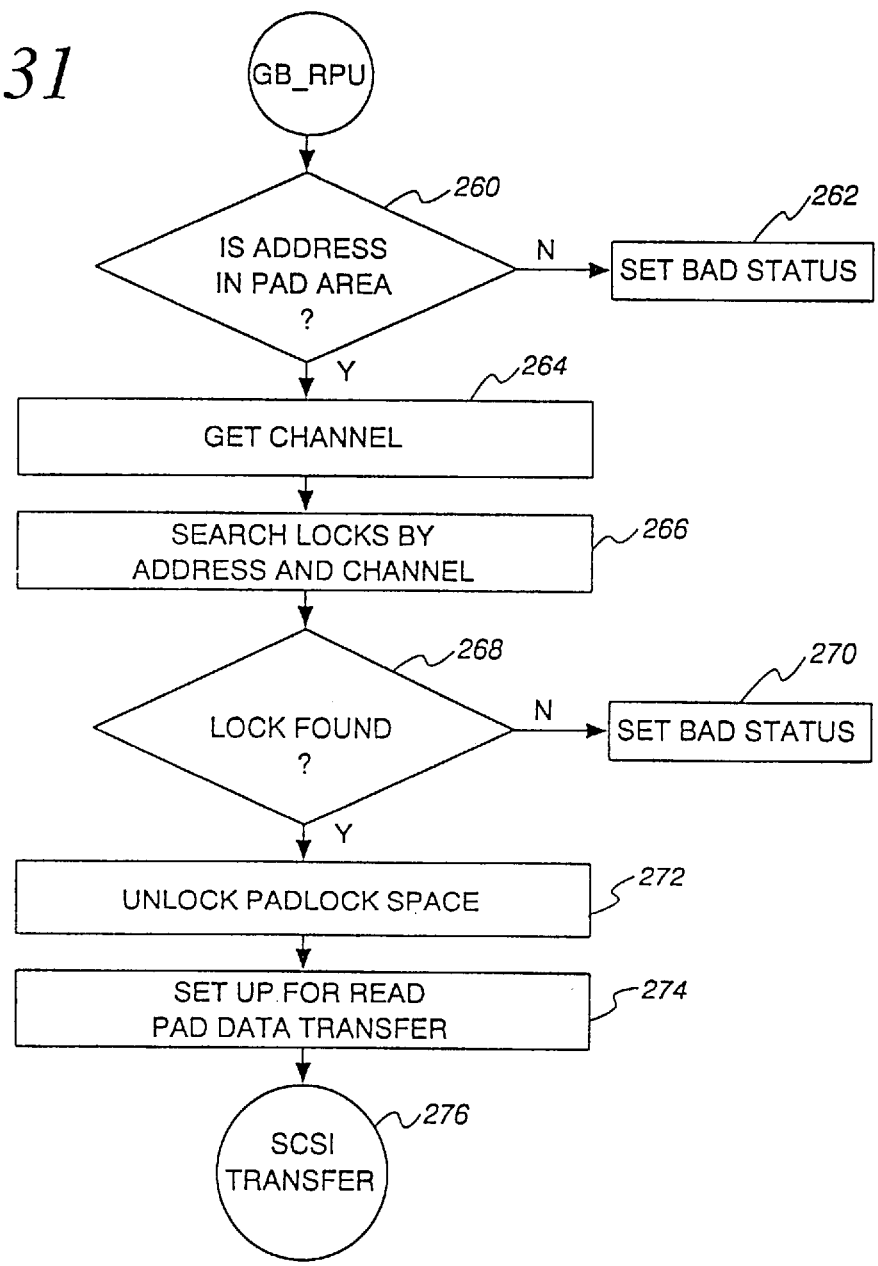
FIG. 31 is a flowchart for the READ PAD UNLOCK command in accordance with the present invention.

The flowchart for the READ PAD UNLOCK command is illustrated in FIG. 31. Upon receipt of the command, the system determines in step 260 whether the address range specified by the command is within the range of addresses provided for the pad space 154 in the memory map 140. If the requested address is outside the range, the command is aborted and a BAD STATUS/CHECK CONDITION is returned in step 262. If the range of the addresses specified by the command is within the pad space 154, the system ascertains the channel number of the channel for which the message is intended (e.g., the channel number specified by the WRITE PAD LOCK command, discussed below) in step 264. Once the channel number is ascertained, the system searches for the locks by address and channel number in step 266. Since this command only enables a previously locked pad space 154 to be unlocked, the system checks in step 268 if the address range specified by the command has been previously locked. If the lock is not found, the command is aborted and a BAD STATUS/CHECK CONDITION is returned in step 270. If the lock is found, the locked pad space 154 is unlocked in step 272 and the system is set up in step 274 for a READ PAD DATA transfer in step 274. Subsequently, the pad data is transferred in step 276 over the SCSI bus 106.

READ KEYS LOCK COMMAND

The READ KEYS LOCK command, in conjunction with a WRITE NEW KEY command enables the space 150 within the memory map 140 allotted for keys to be updated by the various hosts 104 connected to the information storage system 100. This command is available to all of the channels connected to the information storage system 100.

The format of the command is illustrated in FIG. 7. The command includes an op code GB_RKL DA and an 11 byte address. The address is broken down into three fields: a STARTING ADDRESS field (A); a SIZE field (S) and a HOW MANY field (H). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

Figure 32:
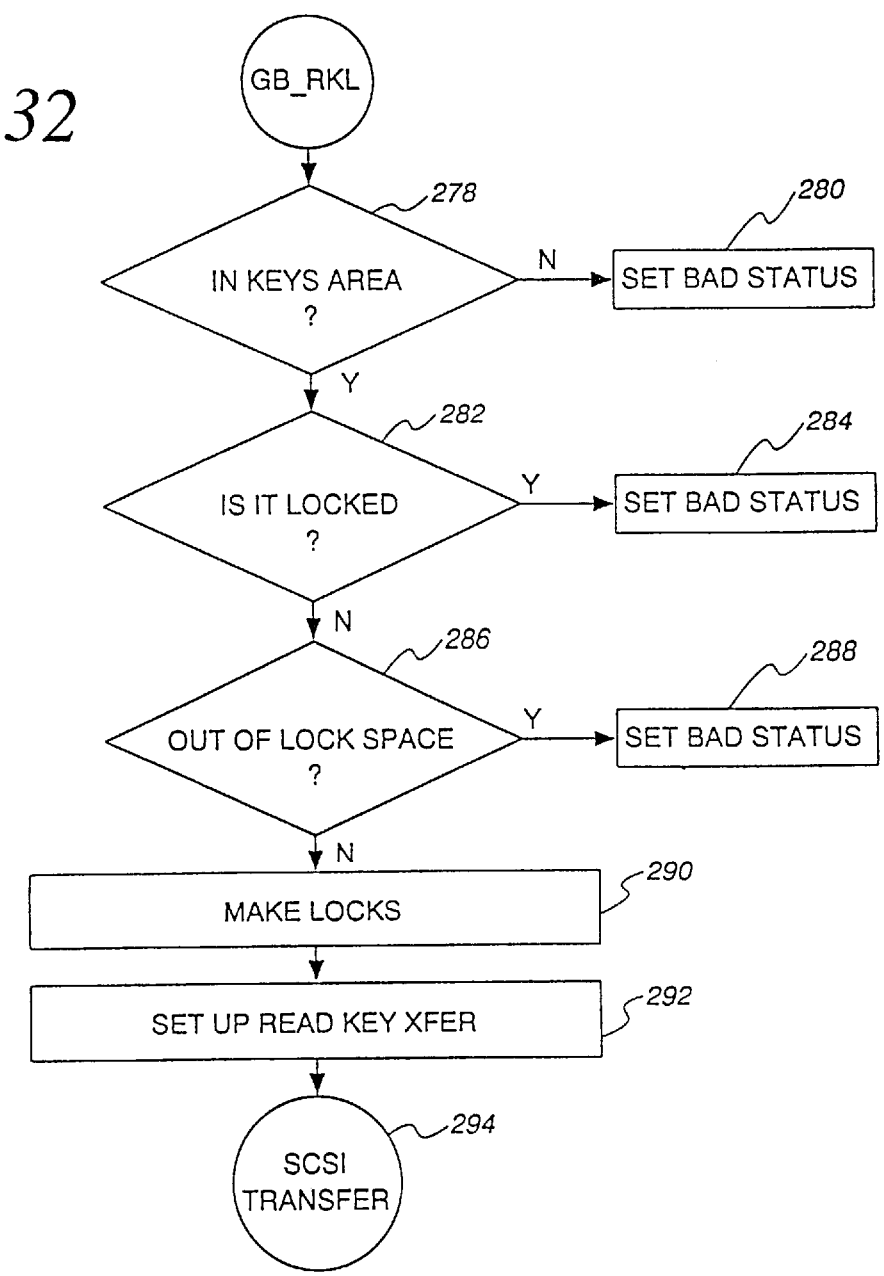
FIG. 32 is a flowchart for the READ KEYS LOCK command in accordance with the present invention.

The flowchart for the READ KEYS LOCK command is illustrated in FIG. 32. Upon receipt of the command, the system in step 278 determines if the address specified by the command is within the space 150 allocated for the keys in the memory map 140. If not, the command is aborted and a BAD STATUS/CHECK CONDITION is returned in step 280. If the address specified by the command is within the key space 150, the system checks in step 282 whether the address range specified by the command has been previously locked. If so, the command is aborted and a BAD STATUS/ CHECK CONDITION is returned in step 284. If the address specified by the command has not been previously locked, the system determines in step 286 whether there is any available lock space. If there is no available lock space, the command is aborted and a BAD STATUS/CHECK CONDITION is returned in step 288. If there is available lock space, the locks are added to the locks list by channel number and range of addresses and the total lock count is incremented in step 290. The system is then set up for a READ KEY transfer in step 292. Subsequently, in step 294, the requested data is transferred over the SCSI bus 106.

WRITE COMMANDS

WRITE MODIFY UNLOCK COMMAND

As mentioned above, various areas within the memory map 140 can be modified by any one of the hosts 104 connected to the information storage system 100 on a first come, real time basis. In order to modify the data within the space 140 allocated for data in the memory map 140, the data is read and the address space is locked by way of the READ MODIFY LOCK command, discussed above. Subsequently, the data within the data space 148 may be modified by way of the WRITE MODIFY UNLOCK command which not only enables the data to be modified but also unlocks the address space that was previously locked by the READ MODIFY LOCK command. This command is available to all channels connected to the information storage system 100.

The format for the WRITE MODIFY UNLOCK command is illustrated in FIG. 7. The command consists of an op code GB_WMU E0 and an 11 byte address. The address is broken down into three fields: a STARTING ADDRESS field (A); a SIZE field (S) and a HOW MANY field (H). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

Figure 33:
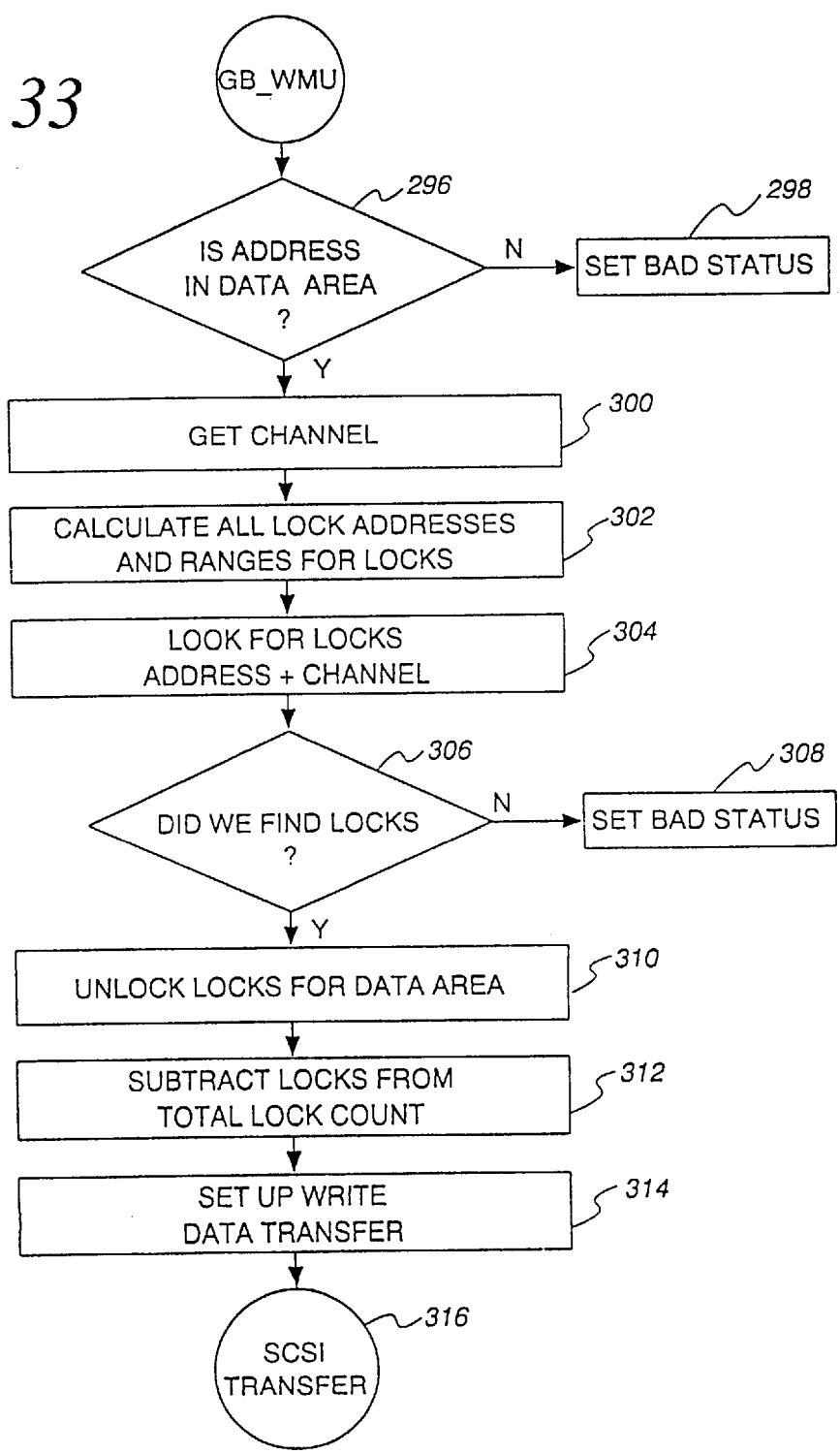
FIG. 33 is a flowchart for the WRITE MODIFY UNLOCK command in accordance with the present invention.

The flowchart for the WRITE MODIFY UNLOCK command is illustrated in FIG. 33. Upon receipt of the WRITE MODIFY UNLOCK command, the system determines in step 296 whether the address specified by the command is within the space 148 allocated for data within the memory map 140. If not, the command is aborted and a BAD STATUS/CHECK CONDITION is returned in step 298. If the address space specified by the command is within the data space 148, the system next determines in step 300 whether the channel number or host 104 that initiated the command since any locked address space can only be unlocked by the channel that initially locked the space by way of the READ MODIFY LOCK command or by way of special purpose commands available to the channel master. Thus, in step 302, the system examines the address field of the command in order to calculate the locked addresses and the range for locks for the channel issuing the WRITE MODIFY UNLOCK command. Subsequently, in step 304, the system checks for previous locks by address for the channel number issuing the command. The locks by address and channel number are then compared with the lock addresses and ranges specified by the command in step 306 for a match. If the locks are not found, the command is aborted and a BAD STATUS/CHECK CONDITION is returned in step 308. If the locks are found, the locks for the data area 148 are unlocked by removing the address ranges of the locks from the lock list in step 310. The total lock count is then decremented in step 312. After the total lock count is decremented in step 312, the system is set up for a WRITE DATA transfer in step 314. Subsequently, in step 316, the requested data is transferred over the SCSI bus 106.

WRITE DATA COMMAND

The WRITE DATA COMMAND is used to write new data to the space 148 allocated for data in memory map 140. This command is available to all of the channels connected to the information storage system 100.

The format for the WRITE DATA command is illustrated in FIG. 7. The WRITE DATA command includes an op code GB_WD E1 and an 11 byte address. The address is broken down into three fields: a STARTING ADDRESS field (A); a SIZE field (S) and a HOW MANY field (H). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

Figure 34:
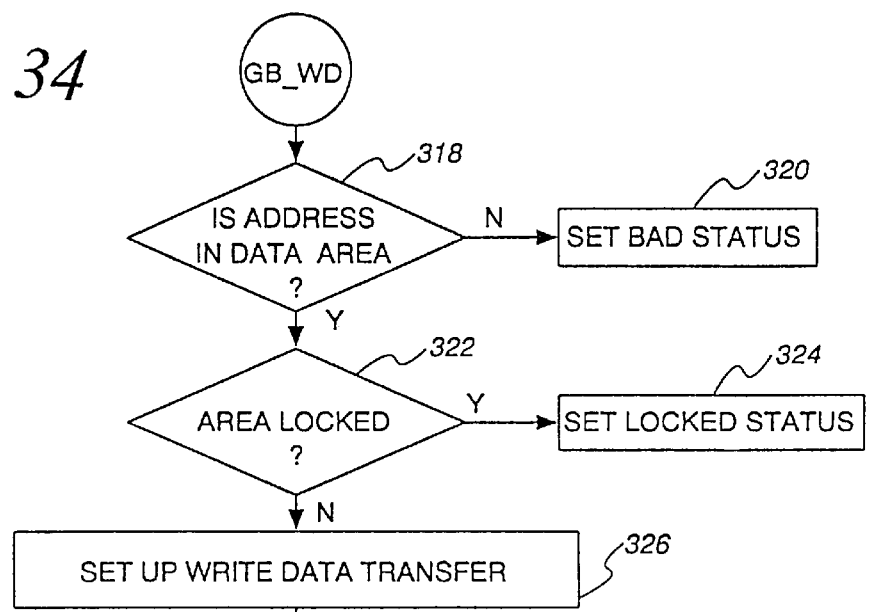
FIG. 34 is a flowchart for the WRITE DATA command in accordance with the present invention.

The flowchart for the WRITE DATA command is illustrated in FIG. 34. Upon receipt of the WRITE DATA command, the system, in step 318, determines whether the address specified by the command is within the space 148 allocated for data within the memory map 140. If the address is not within the data space 148, the command is aborted and a BAD STATUS/CHECK CONDITION is returned in step 320. If the address range specified by the command is within the data space 148, the system next checks if the address range specified by the command has been previously locked in step 322. If the address range specified by the command was locked, the command is aborted and a LOCKED STATUS is returned in step 324. If the address range specified by the command is not locked, the system is set up for a WRITE DATA transfer in step 326. Subsequently, in step 328, the data is transferred over the SCSI bus 106.

WRITE KEYS COMMAND

The WRITE KEYS command enables new keys to be written to the space 150 allocated for keys. This command is available to all of the channels connected to the information storage system 100.

The format for the WRITE KEYS command is illustrated in FIG. 7. The command includes an op code GB_WK E2 and an 11 byte address. The address is broken down into three fields: a STARTING ADDRESS field (A); a SIZE field (S) and a HOW MANY field (H). The STARTING ADDRESS field specifies the starting address. Forty (40) bits are allocated for the STARTING ADDRESS field to allow for starting addresses between 0 and $FFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

Figure 35:
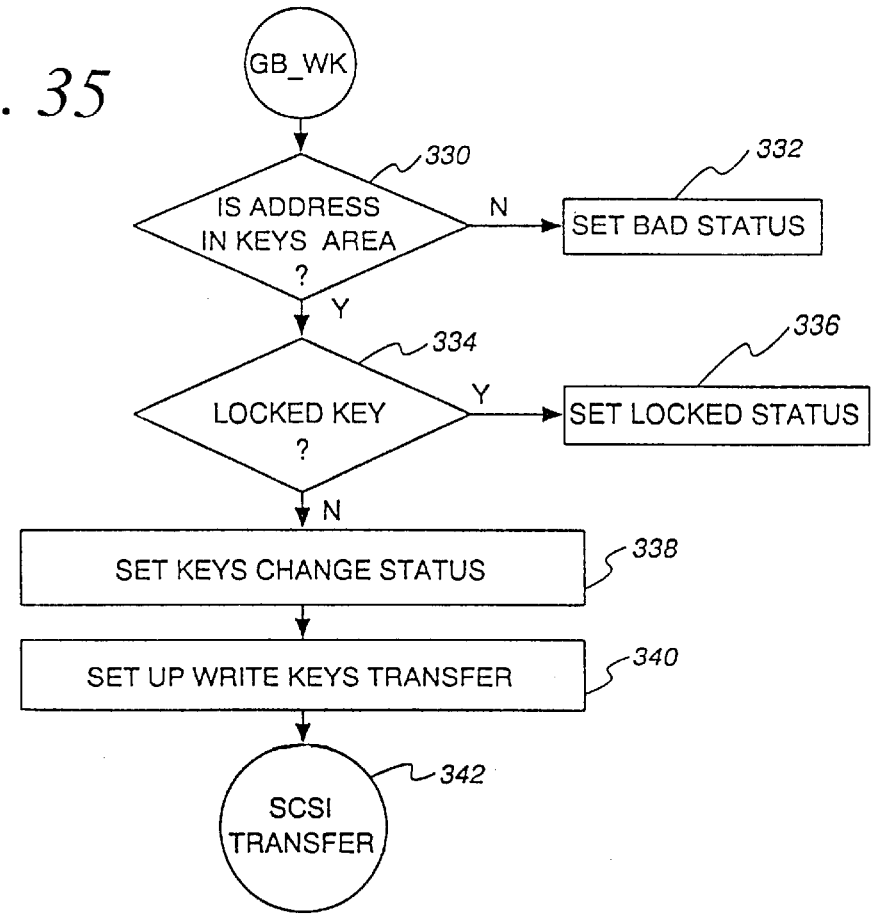
FIG. 35 is a flowchart for the WRITE KEYS command in accordance with the present invention.

The flowchart for the WRITE KEYS command is illustrated in FIG. 35. Upon receipt of the WRITE KEYS command, the system, in step 330, determines if the address specified by the command is within the space 150 allocated for the keys. If the address specified by the command is not within the keys space 150, the command is aborted and a BAD STATUS/CHECK CONDITION is returned in step 332. If the address range specified by the command is within the keys space 150, the system checks in step 334 whether the address range specified by the command has been previously locked. If the address range specified by the command has been previously locked, the command is aborted and a LOCKED STATUS is returned in step 336. If the address range specified by the command has not been previously locked, a flag is set in step 338 to indicate that the keys have changed. Subsequently, in step 340, the system is set up for a WRITE KEYS transfer. The data is then transferred over the SCSI bus 106 in step 342.

WRITE AUDITS COMMAND

The WRITE AUDITS command is used to write to the audit space 146 within the memory map 140. Anytime the keys space 150 or the data space 148 is updated, the audit space 146 is updated to enable the data to be reconstructed in the event of a catastrophic failure. The audit space 146 is set up as a first in/first out (FIFO) buffer. This command is available to all of the channels connected to the information storage system 100.

The format for the WRITE AUDITS command is illustrated in FIG. 9. The WRITE AUDITS command includes an op code GB_WA E3 and an 11 byte address. The address is broken down into two fields: a SIZE field (S) and a HOW MANY field (H). The address field is eliminated since this portion of the memory map 140 is set up as a FIFO buffer. Audits written to the audit space are written to a FIFO location that rotates within the total audit space 148. The SIZE field relates to the size or amount of address space desired. Twenty (20) bits are allocated for the SIZE field which allows for record sizes up to $FFFFF bytes. The HOW MANY field specifies the number of sequential records of the size specified by the SIZE field. Twelve (12) bits are allocated for the SIZE field which allows up to $FFF sequential records to be accessed in a single instruction.

Figure 36:
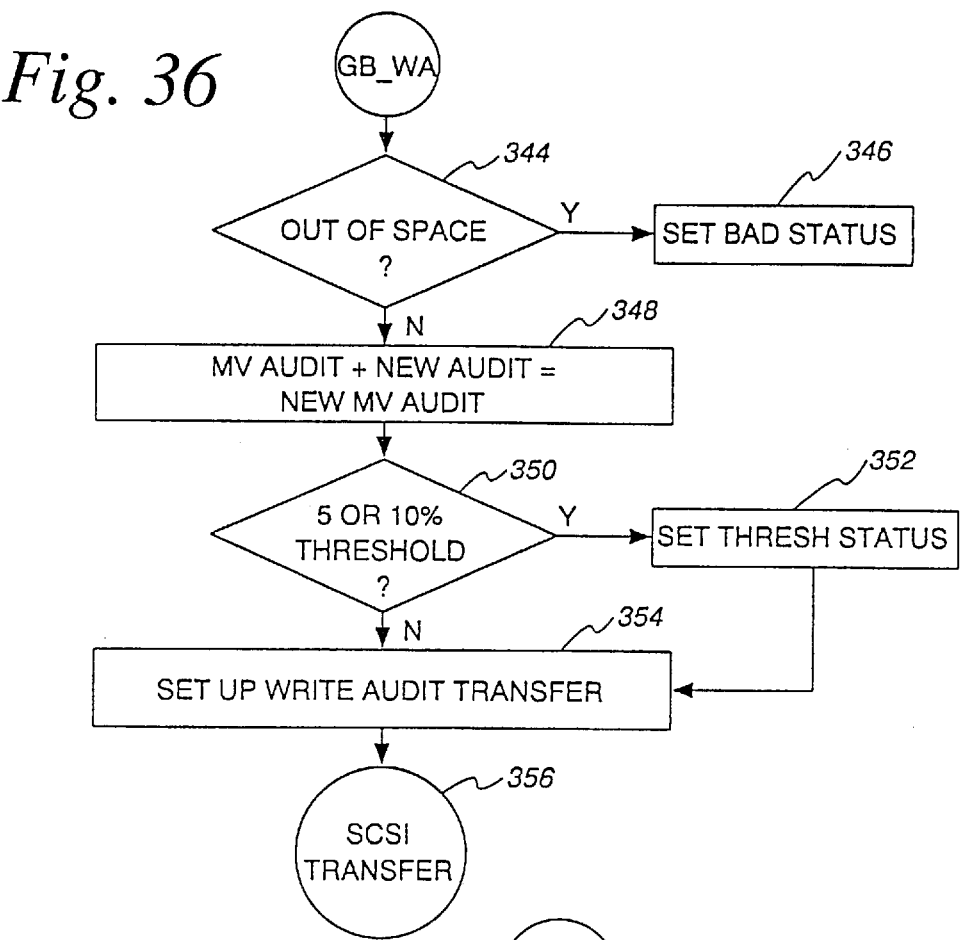
FIG. 36 is a flowchart for the WRITE AUDIT command in accordance with the present invention.

The flowchart for the WRITE AUDITS command is illustrated in FIG. 36. Initially, upon receipt of the WRITE AUDITS command, the system in step 344 determines whether there is any available space in the audit area 146 of the memory map 140. If the total space 146 allocated for audits is used up, the command is aborted and a BAD STATUS/CHECK CONDITION is returned in step 346. If the audit space 146 is not totally used up, the system calculates the amount of available audit space in step 348. In particular, as mentioned above, the audit space 146 includes a dynamic partition 144 which keeps track of the last address written to in the audit space 146. In step 348, the system adds the address range and the number of records from the SIZE and HOW MANY fields of the command to the current pointer for the dynamic partition 144 to calculate the pointer for the new partition. This is done so that the system can determine in step 350 whether the new audit data will cause the audit space 146 to be within 5% or 10% of the total capacity. If the new audit data specified by the WRITE AUDITS command decreases the remaining capacity of the audit space 146 to be within 5% or 10% of the total capacity, a THRESHOLD status is returned in step 352. However, the command is not aborted unless the total capacity of the audit space 146 is used. As long as the total capacity of the audit space 146 is not totally full, the system is set up for a WRITE AUDIT transfer in step 354. Subsequently, in step 356, the audit data is transferred over the SCSI bus 106.

WRITE SWAP COMMAND

The WRITE SWAP command enables the channel master to swap records to a scratch pad memory within a space 152 allocated for swap in the memory map 140. This command is a privileged command; only available to the channel master.

The WRITE SWAP command includes an op code GB_WS E4 and an 11 byte address. The address is broken down into three fields: a STARTING ADDRESS field (A); a SIZE field (S) and a HOW MANY field (H). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

Figure 37:
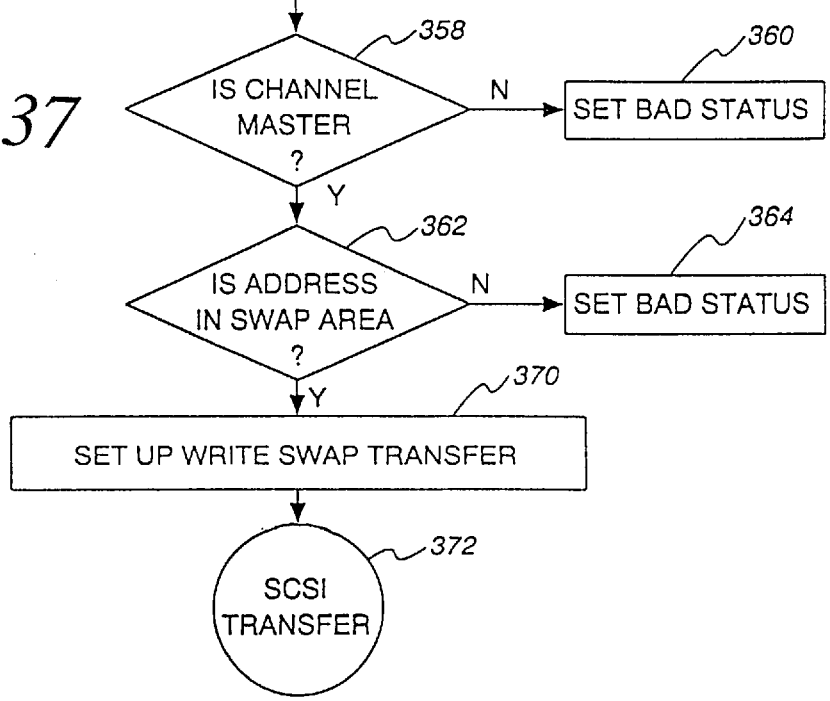
FIG. 37 is a flowchart for the WRITE SWAP command in accordance with the present invention.

The flow chart for the WRITE SWAP command is illustrated in FIG. 37. Upon receipt of the command, the system in step 358 determines if the originator of the command is the channel master. If the originator of the WRITE SWAP command is not the channel master, the command is aborted and a BAD STATUS/CHECK CONDITION is returned in step 360. If the originator of the WRITE SWAP command is the channel master, the system checks the address range specified by the command in step 362 to determine whether the address is within the space 152 allocated in the memory map 140 for swaps. If the address is not within the swap space 152, the command is aborted and a BAD STATUS/CHECK CONDITION is returned in step 364. If the address specified by the command is within the swap space 152, the system is set up for a WRITE SWAP transfer in step 370. Subsequently, the swap data is transferred over the SCSI bus 106 in step 372.

WRITE PAD COMMAND

The WRITE PAD command enables new data to be written to the space 154 allocated for pads. As mentioned, the pad space 154 is a scratch pad memory which enables the multiple hosts 104 connected to the information storage system 100 to pass messages to each other. This command is available to all of the channels connected to the information storage system 100.

The format for the WRITE PAD command is illustrated in FIG. 12. The command includes an op code GB_WP E5 and an 11 byte address. The address is broken down into two fields: a STARTING ADDRESS field (A) and a SIZE field (S). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. Since this space is used for messages, the number of records is assumed to be one. Thus, the HOW MANY field is eliminated.

Figure 38:
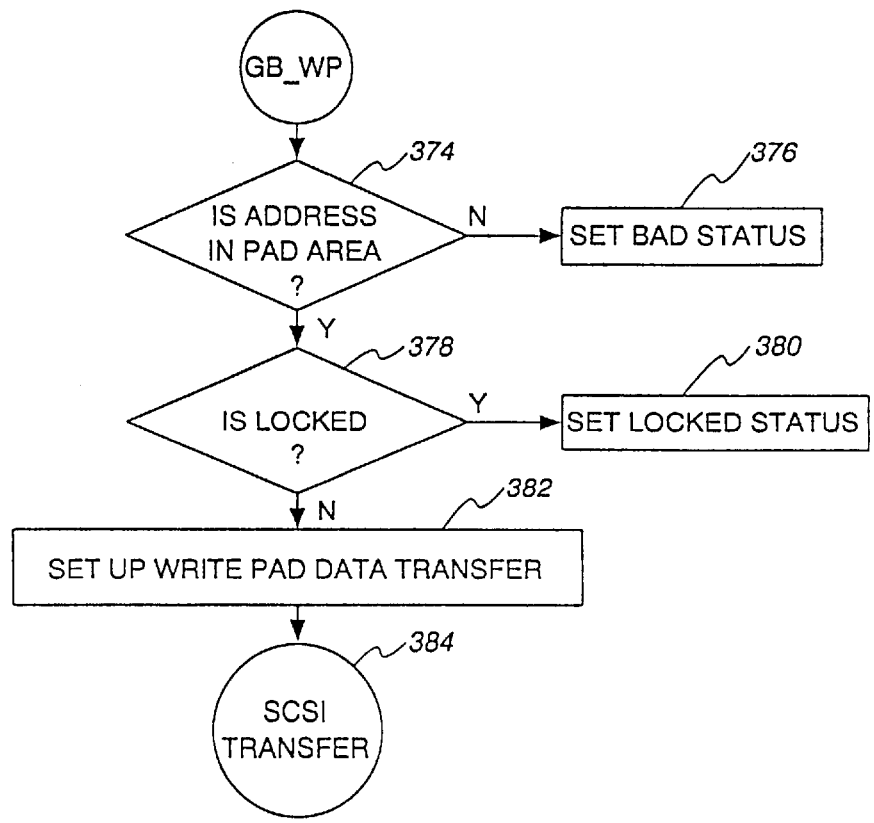
FIG. 38 is a flowchart for the WRITE PADS command in accordance with the present invention.

The flowchart for the WRITE PAD command is illustrated in FIG. 38. Upon receipt of the WRITE PAD command, the system determines in step 374 whether the address specified by the command is within the space 154 allocated for pads in the memory map 140. If the address specified by the command is not within the pad space 154, the command is aborted and a BAD STATUS/CHECK CONDITION is returned in step 376. If the address specified by the command is within the pad space 154, the system determines in step 378 whether the address specified by the command has been previously locked in step 378. If the address range specified by the command coincides with an area that has been previously locked, the command is aborted and a LOCKED STATUS is returned in step 380. If the address range specified by the command has not been previously locked, the system is set up for a WRITE PAD DATA transfer in step 382. The pad data is subsequently transferred over the SCSI bus 106 in step 384.

WRITE ANY COMMAND

The WRITE ANY command enables any address space within the memory map 140 to be written. This command is a privileged command and, thus, is only available to the channel master.

The format for the WRITE ANY command is illustrated in FIG. 7 and includes an op code GB_WX E6 and an 11 byte address. The address is broken down into three fields: a STARTING ADDRESS field (A); a SIZE field (S) and a HOW MANY field (H). The STARTING ADDRESS field specifies the starting address. Forty (40) bits are allocated for the STARTING ADDRESS field to allow for starting addresses between 0 and $FFFFFFFFFF. The SIZE field relates to the size or amount of address space desired. Twenty (20) bits are allocated for the SIZE field which allows for record sizes up to $FFFFF bytes. The SIZE field is added to the STARTING ADDRESS field to determine the ending address for the record. The HOW MANY field specifies the number of sequential records of the size specified by the SIZE field. Twelve (12) bits are allocated for the SIZE field which allows up to $FFF sequential records to be accessed in a single instruction.

Figure 39:
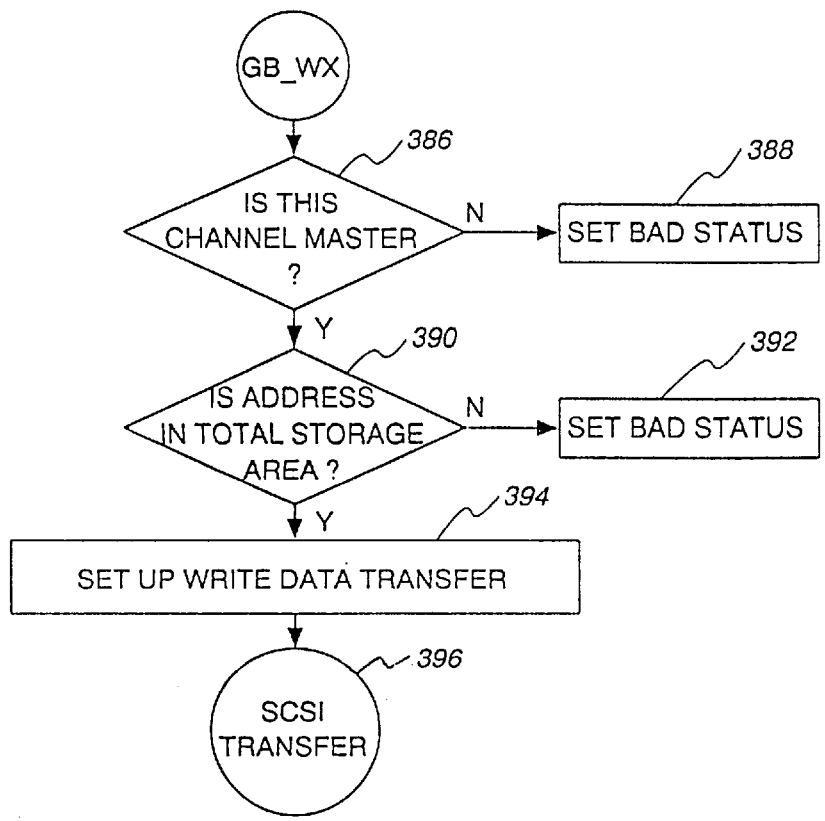
FIG. 39 is a flowchart for the WRITE ANY command in accordance with the present invention.

The flowchart for the WRITE ANY command is illustrated in FIG. 39. Upon receipt of the command, the system determines in step 386 whether the originator of the command is the channel master. If the originator of the WRITE ANY command is not the channel master, the command is aborted and a BAD STATUS/CHECK CONDITION is returned in step 388. If the originator of the WRITE ANY command is the channel master, the system determines in step 390 whether the address specified by the command is within the total storage space allocated for the memory map 140 in step 390. If the address is outside the range of the memory map 140, the command is aborted and a BAD STATUS/CHECK CONDITION is returned in step 392. If the address specified by the command is within the total storage space allocated for the memory map 140, the system sets up for a WRITE DATA transfer in step 394. Subsequently, in step 396, the data is transferred over the SCSI bus 106.

WRITE PAD LOCK COMMAND

The WRITE PAD LOCK command, used in conjunction with the READ PAD UNLOCK command, enables the multiple hosts 104 to pass messages by way of a scratch pad memory space 154. Thus, this command is available to all channels connected to the information storage system 100.

The format for the command is illustrated in FIG. 10. The command includes an op code GB_WPL E7 and an 11 byte address. The address is broken down into a CHANNEL field (C); an ADDRESS field (A) and a SIZE field (S). The CHANNEL field identifies the particular channel connected to the information storage system 100 for which the message is intended. Three (3) bits are allocated for the CHANNEL field which allows messages to be sent to any one of 8 channels. The ADDRESS field specifies the starting address for the record. Thirty-two (32) bits are allocated for the ADDRESS field which enables addresses from 0 to $FFFFFFFF to be specified. The SIZE field indicates the size of the record. Twenty (20) bits are allocated for the SIZE field which enables records up to $FFFFF size to be written.

The flowchart for the WRITE PAD LOCK command is illustrated in FIG. 40. Upon receipt of the command, the system determines in step 398 whether the address space specified by the command is within the space 154 allocated for pads in the memory map 140. If the address specified by the command is outside of the pads space 154, the command is aborted and a BAD STATUS/CHECK CONDITION is returned in step 400. If the address specified by the command is within the pad space 154, the channel number for the originator of the WRITE PAD LOCK command is ascertained in step 402. Once the channel number of the originator of the WRITE PAD LOCK command is ascertained, the system searches for locks by address and channel number in step 404. In step 406, the system determines whether the address space specified by the command has been previously locked. The system also checks in step 406 whether the size of the record specified by the WRITE PAD LOCK command will cause a space violation of the pad space 154. If the address range specified by the command was previously locked or if there is a space violation, the command is aborted and a BAD STATUS/CHECK CONDITION is returned in step 408. If the address space specified by the command has not been previously locked and will not result in a space violation of the pad space 154, the address space specified by the command is locked in step 410. Once the address space specified by the command is locked, the system is set up for a WRITE PAD DATA transfer in step 412. Subsequently, in step 414, the data is transferred over the SCSI bus 106.

WRITE NEW CHAIN COMMAND

The WRITE NEW CHAIN command reserves the memory space requested by the command and calculates the new pointers for the dynamic partitions 144 in the data space 148 and the keys space 150 after the reservation. Memory space locked by the WRITE NEW CHAIN command is adapted to be written and unlocked by the WRITE MODIFY UNLOCK and WRITE NEW KEYS command previously discussed. The WRITE NEW CHAIN command is available to all channels connected to the information storage system 100.

The format for the WRITE NEW CHAIN command is illustrated in FIG. 11. The command consists of an op code GB_WNC E8 and an 11 byte field. The 11 byte field is broken down into a DATA SIZE field and a KEY SIZE field. The DATA SIZE field specifies the address range or size of the memory space to be reserved on top of the current position of the dynamic partition 144 in the data space 148. Thirty-two (32) bits are allocated for the DATA SIZE field which enables up to $FFFFFFFF memory locations to be reserved by the command. The KEY SIZE field specifies the size or address range of the memory to be reserved on top of the dynamic partition 144 in the keys space 150. Twenty (20) bits are allocated for the KEY SIZE field to enable up to $FFFFF memory locations to be reserved by the command.

Once the space or address range is reserved, the starting addresses of the reserved memory space are returned to the originator of the command. An example of the return data is illustrated in FIG. 12. In particular, after a WRITE NEW CHAIN command is issued, the return address for the reserved memory space in both the data space 148 and the key space 150 is returned to the originator in the format illustrated in FIG. 12. In particular, 10 bytes are returned to the originator of the WRITE NEW CHAIN command. The first 5 bytes specify the starting address of the area within the data space 148 that was reserved by the command with byte 0 being the most significant byte and byte 4 being the least significant byte. The starting address of the area within the key space 150 that was reserved by the command is also returned to the originator of the command. In particular, 5 bytes are returned to the originator to specify the starting address of the reserved memory space within the keys area 150 with byte 5 being the most significant byte and byte 9 being the least significant byte.

Figure 25:
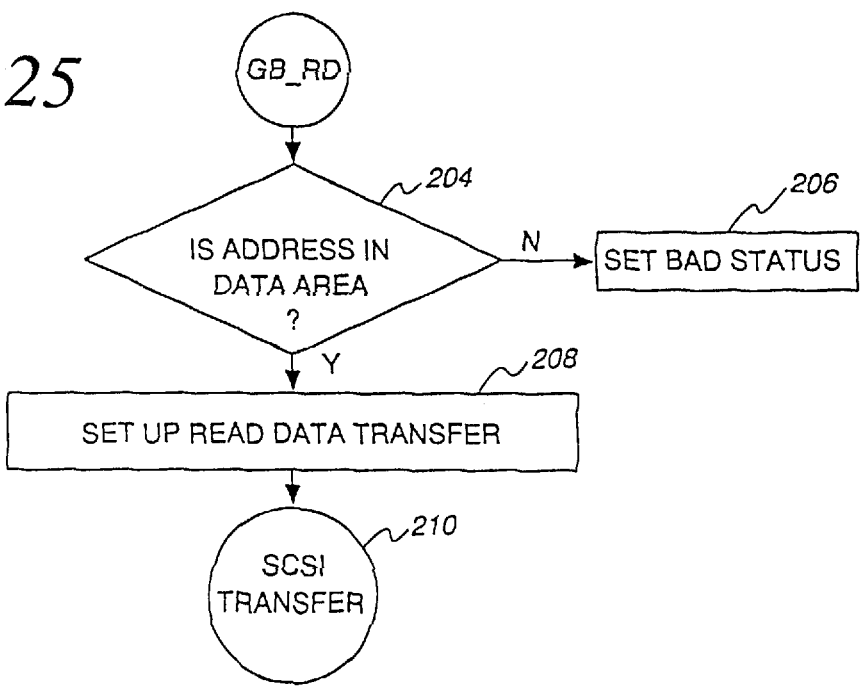
FIG. 25 is a flowchart for the READ DATA command in accordance with the present invention.
Figure 26:
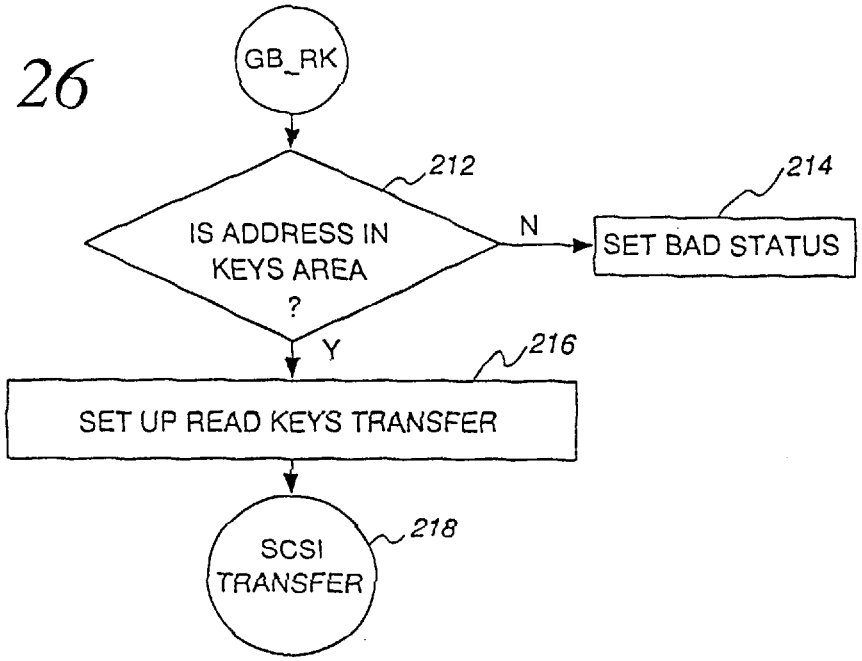
FIG. 26 is a flowchart for the READ KEYS command in accordance with the present invention.
Figure 41A:
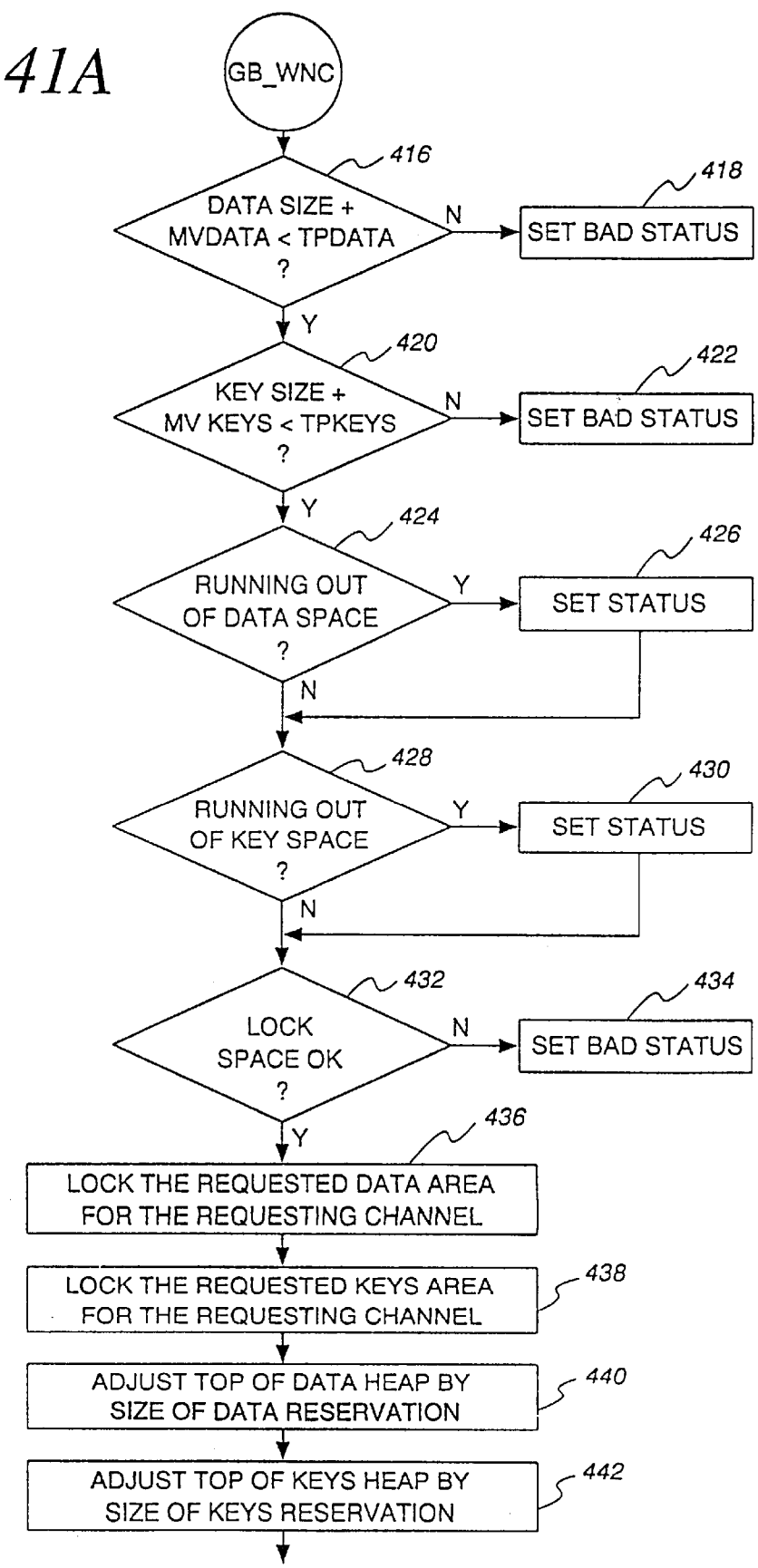
FIGS. 41A and 41B are flowcharts for the WRITE NEW CHAIN command in accordance with the present invention.
Figure 41B:
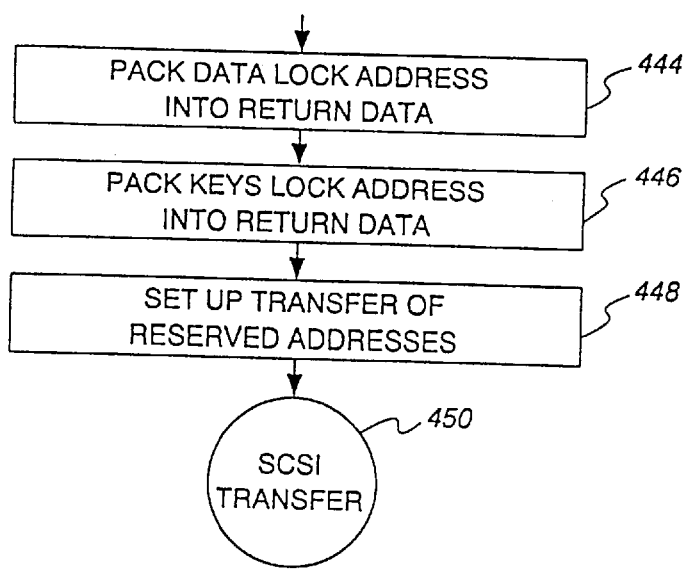

The flowchart for the WRITE NEW CHAIN command is illustrated in FIGS. 41A and 41B. Initially, upon receipt of the WRITE NEW CHAIN command, the system in step 416 sums the data size from the DATA SIZE field in the command with the address pointer for the dynamic partition 144 in the memory space 148 allocated for data within the memory map 140. If the amount of data specified will not fit in the available space above the dynamic partition 144, the command is aborted and a BAD STATUS/CHECK CONDITION is returned in step 418. If the amount of data specified by the WRITE NEW CHAIN command will fit in the available data space 148, the system next checks in step 420 whether the command will fit in the available key space 150 by summing the key size from the KEY SIZE field with the dynamic address pointer 144 from the key space 150. If the amount of memory specified by the command for keys is greater than the amount of key space 150 available, the command is aborted and a BAD STATUS/CHECK CONDITION is returned in step 422. If there is available key space 150 to accommodate the memory space specified for the keys by the command, the system proceeds to step 424 to ascertain the amount of data space 148 available after the data space specified by the command is incorporated. The system next checks if the amount of data space 148 available is less than a predetermined percentage of the total memory space available in the data space 148, for example, 5%. If so, a STATUS flag is set in step 426. However, as long as there is available data space 148 to accommodate the command, the command is not aborted and the system proceeds to step 428. The system also proceeds directly to step 428 if the amount of data space 148 is not below a predetermined minimum after the amount of data space 148 is accommodated by the command. In step 428, the system examines the amount of key space 150 after accommodating the amount of key space specified by the command. If the amount of key space 150 is less than a predetermined minimum, for example, 5% to 10% of the total key space 150 after the amount of key space 150 specified by the command is accommodated, a STATUS flag is set in step 430. However, the command is not aborted as long as there is available key space 150 to accommodate the amount of key space 150 specified by the command. After the STATUS flag is set, the system proceeds to step 432. The system will also proceed to step 432 if the amount of key space 150 is not less than the predetermined minimum amount of key space after accommodating the amount of key space 150 specified by the command. In step 432, the system checks the amount of lock space. If there is no available lock space, the command is aborted and a BAD STATUS/CHECK CONDITION is returned in step 434. If there is available lock space, the system proceeds to step 436 and locks the memory address in the data space 148 specified by the command for the requesting channel in step 436. After the data space 148 is locked, the system proceeds to step 438 and locks the memory addresses in the keys space 150 specified by the command for the requesting channel. After the key space 150 is locked, the dynamic partition 144 in the data space 148 is adjusted. In particular, the new pointer for the dynamic partition 144 within the data space 148 is calculated by adding the data size from the DATA SIZE field in the WRITE NEW CHAIN command to the pointer for the dynamic partition 144 just prior to the command to determine the ending address of the data within the data space 148 in order to calculate the new pointer for the dynamic partition 144 in step 440. After the new dynamic partition 144 is calculated for the data space 148, the system proceeds to step 442 where the dynamic partition 144 for the key space 150 is calculated in a similar manner. Once the new pointers are calculated for the dynamic partitions 144 in the data space 148 and the key space 150, the system packs the data lock address in step 444 and the keys lock address in step 446 and returns it to the requesting channel in a format as illustrated in FIG. 25. Subsequently, the system is set up to transfer the return data lock address and key lock address data in step 448. The return data, as illustrated in FIG. 25, is then transferred over the SCSI bus 106 in step 450.

WRITE NEW KEYS COMMAND

The WRITE NEW KEYS command (FIG. 7) enables new keys to be written in the area locked by the WRITE NEW CHAIN command. After the new keys are written to the key space 150, the command unlocks the addresses in the key space 150. However, only the channel which initiated the WRITE NEW CHAIN or a READ KEYS LOCK command can unlock the addresses in the keys space 150 reserved by that command. This command is available to all of the channels connected to the information storage system 100.

The command consists of an op code GB_WNK EA and an 11 byte address. The address is broken up into three fields; a STARTING ADDRESS field, a SIZE field and a HOW MANY field. The STARTING ADDRESS field specifies the starting address for the record to be written by the command. Forty (40) bits are allocated for the address field which enables starting addresses between 0 and $FFFFFFFFFF. The SIZE field specifies the size of the record. The SIZE field is added the STARTING ADDRESS field to provide the ending address for the record. Twenty (20) bits are allocated for the SIZE field which enables records up to size $FFFFF. The HOW MANY field specifies the number of sequential records to be written of the size specified by the SIZE field. Twelve (12) bits are allocated for the SIZE field which allows up to $FFF records to be written with a single command.

The flowchart for the WRITE NEW KEYS command is illustrated in FIG. 42. Upon receipt of the command, the system ascertains in step 452 whether the address specified by the command is within the space 150 allocated for the keys within the memory map 140. If the address specified by the command is outside of the key space 150, the command is aborted and a BAD STATUS/CHECK CONDITION is returned in step 454. If the address specified by the command is within the key space 150, the system proceeds to step 456 to ascertain the channel number of the channel issuing the WRITE NEW KEYS command. This is done because only the channel which issued either a WRITE NEW CHAIN or a READ KEYS LOCK command can unlock the reserved addresses in the key space 150 with a WRITE NEW KEYS command. After the channel number of the channel issuing the WRITE NEW KEYS command is ascertained, the system, in steps 458 and 460, compares the addresses specified by the WRITE NEW KEYS command with existing locks for that channel. If there are no locks in the key space 150 which coincide with the address range specified by the WRITE NEW KEYS command as determined in step 461, the command is aborted and a BAD STATUS/CHECK CONDITION is returned in step 462. If locks are found which coincide with the address range specified by the WRITE NEW KEYS command for that channel, the addresses are unlocked in step 464. After the addresses are unlocked, the total lock count is decremented in step 466. After the total lock count is properly adjusted, a STATUS flag is set in step 468 which indicates that the key space 150 has been updated. After the STATUS flag has been set, the system is set up for a WRITE KEYS transfer in step 470. Subsequently, in step 472, the keys data is transferred over the SCSI bus 106.

SPECIAL PURPOSE COMMANDS

UNLOCK ADDRESS COMMAND

The UNLOCK ADDRESS command enables each channel to unlock any address range within the data space 148 or keys space 150 that it previously locked. As such, this command is available to all channels connected to the information storage system 100.

The format for the UNLOCK ADDRESS command is illustrated in FIG. 13. The command consists of an op code GB_UADD D8 and an 11 byte address. Five (5) bytes or 40 bits are allocated for an ADDRESS field which enables starting addresses between 0 and $FFFFFFFFFF to be unlocked. The remaining bytes are either reserved or ignored.

Figure 43:
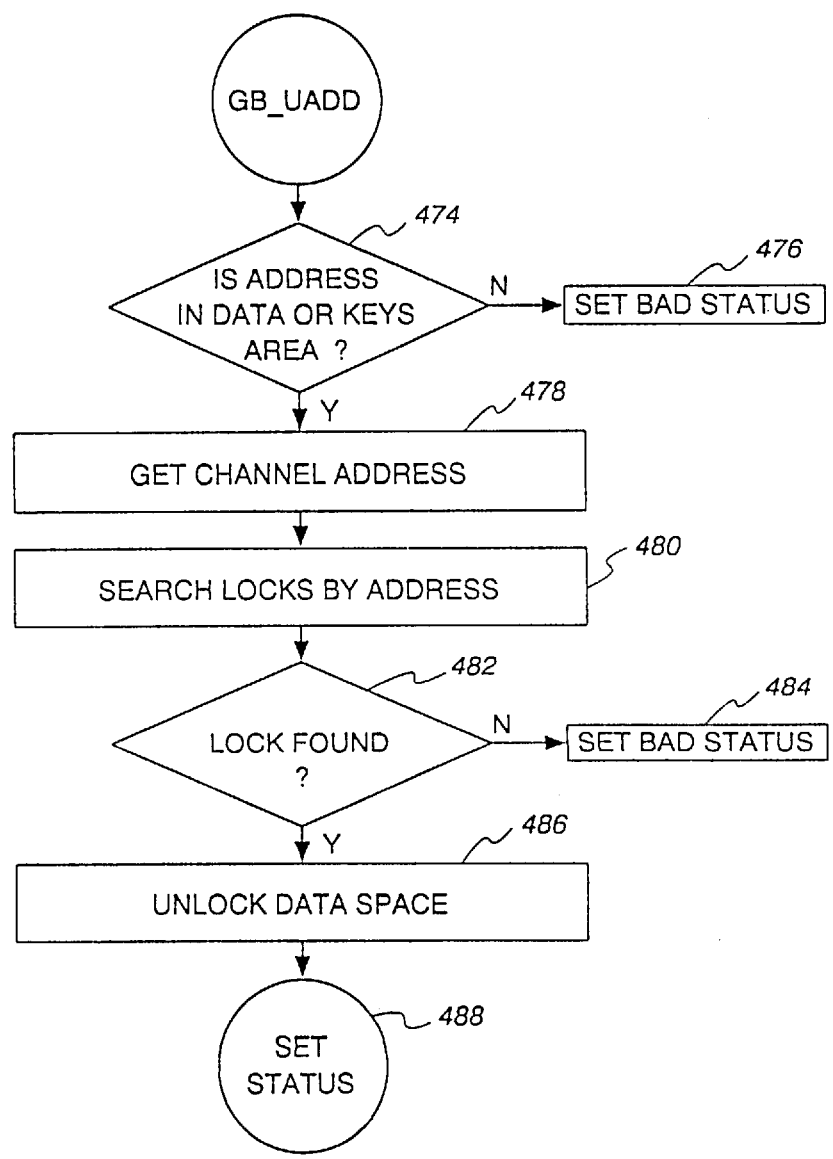
FIG. 43 is a flowchart for the UNLOCK ADDRESS command in accordance with the present invention.

The flowchart for the UNLOCK ADDRESS command is illustrated in FIG. 43. Since this command can only be used to unlock reserved memory addresses within the data space 148 and key space 150, the system checks in step 474 whether the address specified by the command is within the space 148 or 150 allocated for data in the memory map 140. If the address specified by the command is outside of the data space 148 and key space 150, the command is aborted and a BAD STATUS/CHECK CONDITION is returned in step 476. If the address specified by the command is within the data space 148 and key space 150, the system ascertains the channel number of the channel issuing the UNLOCK ADDRESS command in step 478. Once the channel number of the channel issuing the command is ascertained, the system searches for locks in the data space 148 by address and channel number in step 480. In step 482, the system compares the address specified by the UNLOCK ADDRESS command with all locks stored for that channel. If no locks are found which correspond to the address space specified by the command for that channel, the command is aborted and a BAD STATUS/CHECK CONDITION is returned in step 484. If the locks for the channel correspond to the address specified by the command for that channel, the data space is unlocked in step 486 and, since no data is being transferred by the command, a STATUS flag is set in step 488.

PUNLOCK ADDRESS COMMAND

The PUNLOCK ADDRESS command is used to unlock addresses previously locked in the space 154 allocated for pads in the memory map 140. Since the pad space 154 is a scratch pad memory which enables the multiple channels or hosts 104 to pass messages among each other, this command is privileged and only available to the channel master.

The format for the PUNLOCK ADDRESS command is illustrated in FIG. 27. The command consists of an op code GB_PU D9 and an 11 byte address of which all but 5 bytes are reserved. In particular, five (5) bytes or 40 bits of the address are allocated as an ADDRESS field for specifying the starting address of the lock in the space 154 allocated for pads within the memory map 140. The 40 bits allows for starting addresses between 0 and $FFFFFFFFFF.

Figure 44:
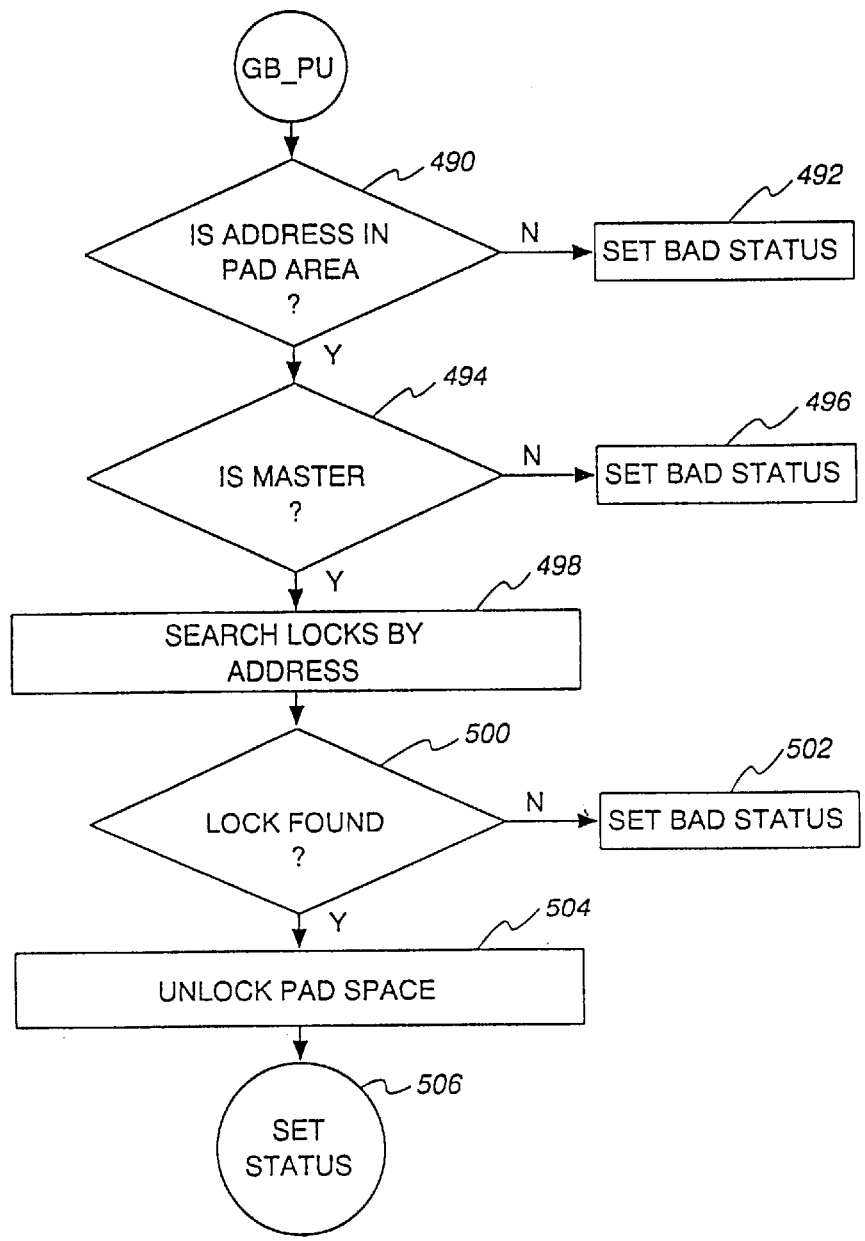
FIG. 44 is a flowchart for the PUNLOCK ADDRESS command in accordance with the present invention.

The flowchart for the PUNLOCK ADDRESS command is illustrated in FIG. 44. Upon receipt of the command, the system first checks in step 490 whether the address specified by the command is within the space 154 allocated for pads in the memory map 140. If the address specified by the command is outside of the pad space 154, the command is aborted and a BAD STATUS/CHECK CONDITION is returned in step 492. If the address specified by the command is within the pad space 154, the system next checks in step 494 whether the channel issuing the PUNLOCK ADDRESS command is the channel master. If the channel issuing the command is not the channel master, the command is aborted and a BAD STATUS/CHECK CONDITION is returned in step 496. If the channel issuing the PUNLOCK ADDRESS command is the channel master, locks are searched by address in step 498 for all channels. If there are no locks found within the pad space 154 as determined in step 500, the command is aborted and a BAD STATUS/CHECK CONDITION is returned in step 502. If locks are found within the pad space 154 in step 500, the addresses are unlocked and the total lock count is decremented in step 504. After the locks are unlocked in step 504, a STATUS flag is set in step 506 since no data is being transferred by the command.

SET MASTER COMMAND

As mentioned above, the information storage system 100, in accordance with the present invention, allows multiple hosts 104 to be connected to the system 100. As mentioned above, many of the commands are available only to the particular host 104 designated as the channel master. The SET MASTER command enables any one of the multiple hosts 104 connected to the system 100 to be designated as the channel master. In addition, the SET MASTER command enables the current host 104 designated as the channel master to be changed and another host 104 to be designated as the channel master.

The format for the SET MASTER command is illustrated in FIG. 14. The SET MASTER command includes an op code GB_SETM 01 and a 5 byte CHANNEL field. As illustrated in FIG. 29, all bits in the CHANNEL field are ignored except the least significant bit or CHANNEL bit of byte 1. If this bit is set, then the channel issuing the command will be designated as the channel master as long as there are no other hosts 104 connected to the information storage system 100 designated as a master. This command may also be used to change the particular channel designated as a master. In particular, a current channel master can issue this command with the CHANNEL bit cleared which will change its status such that it is no longer the channel master. Subsequently, any channel can issue the SET MASTER command with the channel set bit set to become the new channel master. However, only one host 104 connected to the system 100 can be a designated master at a given time.

Figure 45:
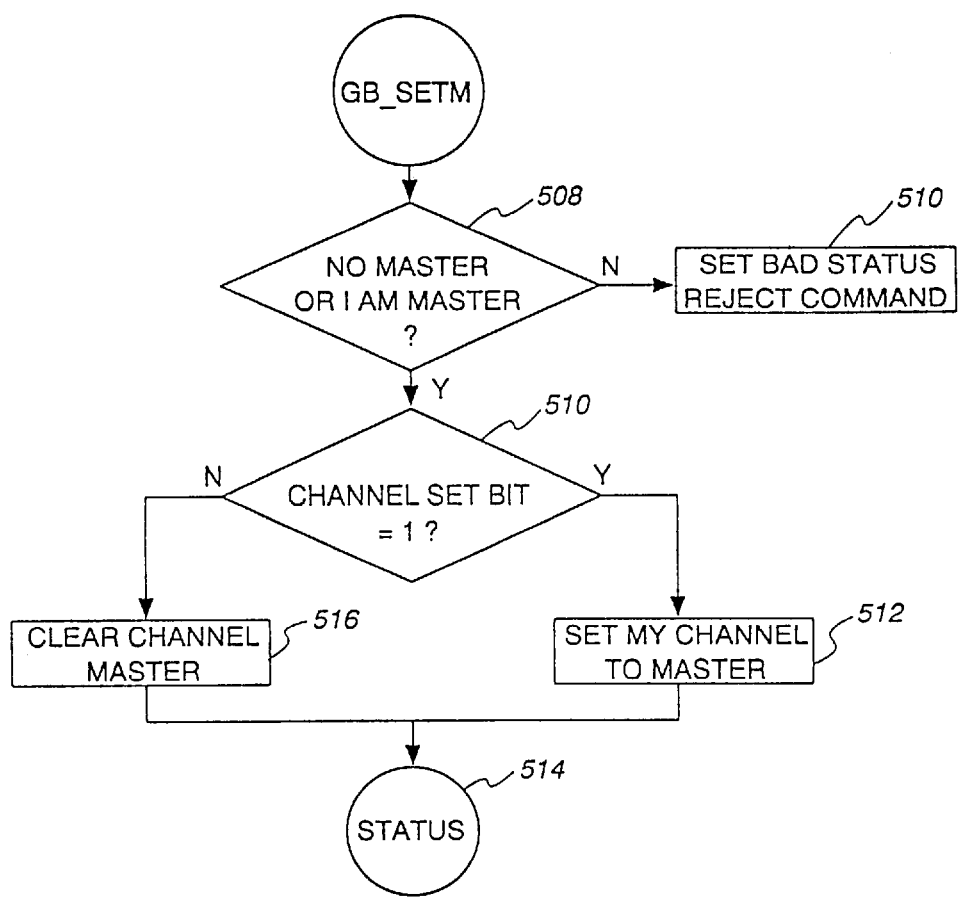
FIG. 45 is a flowchart for the SET MASTER command in accordance with the present invention.

The flowchart for the SET MASTER command is illustrated in FIG. 45. Upon receipt of the command, the system determines in step 508 whether the channel issuing the command is the current channel master or whether or not there are any other channels connected to the system 100 have been designated as the master. If the channel issuing the SET MASTER command is not the current master channel and one of the other channels connected to the system 100 is designated as the master, the command is aborted and a BAD STATUS/CHECK CONDITION is returned in step 510. If the channel issuing the SET MASTER command is the current channel master or if there are no current channels currently designated as the master, the system proceeds to step 510 to determine if channel set bit is set. If the channel set bit is set, the channel issuing the SET MASTER command becomes the master channel in step 512 and a STATUS flag is set in step 514. If the channel set bit is cleared; the status of the current channel master is cleared in step 516. After the channel master status is cleared in step 516, a STATUS flag is set in step 514 since no data is transferred by this command. Subsequently, any of the other channels can issue the SET MASTER command to become the channel master.

NEW DATABASE COMMAND

The NEW DATABASE command is a privileged command that can only be issued by the channel master. Therefore, it is necessary that the channel issuing the command first assume the status of channel master by way of the SET MASTER command. The NEW DATABASE command enables the channel master to set up the memory map 140 illustrated in FIG. 4. With this command, 45 or $2D bytes are transferred from the channel master to the controller 103 to set up the memory map 140. In particular, the NEW DATABASE command specifies both the fixed partitions 142 and the dynamic partitions 144 for the audit space 146, data space 148, key space 150, swap space 152 and pad space 154. As shown in FIG. 16, a table of 45 or $2D bytes which specifies the pointers for the fixed partitions 142 is sent by the channel master to the controller 103 to set up the memory map 140. In particular, with reference to FIG. 16, the $2D or 45 bytes are broken down into nine 5 byte addresses. Four (4) 5 byte addresses (STAUDIT, STDATA, STKEYS, STSWAP) are used to define pointers for the fixed partitions 142 used as the starting addresses for the audit space 146, data space 148, key space 150 and swap space 152, respectively. Three 5 byte addresses (MVKEYS, MVADIT, MVDATA) are used to define the pointers for the initial addresses of the dynamic partitions 144 for the key space 150, audit space 146 and a data space 148, respectively. One 5 byte address (ENDAUDIT) defines the pointer for the fixed partition 142 used as the ending address for the audit space 146. By specifying the beginning address for the swap space 152 (STSWAP) and the ending address (ENDAUDIT) for the audit space 146 and adding these addresses to the fixed and non-user configurable address spaces 156, the address range of the entire memory map 140 is specified. In particular, as shown in FIG. 4, $100 words of space 156 are reserved on the top and bottom of the memory. This space 156 is reserved for diagnostics and the controller 103 memory map. Thus, starting at the bottom of the memory, the reserve space 156 occupies addresses 0–$FF.

In addition, the starting addresses, STAUDIT, STDATA, STKEYS and STSWAP, define the addresses for the fixed partitions 142 for the audit space 146, data space 148, key space 150, swap space 152 and pad space 154. In particular, the starting address (STSWAP) for the swap space 152 defines the common fixed partition 142 between the pad space 154 and the swap space 152. Since the diagnostic space 156 at the bottom of the memory defines the fixed partition 142 for the pad space 154, the entire pad space 154 is specified. Similarly, the starting addresses (STKEYS, STDATA and STAUDIT) define the fixed partitions 142 for the swap space 152, key space 150 and data space 148. As mentioned above, the fixed partition for the top of the audit space 144 is specified in the command to define the audit space 144.

The dynamic partitions 144 for the audit space 146, data space 148 and key space 150 are specified by the addresses; MVDATA, MVKEYS, MVADIT and BTAUDIT. These addresses specify a starting or an initial address pointer for the dynamic partitions 144 for the audit space 146, data space 148 and key space 150, respectively. As mentioned above, the system, in accordance with the present invention, adjusts the dynamic partition as a function of the data written to each of these areas of the memory map 140.

The table illustrated in FIG. 16 is defined by the database manager to set up the memory map 140 illustrated in FIG. 4 for a particular database application of interest. In applications where the information storage system 100 issued for other than databasing, the various data space memory areas, such as the keys 150 and audit space 146, can be redefined or relabeled for other uses. Irrespective of the number of independent areas of the memory 140 defined, $2D or 45 bytes are issued by the channel master to the controller 103. Unused areas of the memory map 140 can be configured out.

The format for the NEW DATABASE command is illustrated in FIG. 15. The NEW DATABASE command includes an op code GB_NEWDB 02 and a 5 byte SIZE field. All of the bytes in the SIZE field are ignored except byte 4. This byte defines the number of address bytes in the table illustrated in FIG. 16. As shown, the upper nibble of byte 4 is configured as a $2 while the lower nibble of byte 4 is configured as a $D to indicate that the size of the table illustrated in FIG. 31 is $2D or 45 bytes.

Figure 46:
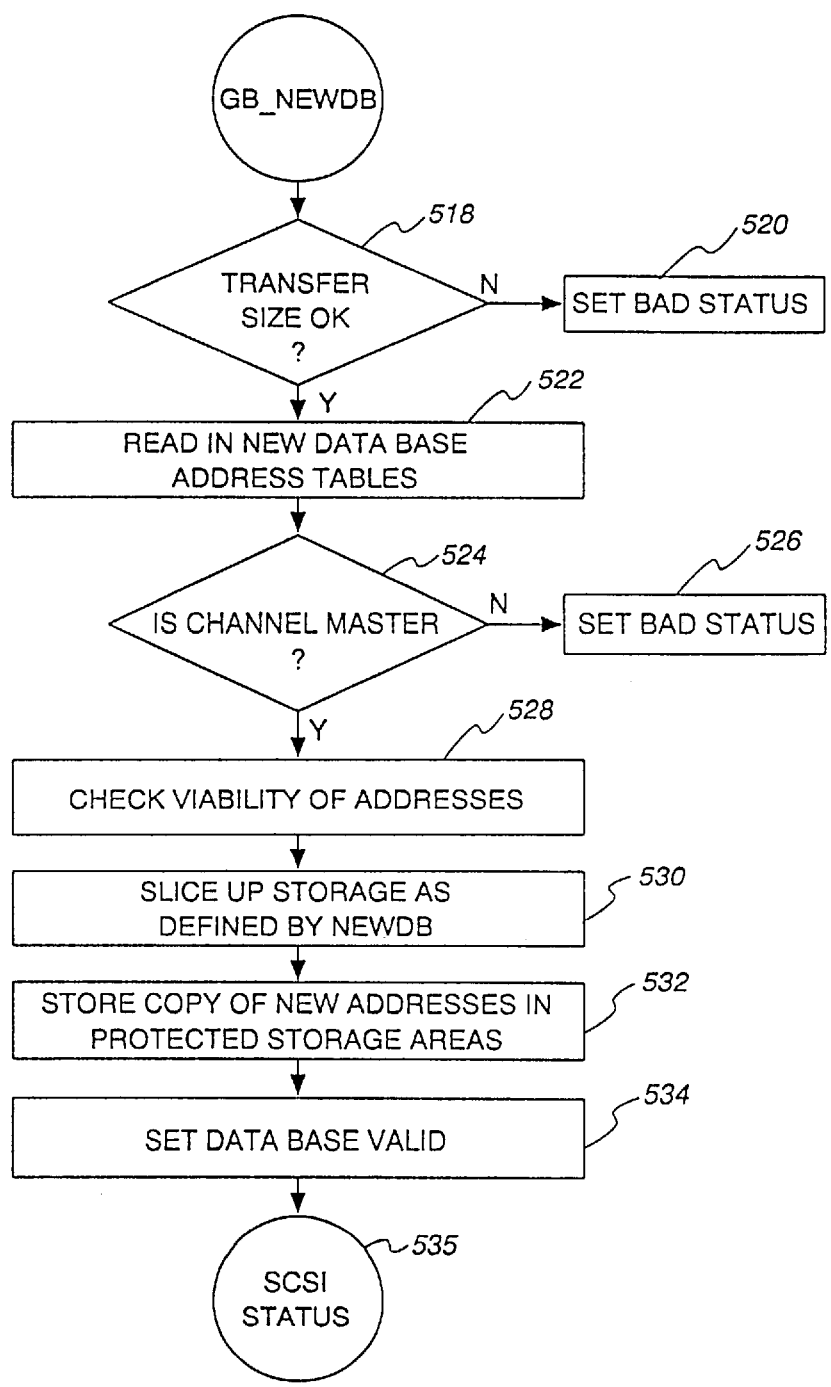
FIG. 46 is a flowchart for the NEW DATABASE command in accordance with the present invention.

The flowchart for the NEW DATABASE command is illustrated in FIG. 46. Initially, in step 518, the system examines the transfer size. In particular, byte 4 of the SIZE field of the command is ascertained to determine if its set for $2D bytes. If not, the command is aborted and a BAD STATUS/CHECK CONDITION is returned in step 520. If the SIZE field of the command is configured for $2D, the system reads in the new database table illustrated in FIG. 16 in step 522 and stores the table dynamically in memory. Once the new database address tables are read into memory, the system next checks, in step 524, whether the channel issuing the NEW DATABASE command is the channel master. If the channel issuing the NEW DATABASE command is not the channel master, the command is aborted and a BAD STATUS/CHECK CONDITION is returned in step 526. If the channel issuing the NEW DATABASE command is the channel master, the system proceeds to step 528 and checks the new database address table for viability. In particular, the new database address table is checked to make sure that the addresses for the various areas of the memory map do not overlap. Once the viability of the addresses in the new database address tables is checked, the system sets the new address pointers in step 530 for the fixed partitions 142 and dynamic partitions 144 for all of the various portions of the memory map 140 defined by the table illustrated in FIG. 16 (e.g., audit space 146, data space 148, keys space 150, swap space 152 and pads space 154). After the pointers for the partitions 142 and 144 are determined, additional copies of the new database address table are stored in various protected memory storage areas, for example, one or both of the special purpose storage spaces 156 in step 532. After the new database address table is stored in a protected area, a flag is set in step 534 to indicate the existence of a valid database. The database valid flag may be used to drive a prompt after boot-up to indicate the existence of the valid database. Subsequently, a SCSI status is set in step 535.

LOCKS CHANNEL COMMAND

The LOCKS CHANNEL command can be issued by any channel connected to the information storage system 100 to audit the lock information for any or all of the channels connected to the information storage system 100. Once the LOCKS CHANNEL command is issued, the locks data in the format illustrated in FIG. 18 is returned to the channel originating the command, as discussed below.

The command includes a mode bit which, if set, specifies lock information for all channels. In addition, 3 channel bits are provided to enable the lock information for a particular channel to be requested. The command also enables the originator to specify the amount of data to be transferred back. If there is more locks data than that specified in the command, an F bit is set in the return field.

The format of the LOCKS CHANNEL command is illustrated in FIG. 17. The LOCKS CHANNEL command includes an op code GB_LCKS 04 and a 5 byte field. Byte 5 is ignored. In addition, the upper nibble of byte 1 is ignored. The lower nibble of byte 1 includes the mode bit and the channel bits. In particular, the mode bit is bit 3 of byte 1. If this bit is set, lock information for all channels will be returned to the originating channel. If the mode bit is cleared, lock information for the channel specified by the channel bits will be returned to the originating channel. Bits 0, 1 and 2 of byte 1 are reserved for the channel bits. These bits are used to designate any one of eight channels when the mode bit is cleared. Bytes 2–4 relate to an ALLOCATION LENGTH field with byte 2 being the most significant byte and byte 4 being the least significant byte. This ALLOCATION LENGTH field specifies the amount of data bytes to be returned to the originating channel. These 3 bytes enable up to $FFFFFF or 16 megabytes of data to be requested. In the event that there is more locks data than requested, an F bit will be set in the return field to indicate the same to the originating channel.

Figure 47:
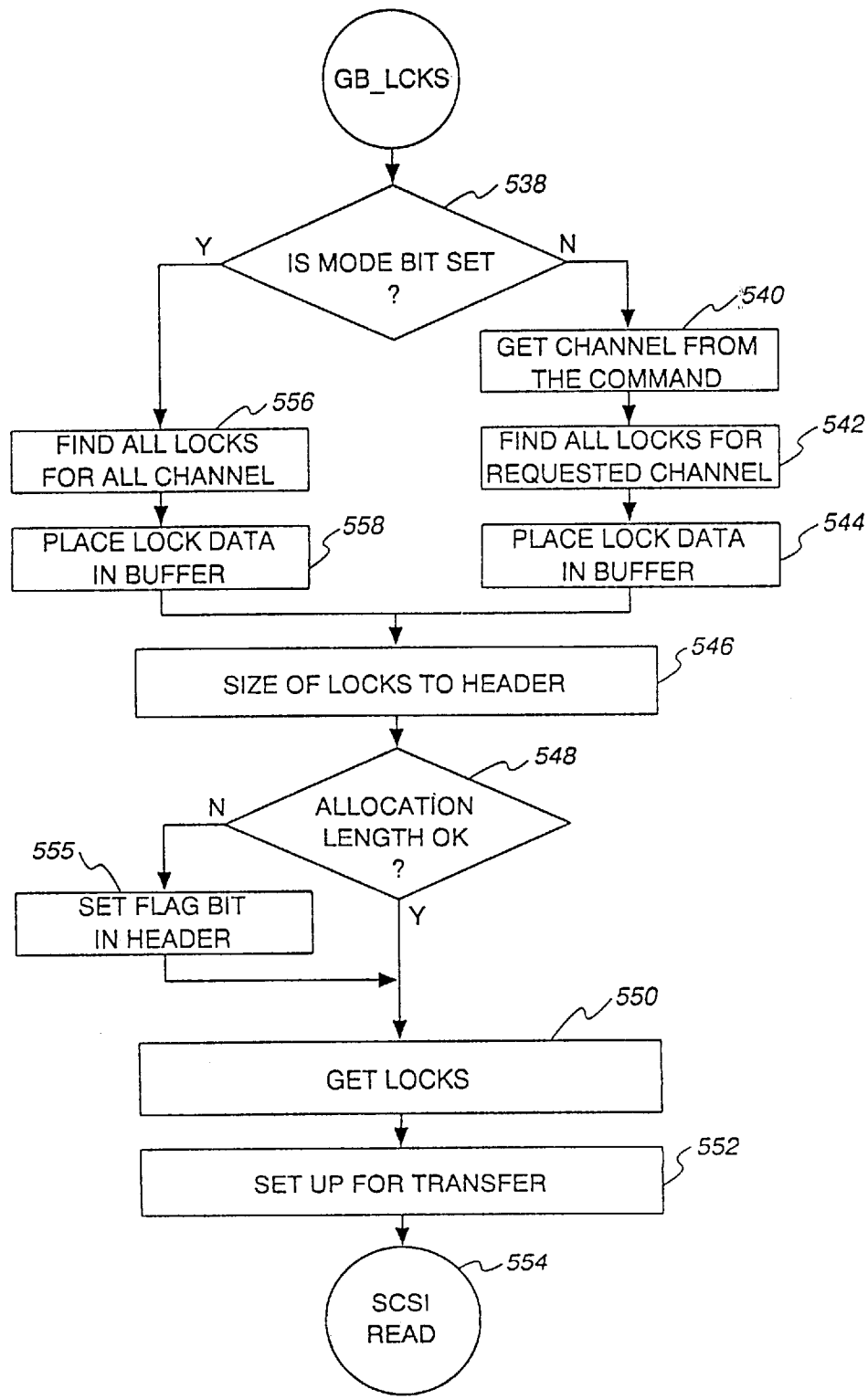
FIG. 47 is a flowchart for the LOCKS CHANNEL command in accordance with the present invention.

The flowchart for the LOCKS CHANNEL command is illustrated in FIG. 47. Upon receipt of the command, the system checks, in step 538, whether the mode bit has been set. If the mode bit has not been set indicating that the locks information for all channels is not specified, the system gets the channel number from the command in step 540. After the channel number is obtained from the command in step 540, the system proceeds to find all lock data for the channel specified by the command in step 542. The lock data is then stored in a buffer in step 544. After the lock data for the specified channel is stored in a buffer, the size of the lock data is packed into the header for the return data to the originating channel as illustrated in FIG. 33 in step 546. After the size of the lock data is packed into the header, the system ascertains from the command whether the allocation length for the size of data requested from the command is adequate for the size of the lock data in the buffer in step 548. If the ALLOCATION LENGTH from the command is sufficient for the lock data stored in the buffer, the lock data is packed into the return data illustrated in FIG. 18 in step 550. The system is then set up for transfer and transferred back to the originating channel in steps 552 and 554. If the more locks data is stored in the buffer than requested by the command, the flag is set in the header of the return data in step 555. Subsequently, the available locks data is returned in steps 550, 552 and 554.

If the mode bit in the command is set indicating that the lock information for all channels is specified, the system proceeds to step 556 and finds all lock data for all channels connected to the system 100. After the lock data for all channels is located, it is stored in a buffer in step 558. Once the lock data for all channels is stored in the buffer, the size of the data is packed into the header for the return data in step 546. The system subsequently ascertains in step 548 whether the amount of data in the buffer is greater than the amount specified in the command. If so, a FLAG BIT is set in the return data in step 555 and the lock data is transferred in steps 550, 552 and 554. If the amount of data for all of the channel locks stored in the buffer is equal to less than the amount of data requested by the command, as determined in step 548, the lock data is merely transferred to the originating channel in steps 550, 552 and 554.

The format for the return data is illustrated in FIG. 18. In particular, five (5) bytes are allocated for the header. The most significant bit of the most significant byte of the header is an F bit, used by the system 100 to indicate whether the amount of lock data exceeds the amount of data requested in the ALLOCATION LENGTH field of the command. This F bit is set when the amount of data exceeds the amount of data requested. The F bit is cleared when the amount of data is less than or equal to the amount of data requested. The balance of the bits in the first byte of the header are ignored.

The header includes four (4) additional bytes (L) which specify the byte length of the lock data to follow (e.g., lock data stored in the buffers in steps 538 and 544 in FIG. 62). The second byte of the header is the most significant byte while the fifth byte of the header acts as the least significant byte. The 4 bytes allocated enable the system to indicate that up to $FFFFFFFF bytes will follow.

The lock data is concatenated onto the header. As illustrated, the lock data for two locks is illustrated. However, as indicated above, if the mode bit M is set in the command, the lock data for all channels is specified. Thus, the amount of locks data returned in this situation will depend upon the total number of locks. Similarly, when the mode bit in the command is cleared, the return data to the originating channel consists of the header and the locks data for a single channel.

Twelve (12) bytes are allocated for the lock data for each lock. The first byte, represented as a C field, is used to represent the channel number that has locked the particular address ranges. The second byte, represented as an F field, is primarily used when messages are passed between channels in the scratch pad space 154. This byte indicates the channel that originated the lock. In particular, as discussed above, the WRITE PAD LOCK command may be used by any of the channels to pass a message and lock an area of the pad space 154 or any of the other channels connected to the system 100. When this is done, the first byte (C field) of the lock data will indicate the channel owning the lock (e.g., the channel for which the message is intended), while the F field will indicate the channel which originated the lock.

The next five (5) bytes of the channel lock data (represented as an E field) represent the five (5) byte address of the last word locked for the channel specified in the C field+1. Byte 2 of the channel lock data is utilized as the most significant byte while byte 6 is used to specify the least significant byte. Five (5) bytes, represented as an S field, are also allocated to represent the address of the first word locked for the channel specified by the C field. In particular, byte 7 is used to specify the most significant byte while byte 11 specifies the least significant byte.

UNLOCK ALL COMMAND

The UNLOCK ALL command is a privileged command which is only available to the channel master. This command is normally used by the channel master when the database gets hung up.

The format for the UNLOCK ALL command is illustrated in FIG. 19. The command consists of an op code GB_UALL 05 and a 5 byte field, which is ignored by the system.

Figure 48:
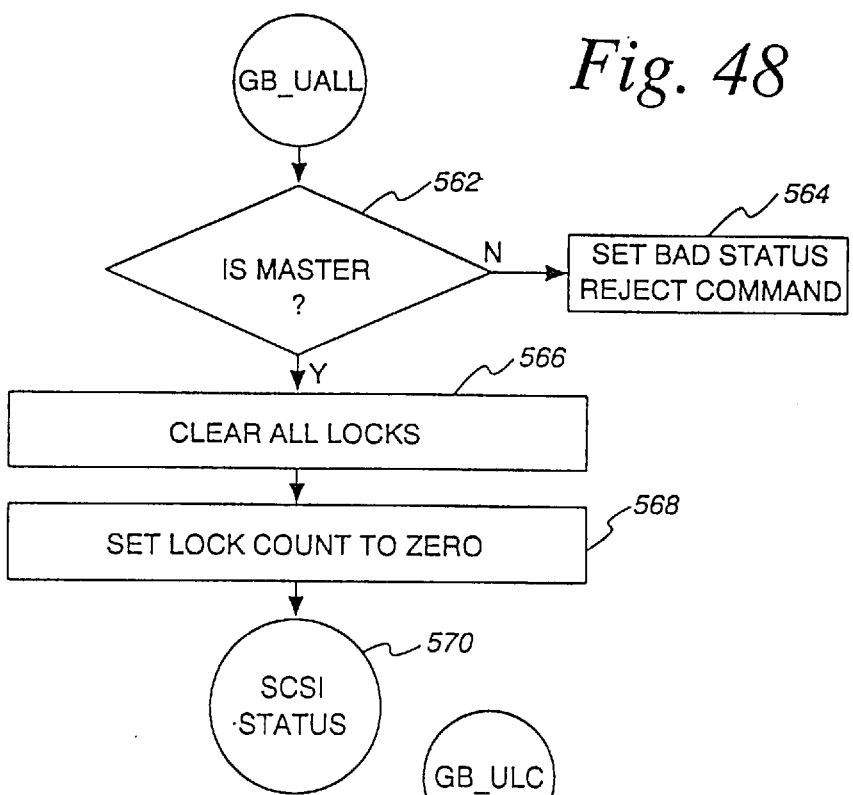
FIG. 48 is a flowchart for the UNLOCK ALL command in accordance with the present invention.

The flowchart for the UNLOCK ALL command is illustrated in FIG. 48. Initially, upon receipt of the command, the system checks in step 562 whether the channel initiating the command is the channel master. If the channel issuing the UNLOCK ALL command is not the channel master, the command is aborted and a BAD STATUS/CHECK CONDITION is returned in step 564. If the channel issuing the UNLOCK ALL command is the channel master, all locks for all channels are cleared in step 566. Once all of the locks for all of the channels are cleared, the lock count is set to 0 in step 568 and a STATUS flag is set in step 570.

UNLOCK CHANNEL COMMAND

The UNLOCK CHANNEL command is used to unlock locks for a particular channel. This command enables the channel master to unlock the locks for any channel in the system. The command also enables any channel to unlock its own locks.

The format for the command is illustrated in FIG. 20. The command consists of an op code GB_ULC 06 followed by 5 bytes. Byte 1 is used as a CHANNEL field. All but 3 bits, represented as a CHANNEL field, of byte 1 are ignored. These 3 bits are used to specify the channel for the locks to be unlocked. The remaining 4 bytes are ignored.

Figure 49:
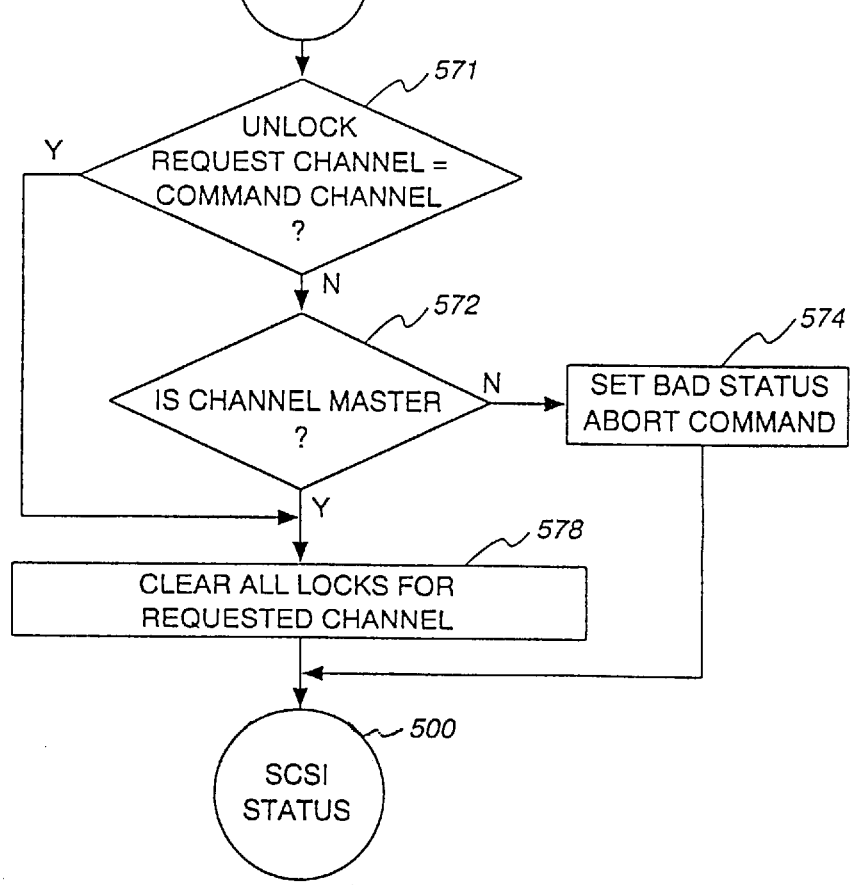
FIG. 49 is a flowchart for the UNLOCK CHANNEL command in accordance with the present invention.

The flowchart for the UNLOCK CHANNEL command is illustrated in FIG. 49. Initially, upon receipt of the command, the system checks in step 571 whether the channel originating the command owns the locks. If so, the locks are cleared in step 578 and a SCSI status flag is set in step 580. If not, the system checks in step 572 whether the channel issuing the command is the channel master. If not, the command is aborted a BAD STATUS/CHECK CONDITION is returned in step 574. If the channel issuing the command is the channel master, the CHANNEL field of the command is checked and the locks specified by the CHANNEL field are cleared in step 578. Subsequently, a SCSI status flag is set in step 580 since no data is transferred by the command.

PLOCKS CHANNEL COMMAND

The PLOCKS CHANNEL command is used to get the locked data for the space 154 allocated within the memory map 140 for pads. This command is similar to the LOCKS CHANNEL command but is used only to obtain locked data for the pad space 154. The command enables the locked data for all channels or a specified channel to be obtained.

The format for the PLOCKS CHANNEL command is illustrated in FIG. 21. The command includes an op code GB_PLCK 07, and a 5 byte field. Byte 1 is used as a CHANNEL field and includes a mode bit M and three channel bits C. The mode bit, when set, specifies the locked data within the pad space 154 for all channels connected to the system 100. When the mode set is cleared, only the locked data for the pad space for the channel specified by the three channel bits will be obtained. The command also includes 3 bytes used as an ALLOCATION LENGTH field. This ALLOCATION LENGTH field specifies the amount of locked data being requested in bytes. Byte 2 of the allocation length field is designated as the most significant byte, while byte 4 is designated as the least significant byte. Similar to the locks channel command, the locked data for the pad space 154 is returned in a format as illustrated in FIG. 18.

Figure 50:
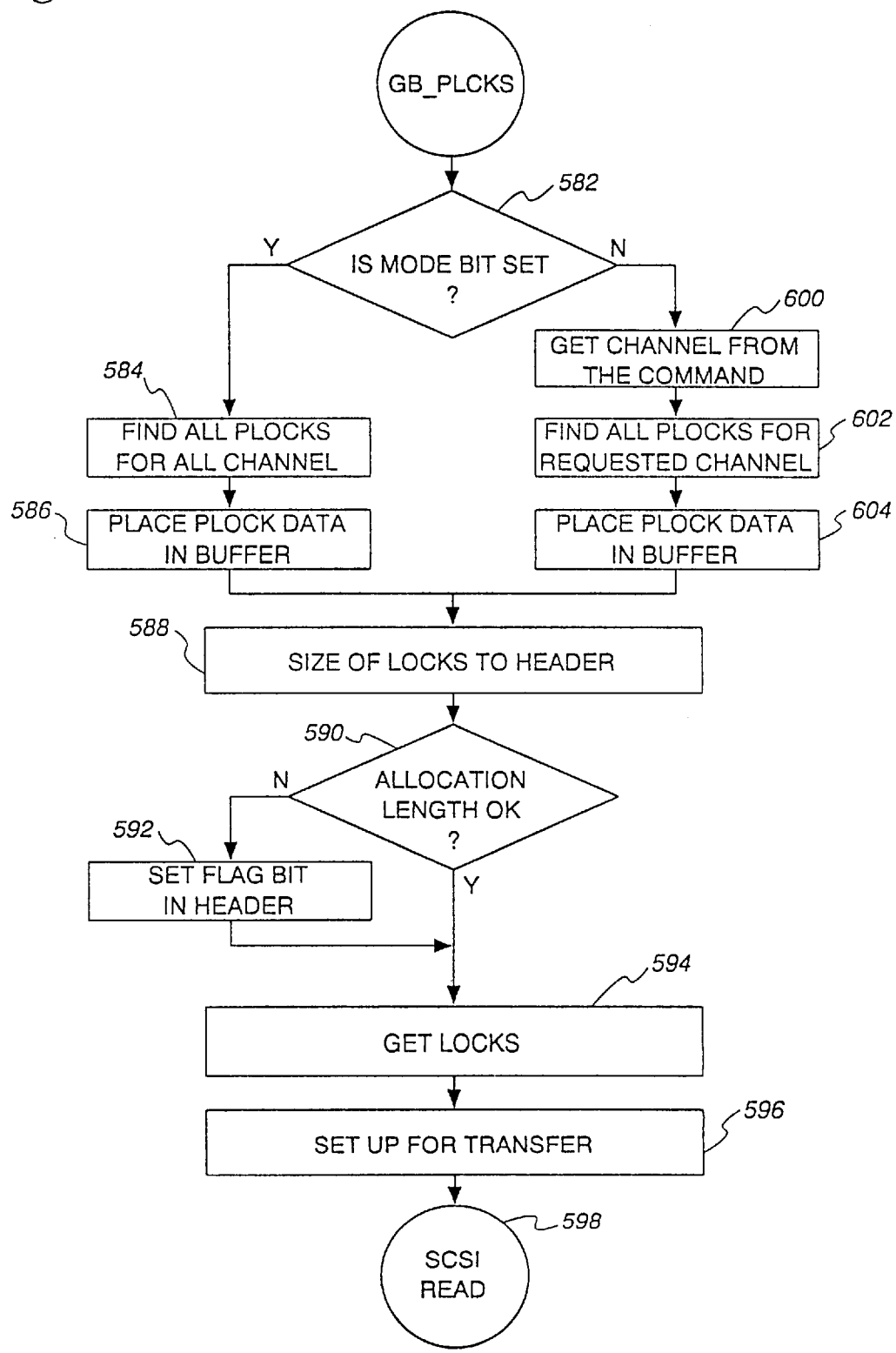
FIG. 50 is a flowchart for the PLOCKS CHANNEL command in accordance with the present invention.

The flowchart for the PLOCKS CHANNEL command is illustrated in FIG. 50. Upon receipt of the command, the system determines in step 582 whether the mode bit is set. If the mode bit is set, the system finds all the locks in the pad space 154 for all channels connected to the system in step 584. After the locks for all of the channels in the pad space 154 are determined, the locked data is placed in a buffer in step 586. After the locked data for the pad space 154 is placed in a buffer, the size of the locked data is packed into the header of the return data illustrated in FIG. 18 in step 588. After the size of the locked data is packed into the header of the return data, the system examines the ALLOCATION LENGTH field of the command to determine if the amount of data stored in the buffer exceeds the amount of data requested in step 590. If the amount of data stored in the buffer exceeds the amount specified in the amount of data requested, as specified in the command, a flag bit is set in the header of the return data in step 592. After the flag bit is set in the header of the return data illustrated in FIG. 33, the locks are transferred by way of the return data in steps 594 and 596, and a SCSI status flag is set in step 598. If the amount of data requested, as specified by the ALLOCATION LENGTH field in the command, is the same or less than the amount of data in the buffer, the flag bit is not set and the data is packed into the return data and transferred back to the originator of the command in steps 594, 596 and 598.

If the mode bit is not set, the channel number from the CHANNEL field in the command is ascertained in step 600. Once the channel number is ascertained, the system finds all of the locks within the pad space 154 for the channel specified by the channel bits in step 602. After the locks are found for the channel specified by the command for the pad space 154, they are placed in a buffer in step 604. Once the locks for the pad space 154 are placed in the buffer, the size of the data in the buffer is ascertained in step 588. The system then checks, in step 590, whether the amount of data stored in the buffer exceeds the amount of data requested by the command in the ALLOCATION LENGTH field. If the amount of data stored in the buffer exceeds the amount of data specified by the ALLOCATION LENGTH field of the command, the flag bit is set in the header of the return data in step 592. After the flag bit is set, the return data, as illustrated in FIG. 18, is transferred back to the channel that originated the command in steps 594, 596 and 598. If the amount of data specified in the ALLOCATION LENGTH field of the command is sufficient to accommodate the amount of data in the buffer, the return data is transferred to the originator of the PLOCKS CHANNEL command in steps 594, 596 and 598 without setting the flag bit in the header of the return data.

DUMP AUDITS COMMAND

The DUMP AUDITS command is used to retrieve a specified portion of the audit data in space 146 designated for audits in the memory map 140. In addition, as mentioned above, since the audit space 146 is configured as a FIFO buffer, the bottom of the buffer is cleared by the amount of the dump. This command is available to all channels connected to the system.

The format of the DUMP AUDITS command is illustrated in FIG. 22. The command consists of an op code GB_DADIT 08, followed by a 5 byte field which includes a 3 byte LONG WORDS field. The LONG WORDS field specifies the amount of the audit data within the audit space 146 that is being requested by the channel originating the command. The balance of the field is ignored by the system.

Figure 51:
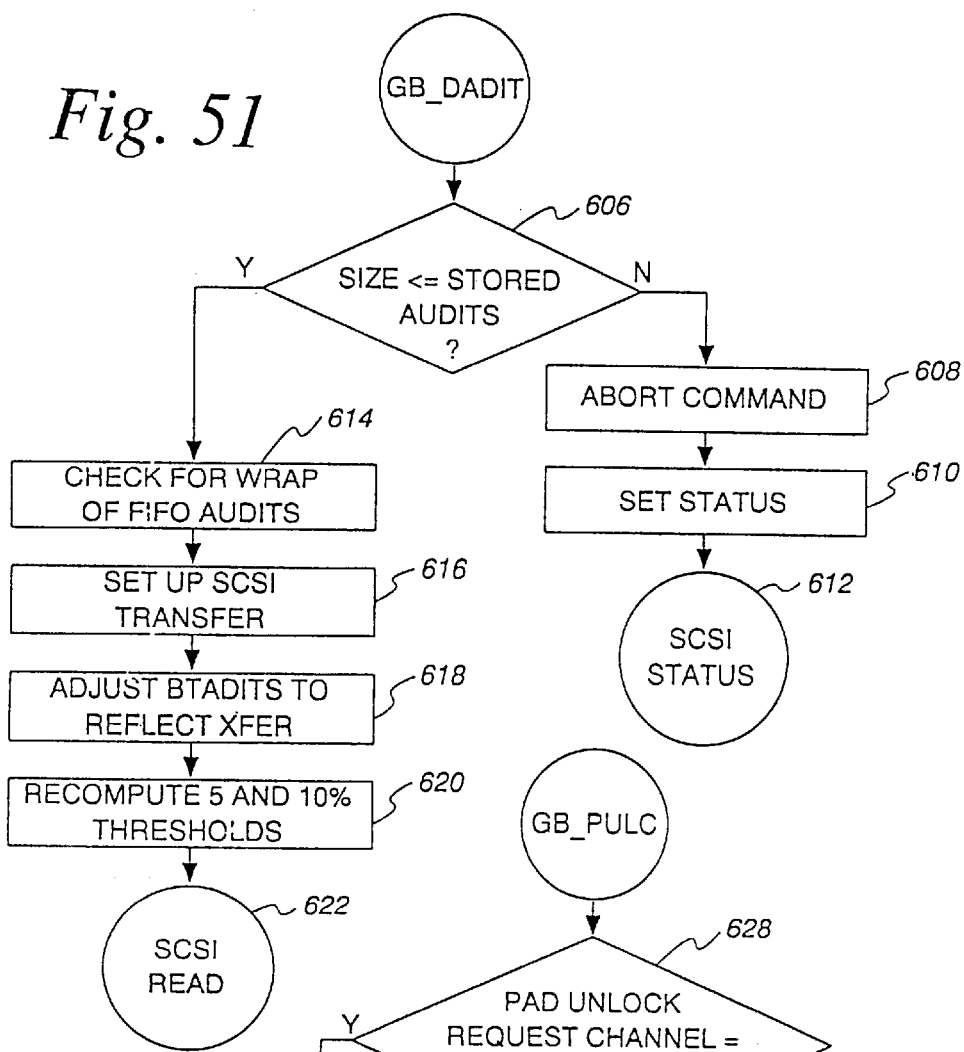
FIG. 51 is a flowchart for the DUMP AUDITS command in accordance with the present invention.

The flowchart for the DUMP AUDITS command is illustrated in FIG. 51. Upon receipt of the command, the amount of audit data specified by the LONG WORDS field within the command is compared with the total amount of data stored in the audit space 146 in step 606. If the command specifies more data than stored in the audit space 146, the command is aborted in step 608 and STATUS flags are set in steps 610 and 612. If the amount of audit data specified in the LONG WORDS field of the command is less than the amount of audit data stored in the audit space 146, the system checks for wrapping of the FIFO audits in step 614. Subsequently, in step 616, the system is set up to transfer the audit data in step 616 over the SCSI bus 106. After the system is set up for a SCSI transfer, the system adjusts the bottom of the audits pointer in step 618 to reflect the audits data being transferred to the channel originating the command. After the bottom of audits pointer is computed, the system next computes the 5% and 10% for threshold available space left in the audit space 146 in step 620. Subsequently, the audit data is transferred over the SCSI bus 106 in step 622.

PAD UNLOCKS CHANNEL COMMAND

The PAD UNLOCKS CHANNEL command is used to unlock the locks in the pad space 142 that match the channel bits set in the command. This command enables the channel master to unlock the pad locks for any of the channels connected to the system. This command also enables each channel to unlock the locks it owns in the pad space 142.

The format for the PAD UNLOCKS CHANNEL command is illustrated in FIG. 23. The command consists of an op code GB_PULC 09, followed by a 5 byte field. The first byte is used as a CHANNEL field. The least significant 3 bits of the first byte of the field are used to specify the channel for which the pad locks are to be unlocked. These 3 bits enable up to 8 channels to be specified. The remaining bits of byte 1, as well as the remaining bytes, are ignored.

Figure 52:
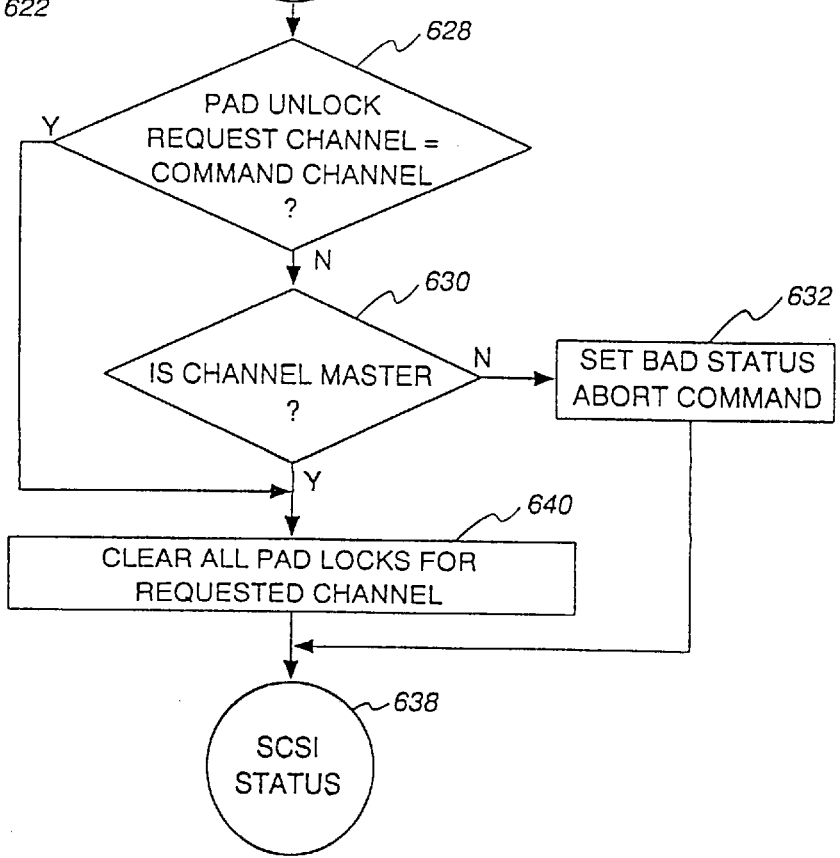
FIG. 52 is a flowchart for the PAD UNLOCK CHANNEL command in accordance with the present invention.

The flowchart for the PAD UNLOCKS CHANNEL command is illustrated in FIG. 52. Initially, upon receipt of the command, the system determines in step 628 if the channel originating the command owns the locks. If so, the system proceeds to step 640 and clears its locks in the pad space 142 after which a SCSI status flag is set in step 638. If not, the system checks in step 630 if the channel issuing the command is the channel master. If the channel originating the command is not the channel master, the command is aborted in step 632 and a BAD STATUS/CHECK CONDITION is returned. If the channel originating the command is the channel master, the system proceeds to step 634 and checks the channels as specified by the CHANNEL field of the command and clears the pad locks for the specified channel in step 640. Subsequently, a SCSI status flag is set in step 638.

DEVICE DRIVER

Figure 53:
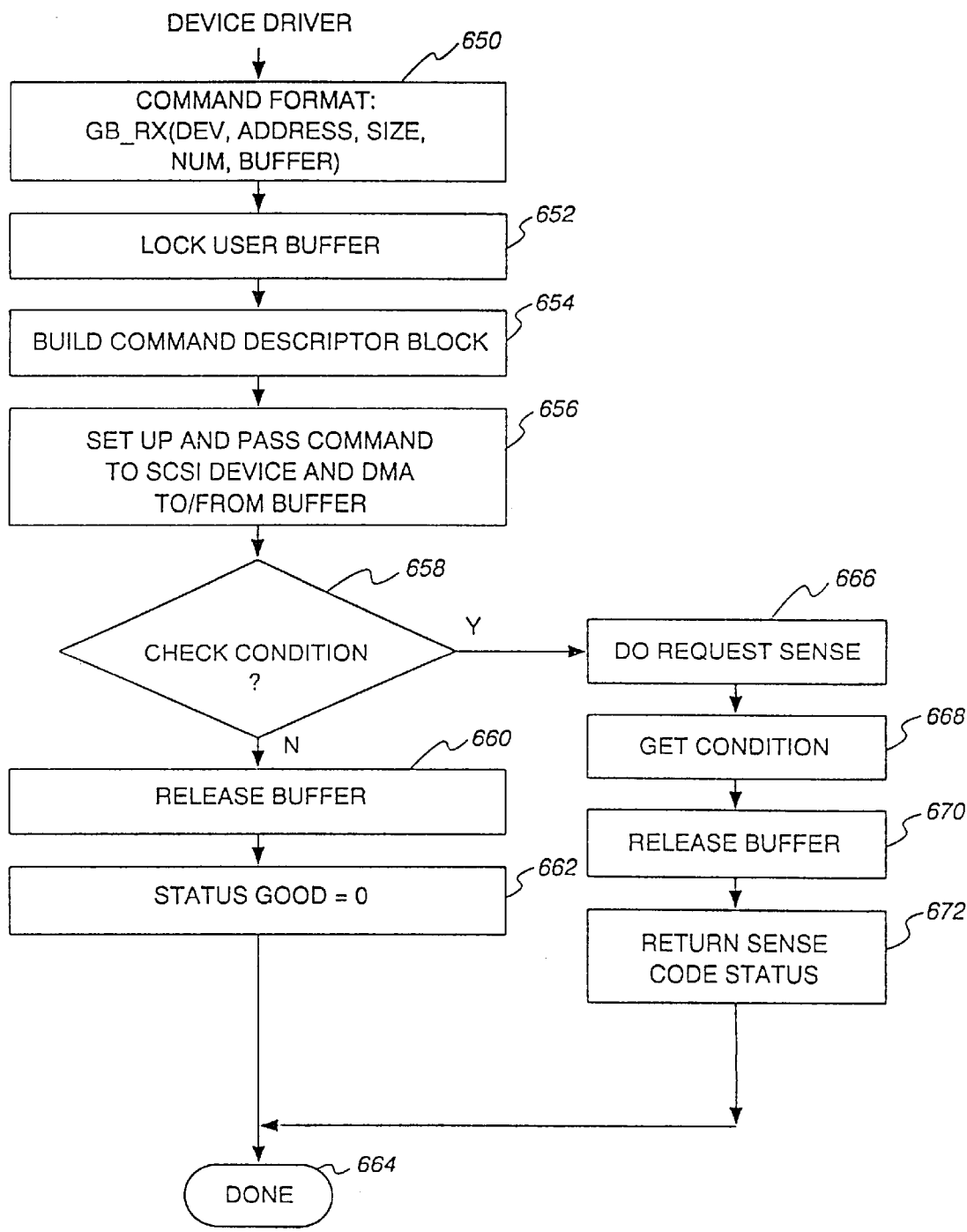
FIG. 53 is a simplified block diagram of the device driver which forms a part of the information storage system in accordance with the present invention.
Figure 54A:
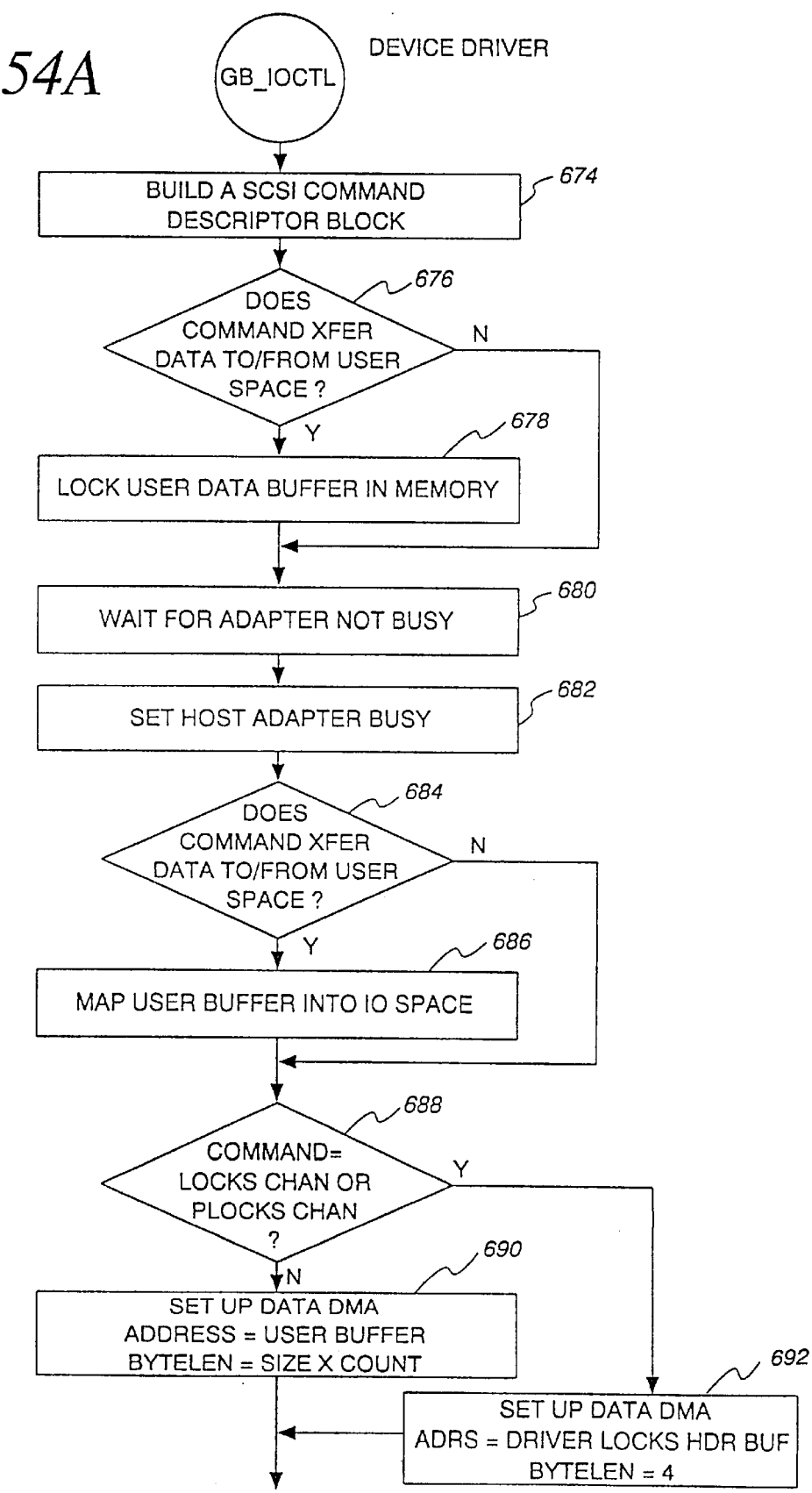
FIGS. 54A–54C represent flowcharts for the device driver in accordance with the present invention.
Figure 54B:
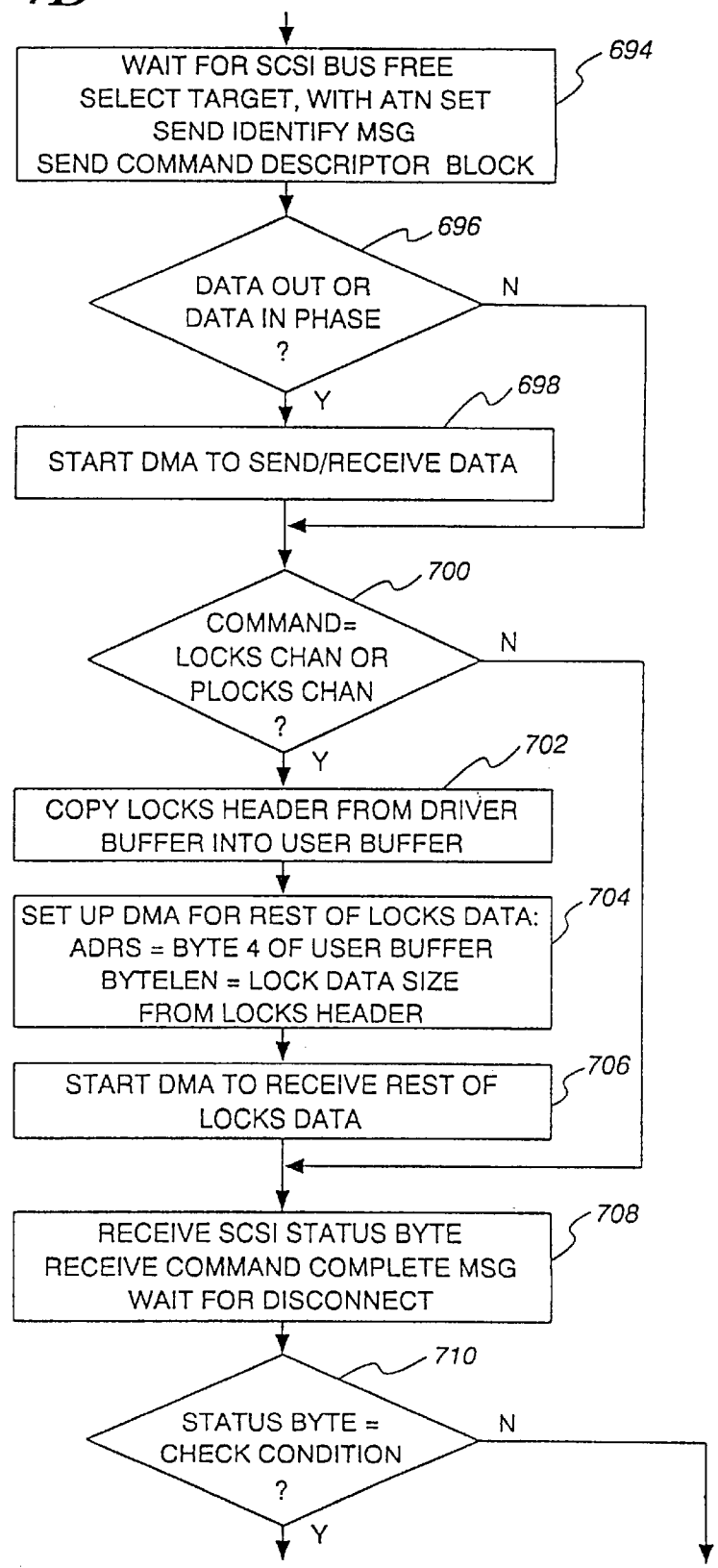
Figure 54C:
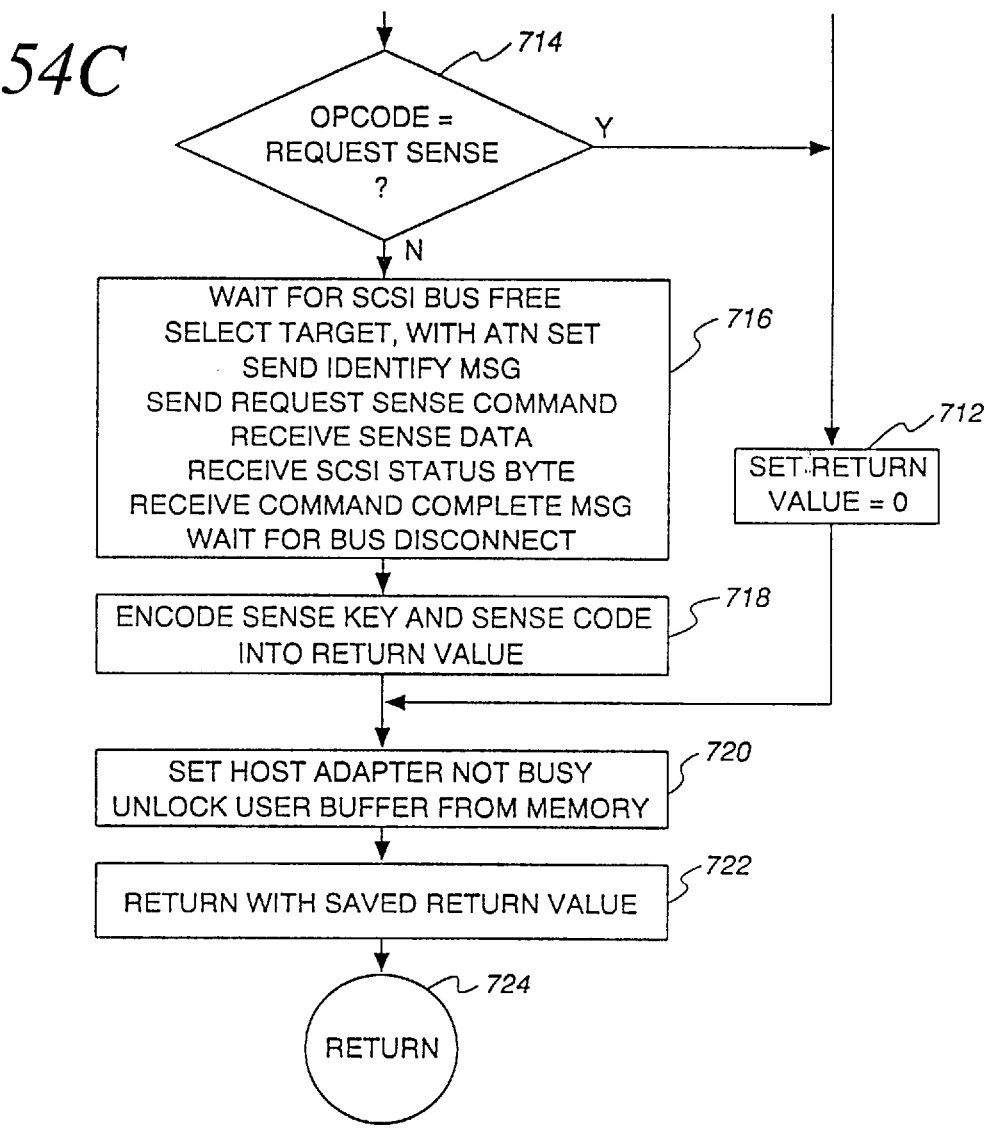

FIG. 53 represents a simplified flowchart for the device driver. The device driver 162 resides in each of the hosts 104 and is used to translate the unique set of commands discussed above into a format that can be transferred over the SCSI bus 106. As described herein, the operating system 160 associated with each of the hosts is assumed to be UNIX. However, it is well within the ordinary skill in the art to convert the device driver 162 into a device driver that would be compatible with other operating systems, such as MS-DOS. FIGS. 54A–54C represent a more detailed flow chart of the device driver 162 illustrated in FIG. 53.

Initially, the commands, which form a part of an application program 164, are compiled by the library file LIBGB.C, included as Appendix A, to enable the application program 164 to interface with the SCSI bus 106. When an application program 164 sitting on a UNIX operating system needs to send a command to the controller 103, a function call with a file descriptor which points to the controller 103 is made. Step 650 shows an example of such a call to one of the library functions (GB_RX), along with the arguments to that function. Other library functions may have different arguments. The DEV argument is the UNIX file descriptor which points to the controller 103. The ADDRESS argument refers to the 40 bit starting address specified by the command. The SIZE argument refers to the size, in words, of the record specified by the command. The NUM argument refers to the number of sequential records of the size specified by the SIZE argument to be accessed with the command. The BUFFER argument is a pointer to the user's data buffer.

The library function formats these arguments into a data structure which is common for all library functions. That structure includes fields for the ADDRESS, SIZE, NUM and BUFFER arguments described above. The structure also includes the following fields for arguments from other library functions, such as CHANNEL, which holds a SCSI ID associated with lock-related commands such as the UNLOCK CHANNEL command. This field is also used to hold the bit for the SET MASTER command which distinguishes between setting or clearing master mode. An ALLOC_LEN field may be used to specify the size (in bytes) of the user buffer for commands which input an unknown number of data bytes, such as the LOCKS CHANNEL command. The final field in the arguments structure is OPCODE, which contains the SCSI opcode corresponding to the SCSI command implemented by the library function.

After building the arguments structure, each library function passes a pointer to that structure to the operating system's IOCTL system call. The file descriptor DEV is also passed to the IOCTL system call. The operating system examines the DEV argument to determine which device driver needs to be called and then calls the IOCTL entry point of the device driver.

The structure mentioned above completely describes the command to be executed and is passed on to the driver 162 upon entry. The driver uses the argument to build a SCSI COMMAND DESCRIPTOR BLOCK for transfer over the SCSI bus in step 654. As the SCSI COMMAND DESCRIPTOR BLOCK is being set up, the host operating system 160 locks the user buffer to enable data transfer over the SCSI bus 106 in the event that the command requires data transfer. In step 656, the system is set up to pass the command to the controller 103 and enable a direct memory access (DMA) device to control data transfer across the SCSI bus 106 in step 656. The DMA resides within the host 104 and is under the control of the device driver 162. After the command and data is passed over the SCSI bus 106, the system checks in step 658 whether the transfer was successful. In particular, the device driver 162 determines whether there was a CHECK CONDITION. If no CHECK CONDITION is sensed, the user buffer is released in step 660 and a status flag is set in step 662 indicating that the command was properly executed. Subsequently, control is returned to the application program 164 in step 664.

If a CHECK CONDITION is set indicating that the transfer was unsuccessful, the device driver 162 issues a REQUEST SENSE command in step 666 to determine the reason for the failure of the execution of the command. In response to the REQUEST SENSE command, SENSE DATA, as described below, is returned to the device driver in step 668 which, after the user buffer is released in step 670, is returned to the application program 164 in step 672.

The format for the SENSE DATA returned in response to a REQUEST SENSE SCSI command is illustrated in FIGS. 72A and 72B. The SENSE DATA can include between 0 and 68 ($44) bytes. The first twenty-three (23) bytes relate to the SENSE BLOCK, while bytes 23 through 67 relate to the memory map 140. The amount of SENSE DATA returned depends on the amount of data requested by way of the REQUEST SENSE command.

Byte zero (0) of the SENSE DATA returned is normally $F0 as indicated in SCSI specification, mentioned above. Byte one (1) is normally zero. Byte 2 is used for the SENSE KEY values as indicated in Table 1. Byte 7 represents the number of additional bytes for the purpose of returning a portion or the entire memory map 140 (e.g., bytes $17–$43).

Bytes $03–$06, $08, $0A, $0B and $0E–$16 are reserved. Byte $09 is used for the status byte whose bits are identified in Table 2 below. Byte $0C represents additional sense code, as identified in Table 3. Byte $0D may be used for qualifying the additional sense code.

TABLE 1

REQUEST SENSE SENSEKEY VALUES

| | |
|---|---|
| NO_SENSE | 0X0 |
| REC_ERR | 0X1 |
| NOT_RDY | 0X2 |
| MED_ERR | OX3 |
| HW_ERR | 0X4 |
| ILL_REQ | 0X5 |
| UNIT_ATN | 0X6 |
| DATA_PROT | 0X7 |
| VEND_SPEC | 0X8 |
| ABORTED | 0XB |

TABLE 2

STATUS BYTE DEFINITION

| | | |
|---|---|---|
| V | = | Database Valid Flag |
| K | = | Keys Written Flag |
| P | = | Pointers Moved Flag |
| M | = | Master Exist |
| MID | = | SCSI ID of Master |

TABLE 3

ADDITIONAL SENSE CODE VALUES

| | |
|---|---|
| 710_RESET | 0X80 |
| LOCK_LIMIT | 0X81 |
| LOCK_CONFLICT | 0X82 |
| MISSING_LOCK | OX83 |
| BAD_NEW_DATA | 0X84 |
| NO_DB | 0X85 |
| SEC_VIOL | 0X86 |
| ADRS_VIOL | 0X87 |
| DB_CHANGE | 0X88 |
| MEMORY_LOCKED | 0X89 |
| BAD_LOCK_START | 0X8A |
| BAD_LOCK_END | 0X8B |
| BAD_LOCK_CHAN | 0X8C |
| KEYS_TH5 | 0XA0 |
| DATA-TH5 | 0XA1 |
| AUDIT_TH5 | 0XA2 |
| KEYS_TH10 | 0XA3 |
| DATA_TH10 | OXA4 |
| AUDIT_TH10 | 0XA5 |
| KEYS_FULL | OXA6 |
| DATA_FULL | OXA7 |
| AUDIT_FULL | OXA8 |
| AUDIT_SIZE | OXAA |

A more detailed version of the device driver 162 is illustrated in FIGS. 69A–69C. In particular, whenever the application program 164 residing in the host 104 with a UNIX operating system 160 sends a SCSI command to the controller 103, the device driver 162 starts building the argument into a SCSI COMMAND DESCRIPTOR BLOCK in step 674. In step 676, the system determines whether the command involves data transfer to or from a user buffer. If the command involves a data transfer to or from the buffer space, the user's buffer is locked into physical memory to enable the DMA to transfer the data under the control of the device driver 162 in step 678. If the command does not require data transfer to or from the user buffer, the system proceeds directly to step 680.

The driver 162 then waits for the host interface 114, which enables the host 104 to access the SCSI bus 106, to be not busy in step 680 since multiple processes may be attempting to gain access to the SCSI bus 106. Once the SCSI interface 114 is not busy, a BUSY flag is set in step 682 to insure that each I/O request gets exclusive use of the SCSI interface 114 and the SCSI bus 106 until the request is complete, at which time the busy flag is cleared, as will be discussed below.

If the command to be executed involves a transfer to or from the user buffer, the user buffer is mapped into I/O space so that the SCSI interface 114 can access the user buffer in steps 684 and 686. If the command does not involve a transfer of data to or from the user buffer, the system proceeds directly to step 688. In step 688, the driver 162 determines whether the command is a LOCKS CHANNEL or a PLOCKS CHANNEL command since those commands require return data as illustrated in FIG. 33. If the commands are not a LOCKS CHANNEL or PLOCKS CHANNEL command, the system is set up for a DMA data transfer by determining the starting address and byte length of the transfer in step 690. If the command to be executed is either the LOCKS CHANNEL command or the PLOCKS CHANNEL command, the DMA is instead set to read the 4 byte locks data header which indicates the amount of locks data to be transferred into a special buffer in the kernel space in step 692.

The driver 162 next waits to gain control of the SCSI bus 106 in step 694. When control of the SCSI bus 106 is obtained, the driver 106 selects the controller 103 with ATN set in step 694. After the proper controller 103 is selected, the driver 162 waits for the SCSI bus 106 to go into a message out MSG_OUT phase. Once the SCSI bus 106 enters the MSG_OUT phase, the driver 162 sends an IDENTIFY message and waits for the SCSI bus to go into command phase. Once the SCSI bus 106 enters the command phase, the driver 162 sends the COMMAND DESCRIPTOR BLOCK in step 694.

If the command involves a data transfer over the SCSI bus 106, as determined in step 696, the SCSI bus 106 will enter into a DATA_IN or a DATA_OUT phase. If the next phase is a DATA_IN phase, the device driver will receive data from the SCSI bus 106 in step 698. If the next phase is a DATA_OUT phase, data will be sent to the SCSI bus 106 in step 698. In both cases, the byte count and buffer address, established in step 690, is used to set up the DMA in step 698.

The system next checks in step 700 whether the command was either a LOCKS CHANNEL or a PLOCKS CHANNEL command. If the command was either the LOCKS CHANNEL or PLOCKS CHANNEL command, the locks data header from the driver's buffer is copied into the beginning of the user's buffer in step 702. In addition, the number of bytes of locks data remaining to be sent by the controller 103 is found within the locks data header received. Subsequently, in step 704, the DMA is set up into byte 4 of the user data buffer skipping the locks data header with a byte count, as determined from the contents of the return locks data header. Subsequently, in step 706, the DMA is then started to receive the balance of the locks data from the data buffer. If the command that was executed is not the LOCKS CHANNEL or PLOCKS CHANNEL command, the system proceeds directly to step 708. In step 708, the driver awaits a STATUS phase of the SCSI bus 106. Once the SCSI bus 106 enters the STATUS phase, the driver 162 receives a status byte and then awaits the SCSI bus to enter a MESSAGE_IN, in order to receive a COMMAND COMPLETE message, after which the controller 103 disconnects from the SCSI bus 106 in step 708.

If the status byte received by the driver 162 contained a GOOD STATUS (not a CHECK CONDITION) as determined in step 710, a return value of 0 is set in step 712 indicating that the command was successfully executed. If the status byte received from the controller 103 indicated a CHECK CONDITION, the driver 162 issues a REQUEST SENSE command in step 714, using the same protocol as for the user command. As illustrated in step 716, the REQUEST SENSE command is transferred from the driver 162 to the controller 106 in step 716 in a similar manner as the user command discussed above. In particular, after the driver 162 issues a REQUEST SENSE command, the driver 162 must wait for the SCSI bus 106 to be free since the driver was previously disconnected from the SCSI bus 106 in step 708. Once the SCSI bus 106 is free, the driver 162 selects the controller with ATN set, sends an IDENTIFY message, and waits for the SCSI bus 106 to enter the command phase. Subsequently, the REQUEST SENSE command is formed into a COMMAND DESCRIPTOR BLOCK and sent over the SCSI bus 106. The driver then awaits the SCSI bus 106 to enter a STATUS phase in order to receive the SCSI status byte. Once the SCSI status byte is received, the driver 162 awaits the SCSI bus 106 to enter the MESSAGE IN phase and waits for the COMMAND COMPLETE message and subsequently awaits to be disconnected from the SCSI bus 106 in step 716. The sense data is then encoded into a non-zero return value for return to the post application program 160 in step 718.

In step 720, once the commands have been executed, the driver 162 clears the host interface 114 busy flag. Additionally, since the command is complete, the user buffer is also unlocked, if applicable. After the host interface busy flag 114 is cleared and the user buffer is unlocked, a return value from the status byte is returned in step 722. If the return value is 0, as indicated above, this indicates that the command transfer was successful. If the return value is other than 0, this indicates a problem with the execution of the command, such as a parity error, which is encoded and returned to the host 104 in steps 722 and 724.

SCSI ADAPTOR 116 SOFTWARE

The controller 103 acts as a SCSI target device and executes the SCSI commands received from the SCSI adaptor 116. The TARGET MAIN LOOP routine executes in the controller's embedded CPU while the TARGET SCRIPT routine executes in the controller's intelligent SCSI controller chip within the SCSI adaptor 116. During execution, control is passed between the two programs such that only one is executing at a time. Typically, the CPU will start the script execution at a specified program address known as a SCRIPT ENTRY POINT and wait for the script to interrupt. All script execution sequences end with an interrupt. This script interrupt causes the CPU to restart execution of the TARGET MAIN LOOP program.

The software for the SCSI adaptor 106, identified as the TARGET SCRIPT, is illustrated in FIGS. 55A–55K. The TARGET SCRIPT software actually consists of a plurality of utility programs as discussed below. The TARGET MAIN LOOP is illustrated in FIGS. 56A and 56B.

Figure 55A:
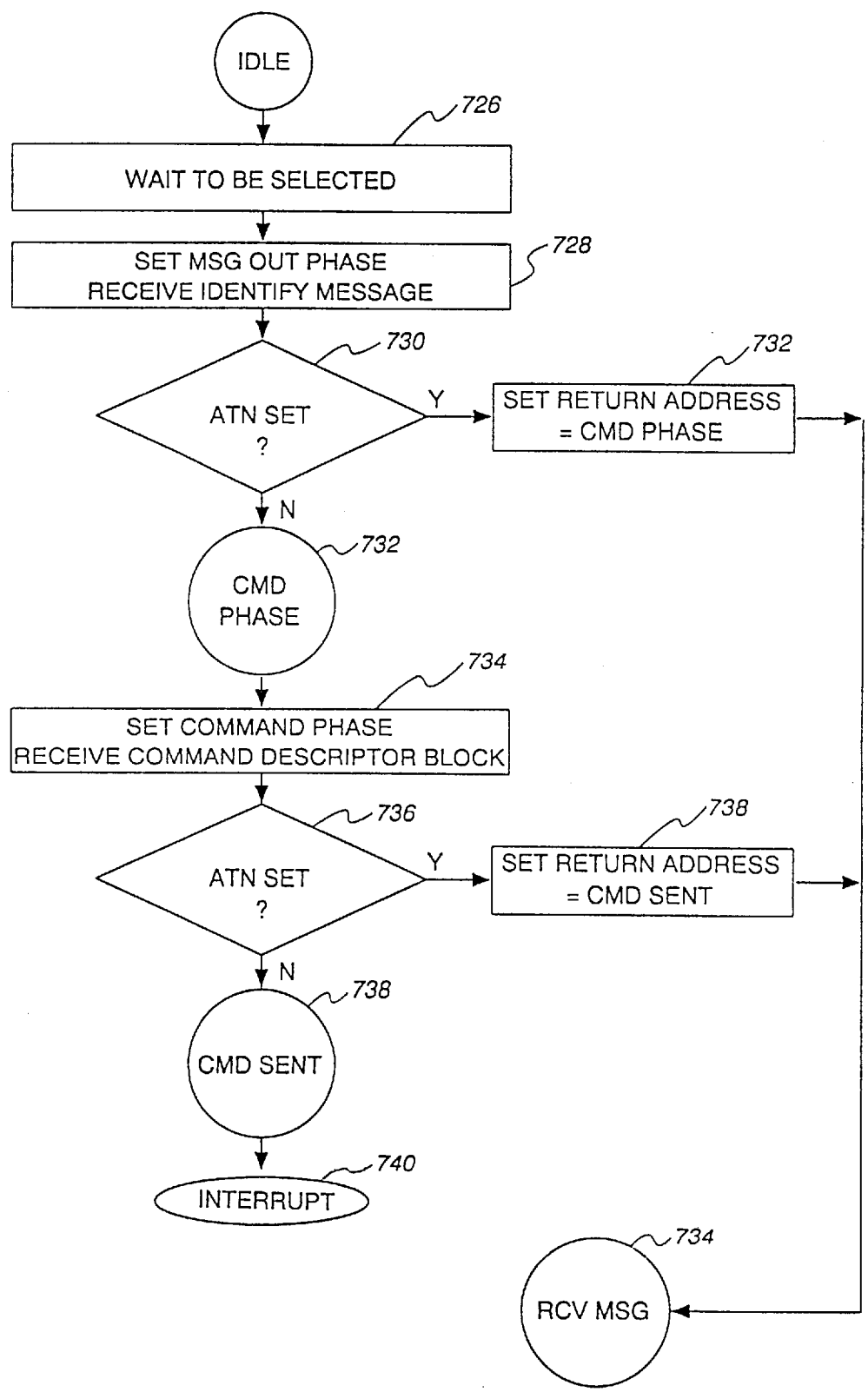
Figure 56A:
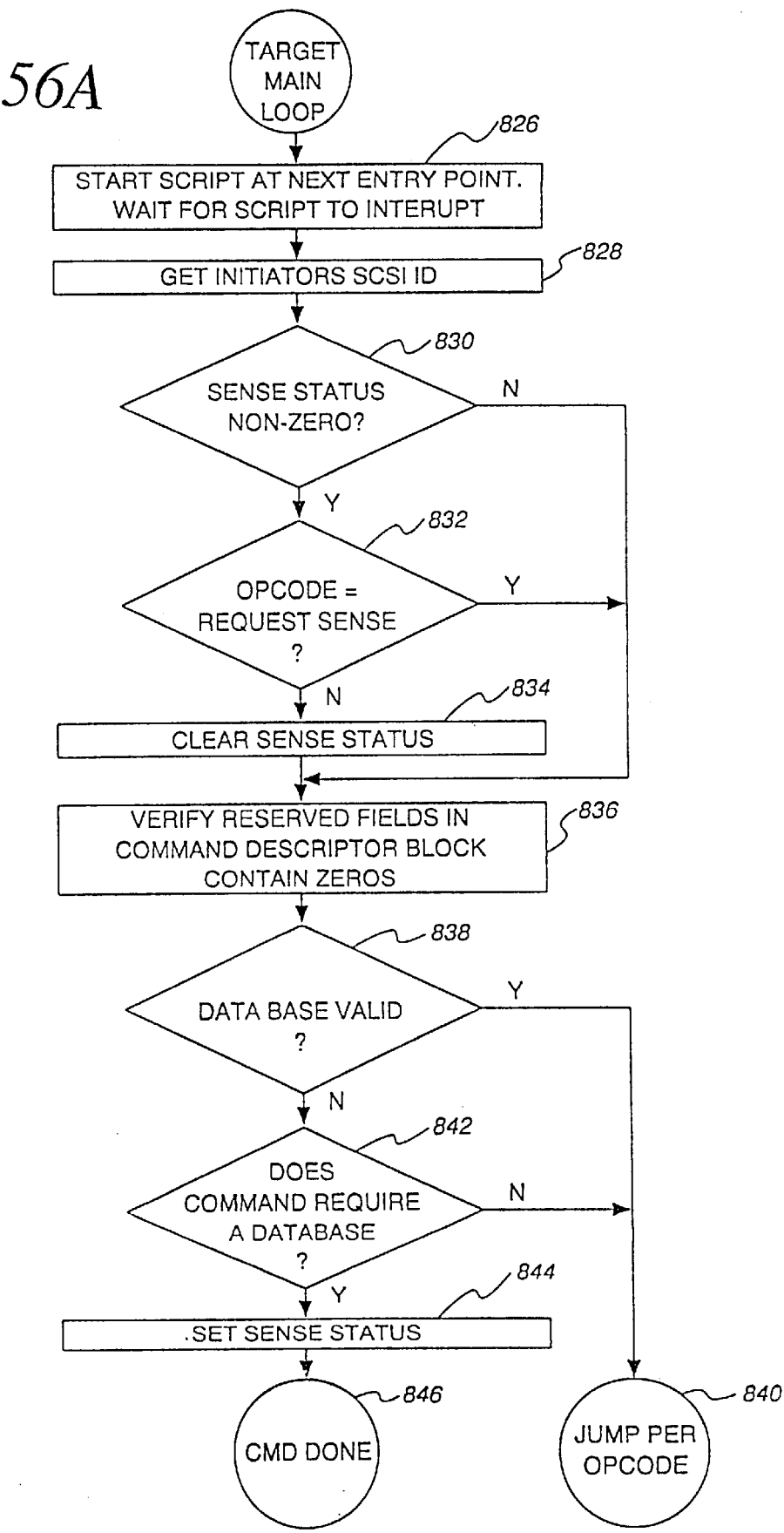
FIGS. 56A and 56B represent flowcharts for a target main loop which forms a part of the information storage system in accordance with the present invention.
Figure 56B:
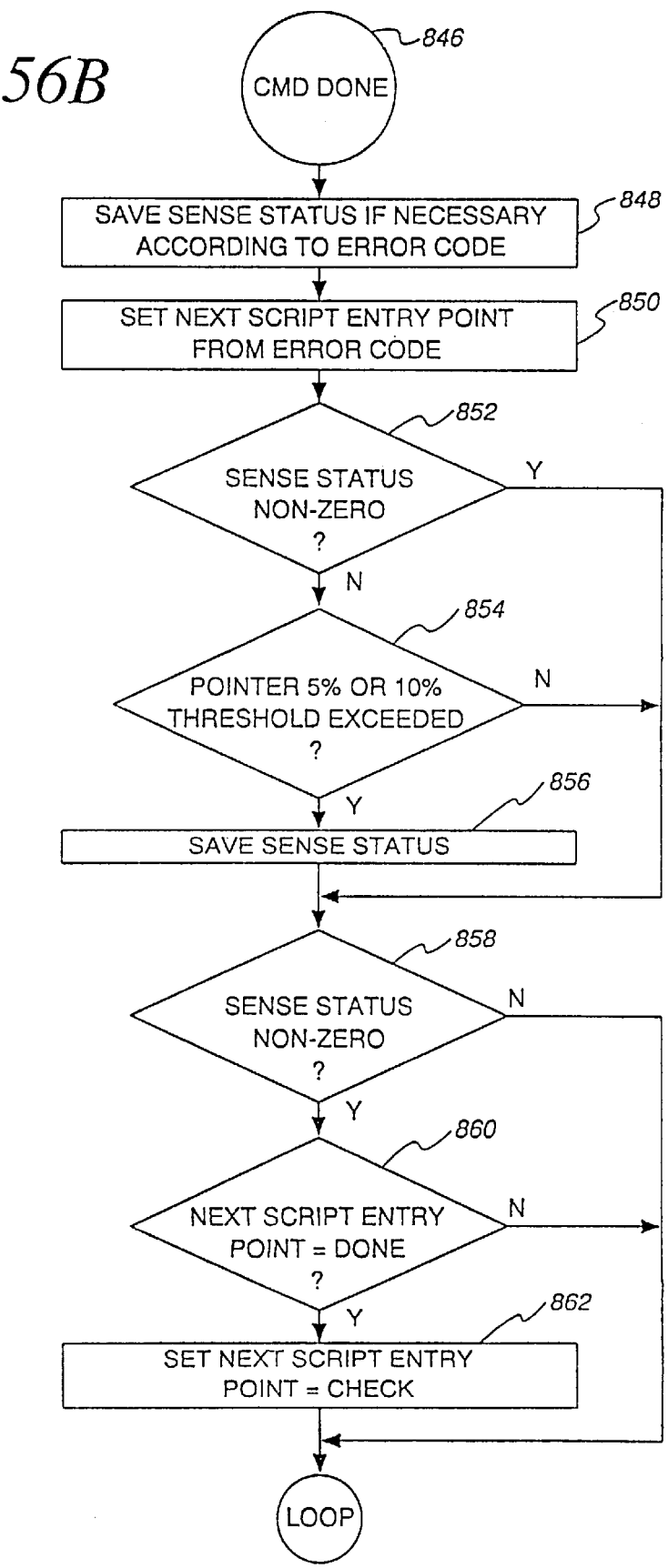

The flowchart for the IDLE utility is illustrated in FIG. 55A. The IDLE utility forms an entry point which assumes that the SCSI adaptor 116 is not currently connected to the SCSI bus 106. Initially, in step 726, the script or SCSI adaptor 116 waits to be selected. Program execution stops at this point until some initiator device selects the controller 103. Once the controller 103 is selected, the SCRIPT goes into a message out MSG_OUT phase and receives the IDENTIFY message byte indicating to the SCSI adaptor 116 that it has been selected in step 728. The program next checks in step 730 whether the ATN bit has been set on the SCSI bus 106 by the initiator indicating to the target that the initiator has another message to send. In that case, the program jumps to the receive message RCV_MSG utility, illustrated in FIG. 70B in step 735 after saving the next address which corresponds to a command phase in step 733. If the ATN bit is not set indicating to the SCSI controller chip that the initiator does not have another message, the script 116 goes into a command phase in step 732 and receives the command descriptor block from the device driver 162 in step 734.

The system next again checks at that time whether the ATN bit is set indicating that the initiator has another message to send to the target. If the ATN bit is set, the program jumps to the receive message RCV MSG utility in step 734 after saving the return address of the next step of the TARGET SCRIPT in step 739. If the ATN bit is not set, the script interrupts the main loop and indicates that the command was received without error in steps 738 and 740.

Figure 55B:
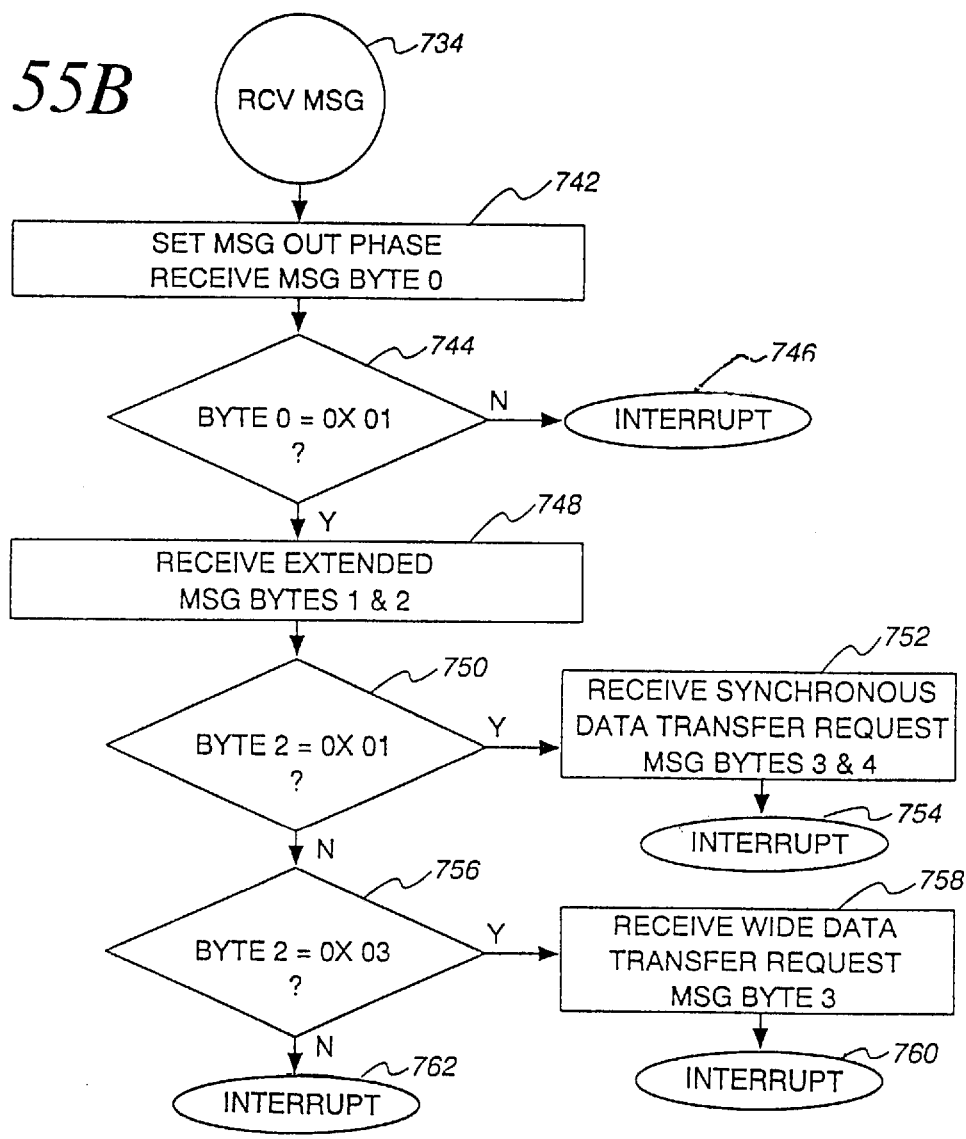

The receive message RCV MSG utility is illustrated in FIG. 55B. This utility is not an entry point for the TARGET SCRIPT, but merely a routine that the TARGET SCRIPT jumps to when the ATN bit is set, which indicates that the initiator has a message to send over the SCSI bus 106. This utility starts in step 742 in a message out MSG_OUT phase by receiving byte 0 of the message. Since the only messages expected to be received (e.g., SYNCHRONOUS DATA TRANSFER REQUEST and WIDE DATA TRANSFER REQUEST) are both extended messages, the system checks and verifies in step 744 whether the message byte 0 specifies an extended message. If not, the system interrupts in step 746. If byte 0 of the message specifies an extended message, bytes 1 and 2 are received in step 748. Byte 2 of the message is examined in step 750 to determine whether the message is a SYNCHRONOUS DATA TRANSFER REQUEST, A WIDE DATA TRANSFER REQUEST or some other request. If byte 2 specifies a SYNCHRONOUS DATA TRANSFER REQUEST, message bytes 3 and 4 are received in step 752 and the TARGET SCRIPT interrupts in step 754 with an interrupt code specifying a SYNCHRONOUS DATA TRANSFER REQUEST. If byte 2 does not specify the SYNCHRONOUS DATA TRANSFER REQUEST, the system next checks in step 756 to determine if a WIDE DATA TRANSFER REQUEST has been specified. If so, the script receives the WIDE DATA TRANSFER REQUEST message byte 3 in step 758 and interrupts in 760 with an interrupt code specifying a WIDE DATA TRANSFER REQUEST. If the message byte 2 does not specify either a SYNCHRONOUS DATA TRANSFER REQUEST or a WIDE DATA TRANSFER REQUEST, the TARGET SCRIPT interrupts with an interrupt code specifying an illegal message was received in step 762.

Figure 55C:
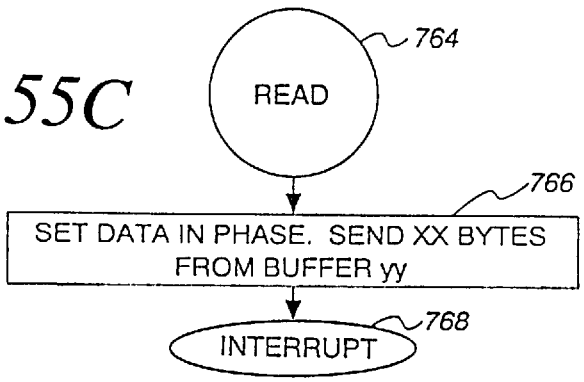

The READ utility is illustrated in FIG. 55C. The TARGET SCRIPT is started at this entry point when data needs to be sent from the target or controller 103 to the initiator. In this situation, the host CPU 104 will have previously set up the byte count and the address of the buffer to send the data in step 764. The script next goes into a DATA_IN phase and sends the data to the SCSI bus 106 in step 766. After the data is sent to the SCSI bus 106, the TARGET SCRIPT interrupts in step 768.

A WRITE utility is illustrated in FIG. 55D. The TARGET SCRIPT is started at this entry point when data needs to be sent from the host CPU 104 to the controller 103. In this situation, the SCSI controller will have previously set up the byte count and the address of the buffer containing the data to be received in step 770. Subsequently, in step 772, the script goes into a DATA_OUT phase and receives the data from the SCSI bus 106. After the data is received from the SCSI bus, the TARGET SCRIPT interrupts in step 774.

A DONE utility is illustrated in FIG. 55E. This utility is used after a command has been successfully executed including any data transfers. In particular, after a command has been successfully executed, the SCSI controller restarts the execution of the TARGET SCRIPT at this entry point as indicated in step 776. Subsequently, in step 778, the script 116 goes into a STATUS phase and sends out a GOOD STATUS. After the STATUS phase, the TARGET SCRIPT enters a message in MSG_IN phase and sends a COMMAND COMPLETE message in step 780 to indicate to the initiator of the command that the message has been completed. Subsequently, in step 782, the TARGET SCRIPT jumps to the disconnect utility illustrated in FIG. 55F.

The disconnect utility DISC is illustrated in FIG. 55F. This entry point 783 starts the TARGET SCRIPT executing a DISCONNECT command to deassert the BUSY flag for the SCSI bus 106 as indicated in step 784. After the BUSY flag is deasserted, the TARGET SCRIPT jumps to an idle state in step 786 and waits to be selected again.

A RETURN utility is illustrated in FIG. 55G. The RETURN utility is used as an entry point for the TARGET SCRIPT after the script controller has handled an incoming SYNCHRONOUS DATA TRANSFER REQUEST or a WIDE DATA TRANSFER REQUEST message in step 788. The TARGET SCRIPT simply executes a RETURN instruction and jumps to the saved return address in step 790 which causes the original sequence which it was executing before the message was received to be rejoined.

A REJECT utility is illustrated in FIG. 55H. This utility is used as a TARGET SCRIPT entry point if the initiator sent an unexpected message in step 792. In this condition, the script goes into a message in MSG_IN phase and sends a MESSAGE REJECT message in step 794 and subsequently jumps to the disconnect DISC utility in step 796.

Figure 55I:
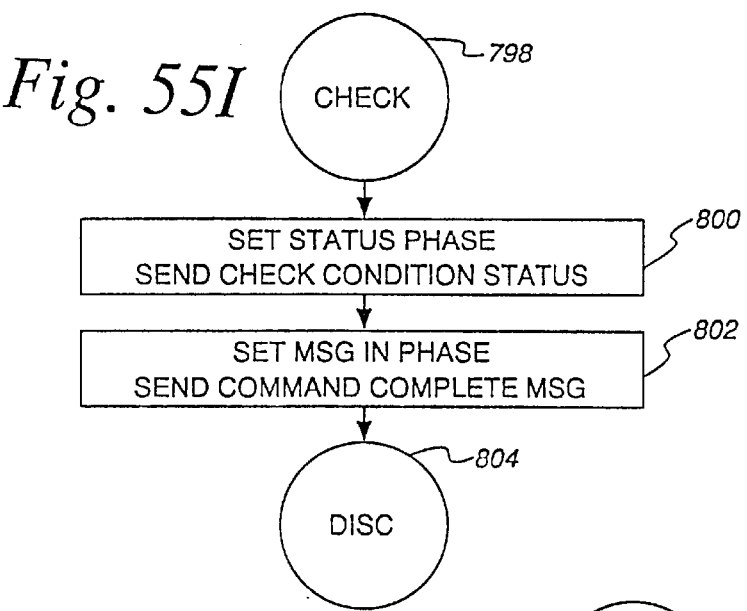

A CHECK utility is illustrated in FIG. 55I. This utility is utilized as a TARGET SCRIPT entry point to send a CHECK CONDITION status to the initiator when the script controller has a non-zero status to report, as illustrated in step 798. Initially, the script goes into a STATUS phase and sends a CHECK CONDITION status byte to the initiator in step 800. After the CHECK CONDITION status byte is sent to the initiator, the script goes into a message in MSG_IN phase and sends a COMMAND COMPLETE message in step 802. After the COMMAND COMPLETE message is sent back to the initiator, the TARGET SCRIPT jumps to the disconnect utility DISC in step 804 to disconnect the SCSI bus 106.

Figure 55J:
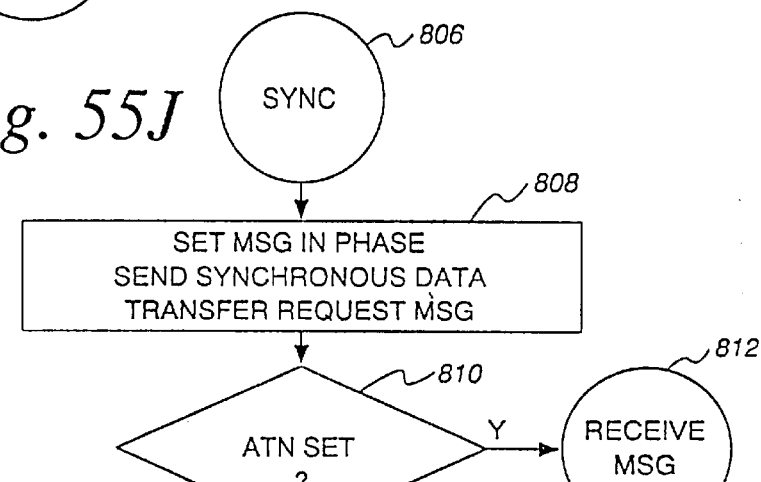

A SYNC utility is illustrated in FIG. 55J. This utility is used as a TARGET SCRIPT entry point when the script controller wants to send a SYNCHRONOUS DATA TRANSFER REQUEST message to the initiator in step 806. Initially, the script goes into a message in, MSG_IN, phase in step 808 and sends a SYNCHRONOUS DATA TRANSFER REQUEST message to the initiator. Next, in step 810, the script checks the ATN bit to determine if the initiator has any messages to be sent. If the ATN bit indicates that there are messages to be received by the script, the TARGET SCRIPT jumps to the RECEIVE MESSAGE utility in step 812 without disturbing the previously saved return address. Otherwise, the script interrupts in step 814.

Figure 55K:
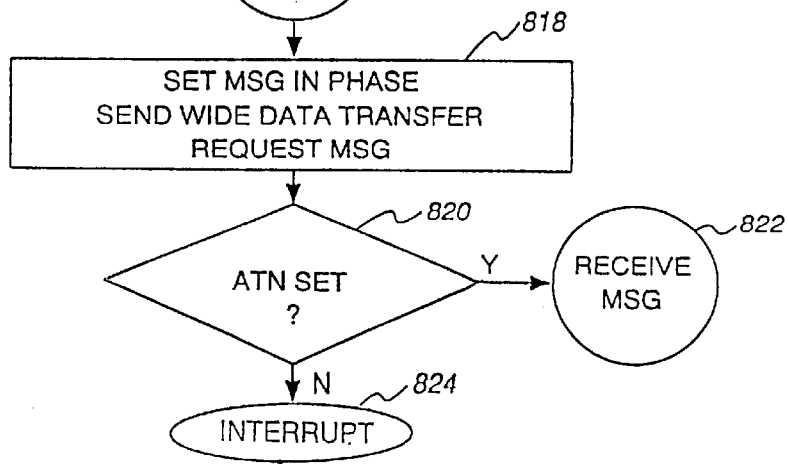

A WIDE utility is illustrated in FIG. 55K. This utility is used as a TARGET SCRIPT entry point when the script controller 116 wants to send a WIDE DATA TRANSFER REQUEST message to the initiator in step 816. The script goes into a message in MSG_IN phase in step 818 and sends a WIDE DATA TRANSFER message to the initiator in step 818. After the WIDE DATA TRANSFER REQUEST message is sent to the initiator, the script tests the state of the ATN bit to determine if the initiator has a message to send in step 820. If the ATN bit is sent, the TARGET SCRIPT jumps to the RECEIVE MESSAGE utility in step 822 without disturbing the previously saved return address. If the ATN bit is not set, the system interrupts in step 824.

INFORMATION OPERATING SYSTEM

The software for the information storage system includes the TARGET MAIN LOOP routine illustrated in FIGS. 56A–56B, the TARGET SCRIPT utilities illustrated in FIGS. 70A–70K, as well as the command software illustrated in FIGS. 39–67. The TARGET MAIN LOOP routine is executed by the CPU embedded in the controller 103.

After executing an initialization code, the controller CPU enters its main loop in order to receive SCSI commands. Each SCSI command sent to the controller 103 results in one iteration of the TARGET MAIN LOOP. The loop begins in step 826 by starting a script execution at a previously determined entry point. For the first loop iteration, this entry point is the IDLE entry point in the TARGET SCRIPT. For subsequent iterations, this entry point will have been set in the previous iteration depending on how the command for that iteration was executed. After starting the TARGET SCRIPT, the CPU goes to sleep waiting for a command to come over the SCSI bus 106 which will result in a SCRIPT interrupt. At that point, the SCRIPT will have received the SCSI COMMAND DESCRIPTOR BLOCK.

After the SCRIPT interrupt occurs, the controller CPU wakes up and reads one of the SCSI chip's registers to determine which of the seven possible devices connected to the SCSI bus 106 sent the command in step 828. A SCSI target must retain the current SENSE STATUS for each possible device on the bus. Thus, in steps 830, 832 and 834, the TARGET MAIN LOOP gets the saved SENSE STATUS data for the device which sent the command. If that SENSE STATUS is not 0 indicating an error condition and the current command from the device driver 162 is not a REQUEST_SENSE command, the current SENSE DATA is cleared.

In step 836, the TARGET MAIN LOOP verifies that certain fields of the command descriptor block are 0, (e.g., logical unit number in byte 1 and control in the last byte). If not, the appropriate non-zero SENSE STATUS is set and the program jumps to a COMMAND DONE, CMD_DONE, step discussed later.

In steps 838, the TARGET MAIN LOOP checks if the controller memory contains a valid database due to a previous successful execution of a NEW_DB command. If the TARGET MAIN LOOP determines that a NEW_DB command was previously successfully executed, the program jumps to the code sequence corresponding to the received SCSI command in step 840. Otherwise, if the system determines that a NEW_DB command was not previously executed, the system checks in step 842 to determine whether the current command requires a database. If the current command does not require a database, (e.g., TEST_UNIT_RDY, REQUEST_SENSE, INQUIRY, SET_MASTER, NEW_DB, READ_ANY and WRITE_ANY), then the program jumps to the code sequence corresponding to the received SCSI command in step 840. If, on the other hand, the current command requires a database, a non-zero SENSE STATUS is set in 844 after which the TARGET MAIN LOOP jumps to the COMMAND DONE in step 846.

The code sequence executes the commands, performing any necessary I/O over the SCSI bus 106. Each code sequence ends by setting an error and jumping to CMD_DONE. If the command is executed without error, the error code will be 0. If there was an error, the error code will contain a non-zero SENSE STATUS to be saved and will also specify which SCRIPT entry point to use to finish the current command.

After executing the command in one of the individual code sequences, the TARGET MAIN LOOP rejoins the main loop at CMD_DONE, as identified as step 846. In steps 848 and 850, the error code is used to set the SENSE STATUS and the next SCRIPT entry point. The program next checks in step 852 whether SENSE STATUS is non-zero. If the current SENSE STATUS is zero, the program proceeds to step 854 to check the remaining free space in the data space 148, audit space 146 and key space 150 to determine whether the amount of space remaining in these areas has fallen below the 5% or 10% threshold levels. If so, the SENSE STATUS is set and saved in step 856. The program next proceeds to step 858. The program also proceeds to step 858 if the SENSE STATUS in step 852 was determined to be non-zero or if the remaining space in the data space 148, audit space 146 or key space 150 did not exceed the 5% or 10% thresholds.

At this point, in step 858, the next SCRIPT entry point encoded in the ERROR code will be DONE if there was no error. That entry point transmits a GOOD status followed by a COMMAND_COMPLETE message in step 860. If the current SENSE STATUS is non-zero, then the current command must end by returning a CHECK_CONDITION status so that the next SCRIPT entry point is changed to CHECK.

This ends a single iteration of the TARGET MAIN LOOP for a single command. Next iteration begins by restarting the SCRIPT execution at the appropriate entry point necessary to finish the current command and to await the next command.

As should be clear, the TARGET SCRIPT and TARGET MAIN LOOP software is executed by the controller 103. As such, the CPU in the host 104 is free for other tasks. Since the TARGET SCRIPT and TARGET MAIN LOOP software is responsible for the transfer over the SCSI bus 106, the system in accordance with the present invention obviates the problem with known information storage systems which utilize optimizer software executed by the CPU for data transfer. As mentioned above, the optimizer software utilizes a rather substantial portion of the host CPU time. As such, the optimizer software normally used in database applications seriously degrades the performance of the system. This problem is solved by the information storage system in accordance with the present invention since the need for optimizer software is minimized and the control for transferring the SCSI bus 106 is off-loaded from the host CPU.

Obviously, many modifications and variations of the present invention are possible in light of the above teachings. Thus, it is to be understood that within the scope of the appended claims, the invention may be practiced otherwise than as specifically designate above.

We claim:

1. A method of providing memory access to a memory mass storage device by a plurality of computers, each functioning under an independent operating system, such method comprising the steps of:

receiving a write access request identifying a memory space from a requesting computer of the plurality of computers by the memory mass storage device;

granting access and reserving the memory space for the exclusive use of the requesting computer and denying write access to the memory space by any other computer of the plurality of computers for the duration of the access grant to the requesting computer; and receiving a write access request and a required memory size from a second requesting computer of the plurality of computers.

2. The method as in claim 1 further comprising the step of retrieving a boundary location of a most recent new data store as a starting point of an available memory space of the required memory size specified in the access request from the second requesting computer.

3. The method as in claim 2 further comprising the step of reserving a memory space of the required memory size adjacent the boundary location for the exclusive use of the second requesting computer.

4. The method as in claim 3 further comprising the step of dynamically adjusting a memory map of the memory mass storage device based upon the reserved memory space for the second computer.

5. The method as in claim 1 further comprising the step of defining the write access request as a write new chain command.

6. A method of providing memory access to a memory mass storage device by a plurality of computers, each functioning under an independent operating system, such method comprising the steps of:

receiving a write access request identifying a memory space from a first requesting computer of the plurality of computers by the memory mass storage device;

granting access and reserving the memory space for the exclusive use of the first requesting computer and denying write access to the memory space by any other computer of the plurality of computers for the duration of the access grant to the first requesting computer;

transmitting a write access request from the first requesting computer to the memory mass storage device followed by at least one data byte;

writing the at least one data byte from the first requesting computer into the identified memory space; and storing parametric data from the first requesting computer about the at least one data byte in a reserved keys space of the identified memory space.

7. The method as in claim 6 further comprising the step of reading the parametric data about the at least one byte by a fourth computer of the plurality of computers.

8. The method as in claim 6 further comprising the step of locking the reserved keys space of the memory map by the first computer.

9. The method as in claim 8 further comprising the step of modifying the parametric data of the at least one data byte of the reserved keys space of the memory space by the first computer.

10. A computer system comprising:

a memory mass storage device;

a plurality of computers, each functioning under an independent operating system, operably connected to the memory mass storage device through an external bus;

a communication processor of the memory mass storage device operably connected to the plurality of computers through the external bus for receiving an access request from a requesting computer of the plurality of computers identifying a memory space of the memory mass storage device;

a controller of the memory mass storage device operably connected to the communication processor for granting exclusive write access to the identified memory space by the requesting computer for a duration of the access grant to the requesting computer;

means for storing at least one byte of data from the requesting computer into the identified memory space; and a dynamic memory map containing a listing of the identified memory space.

11. The system as in claim 10 wherein the listing of the identified memory space further comprises a descriptor portion containing at least one descriptive parameter of the at least one byte of data.

* * * * *